United States Patent
Yoneda et al.

(10) Patent No.: US 9,124,714 B2
(45) Date of Patent: Sep. 1, 2015

(54) INFORMATION PROCESSING DEVICE AND METHOD, PROGRAM, AND INFORMATION PROCESSING SYSTEM

(75) Inventors: Yoshihiro Yoneda, Kanagawa (JP); Naoki Miyabayashi, Tokyo (JP); Isao Soma, Saitama (JP); Seiji Kuroda, Kanagawa (JP); Yasuharu Ishikawa, Kanagawa (JP); Kazuo Takada, Chiba (JP)

(73) Assignee: SONY CORPORATION, Tokyo (JP)

( * ) Notice: Subject to any disclaimer, the term of this patent is extended or adjusted under 35 U.S.C. 154(b) by 1231 days.

(21) Appl. No.: 12/561,504

(22) Filed: Sep. 17, 2009

(65) Prior Publication Data

US 2010/0075605 A1    Mar. 25, 2010

(30) Foreign Application Priority Data

Sep. 24, 2008  (JP) ................................ 2008-244463

(51) Int. Cl.
| | | |
|---|---|---|
| H04B 7/00 | (2006.01) | |
| H04M 1/725 | (2006.01) | |
| H04W 76/02 | (2009.01) | |
| H04L 29/08 | (2006.01) | |
| H04L 29/06 | (2006.01) | |
| H04W 84/20 | (2009.01) | |

(52) U.S. Cl.
CPC ........... *H04M 1/7253* (2013.01); *H04L 67/306* (2013.01); *H04L 69/24* (2013.01); *H04W 76/025* (2013.01); *H04W 84/20* (2013.01)

(58) Field of Classification Search
CPC ..... H04W 48/00; H04W 48/08; H04W 48/16; H04W 76/02
See application file for complete search history.

(56) References Cited

U.S. PATENT DOCUMENTS

| 7,054,914 B2 | 5/2006 | Suzuki et al. | |
|---|---|---|---|
| 8,396,925 B2* | 3/2013 | Yoneda et al. | 709/205 |
| 2002/0055978 A1* | 5/2002 | Joon-Bo et al. | 709/209 |

(Continued)

FOREIGN PATENT DOCUMENTS

| EP | 1 278 312 A1 | 1/2003 |
|---|---|---|
| JP | 2001-215975 | 8/2001 |

(Continued)

OTHER PUBLICATIONS

Japanese Office Action issued Nov. 6, 2012 in Patent Application No. 2008-244463.

(Continued)

*Primary Examiner* — Zhiyu Lu
(74) *Attorney, Agent, or Firm* — Hazuki International, LLC

(57) ABSTRACT

An information processing device has a first transmitting unit to connect a first other information processing device and second other information processing device and transmit the content via the connection; a first receiving unit to receive a master request that requests an upgrade to a master from the first other information processing device; a second transmitting unit to transmit the identification information of the first other information processing device to the second information processing device upon receiving the master request; a disconnecting unit to disconnect the connection with the second other information processing device after transmitting the identification information of the first other information processing device; and a second receiving unit to receive content via the connection from the first other information processing device.

20 Claims, 30 Drawing Sheets

(56) References Cited

U.S. PATENT DOCUMENTS

| | | | |
|---|---|---|---|
| 2002/0168943 A1* | 11/2002 | Callaway et al. | 455/67.1 |
| 2003/0060222 A1* | 3/2003 | Rune | 455/517 |
| 2003/0124979 A1* | 7/2003 | Tanada et al. | 455/41 |
| 2003/0202477 A1* | 10/2003 | Zhen et al. | 370/248 |
| 2004/0203936 A1* | 10/2004 | Ogino et al. | 455/463 |
| 2004/0242250 A1 | 12/2004 | Sasai et al. | |
| 2005/0262216 A1* | 11/2005 | Kashiwabara et al. | 709/208 |
| 2006/0200533 A1* | 9/2006 | Holenstein et al. | 709/208 |
| 2006/0246947 A1* | 11/2006 | Fujii et al. | 455/557 |
| 2007/0021142 A1 | 1/2007 | Byeon et al. | |
| 2007/0141987 A1* | 6/2007 | Weinans et al. | 455/41.2 |
| 2008/0177822 A1* | 7/2008 | Yoneda | 709/202 |
| 2009/0221271 A1 | 9/2009 | Soma et al. | |
| 2010/0077031 A1* | 3/2010 | Yoneda et al. | 709/204 |

FOREIGN PATENT DOCUMENTS

| | | |
|---|---|---|
| JP | 2002-164901 A | 6/2002 |
| JP | 2005-275539 A | 10/2005 |
| JP | 2007-189464 A | 7/2007 |
| JP | 2009-538006 A | 10/2009 |
| WO | WO 2006/085269 A1 | 8/2006 |
| WO | WO 2007/112787 A1 | 10/2007 |
| WO | WO 2007/131555 A1 | 11/2007 |

OTHER PUBLICATIONS

U.S. Appl. No. 12/562,711, filed Sep. 18, 2009, Yoneda, et al.

* cited by examiner

FIG. 6

| ITEMS | DETAILS | | EXAMPLE |
|---|---|---|---|
| CAPABILITY INFORMATION | ADDRESS | | BD ADDRESS, MAC ADDRESS |
| | PROTOCOL TYPE | | Bluetooth, WiFi |
| | EQUIPMENT TYPE | | PORTABLE TELEPHONE, CAR NAVIGATION SYSTEM, PC |
| | PROFILE | | MUSIC PLAYER, PHOTOGRAPHS, GAMES |
| | APPLICATION IDENTIFIER | | |
| PROFILE INFORMATION | USER ID | | IDENTIFIER TO UNIQUELY IDENTIFY USER |
| | NICKNAME | | |
| | PROFILE PHOTOGRAPH | | |
| | OCCUPATION TYPE | | |
| | COUNTRY | | |
| | MARITAL STATUS | | |
| | DATE OF BIRTH | | |
| | POSTAL CODE | | |
| | ADDRESS | | |
| | TELEPHONE NUMBER | | |
| | MESSAGE | | |
| CONTENT OPERATION AUTHORITY | HAVE PLAYING CONTROL AUTHORITY? | | YES/NO |

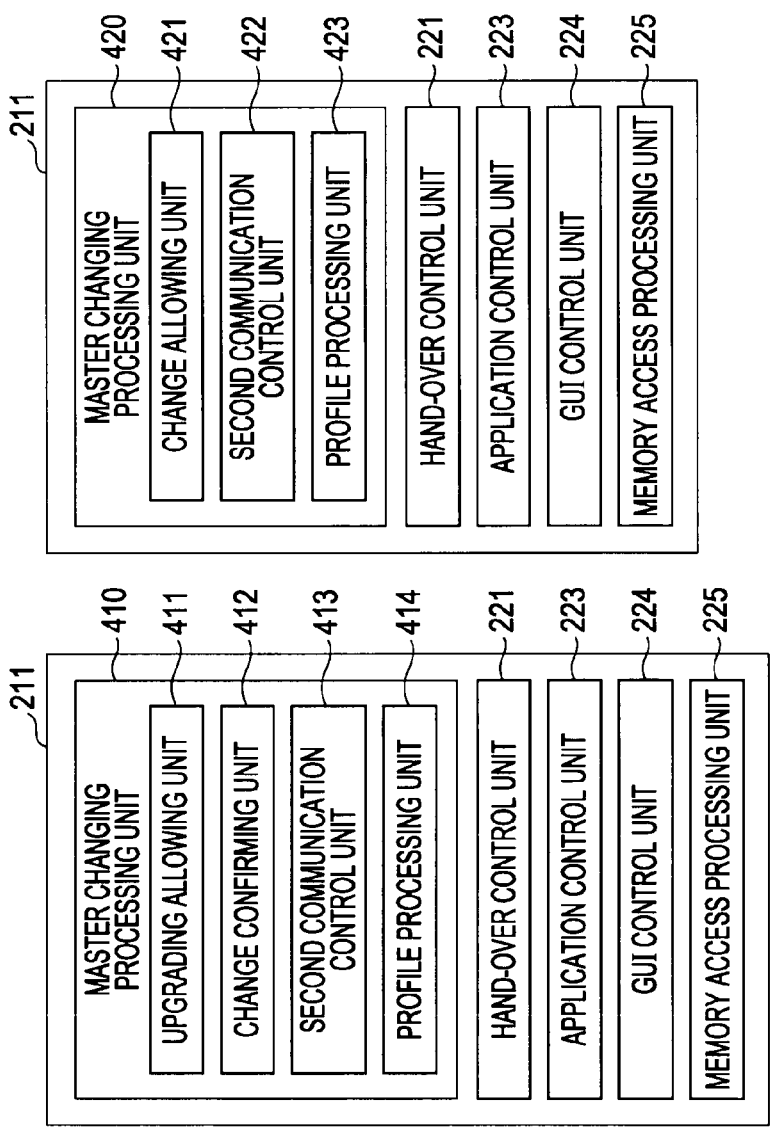

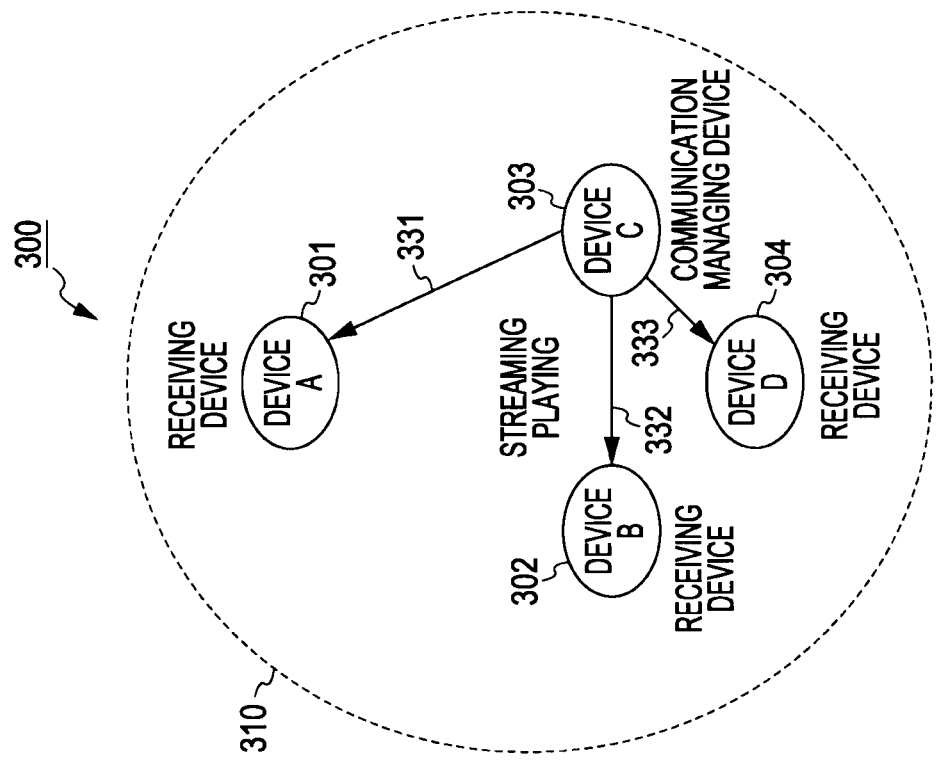
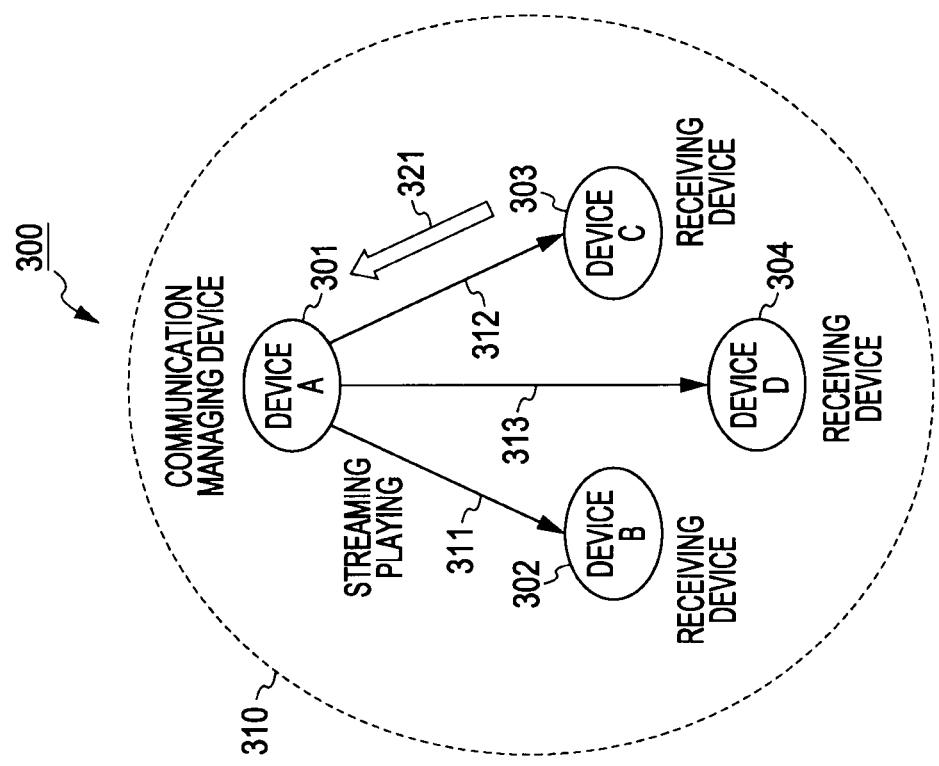

FIG. 19

| | |
|---|---|
| MASTER UPGRADING ALLOWING RESPONSE | ~577 |
| MASTER CHANGE ACCEPTING ADDRESS: ADDRESS B | ~578 |
| MASTER CHANGE ACCEPTING CAPABILITY INFORMATION: CAPABILITY INFORMATION B | ~579 |
| NEW MASTER PIN: 1234 | ~580 |
| MASTER CHANGE ACCEPTING ADDRESS: ADDRESS D | ~581 |
| MASTER CHANGE ACCEPTING CAPABILITY INFORMATION: CAPABILITY INFORMATION D | ~582 |
| NEW MASTER PIN: 1234 | ~583 |
| MASTER CHANGE ACCEPTING ADDRESS: ADDRESS A | ~584 |
| MASTER CHANGE ACCEPTING CAPABILITY INFORMATION: CAPABILITY INFORMATION A | ~585 |
| NEW MASTER PIN: | ~586 |

555

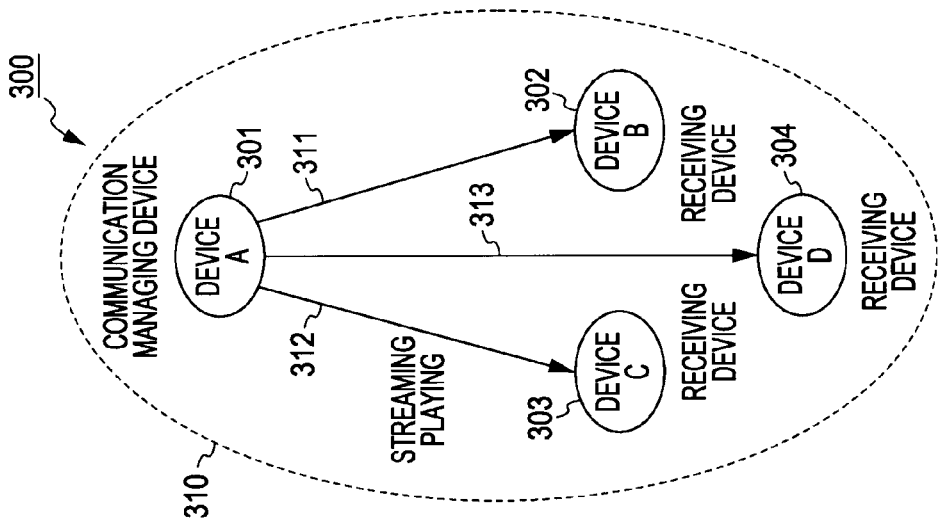
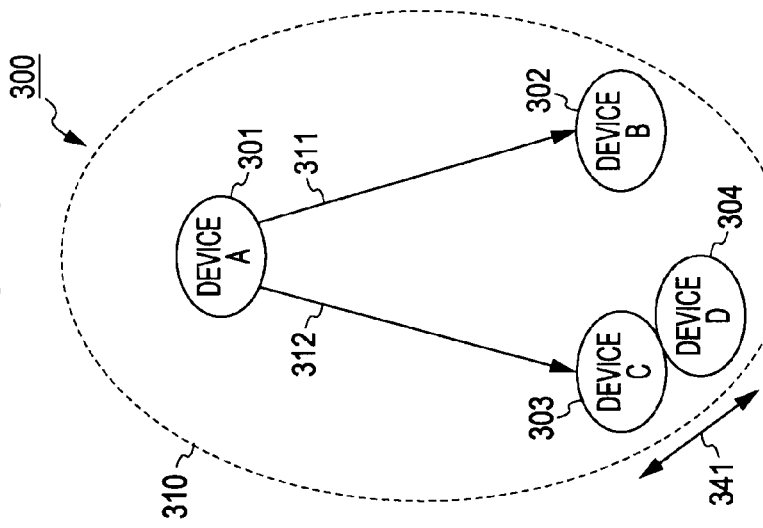
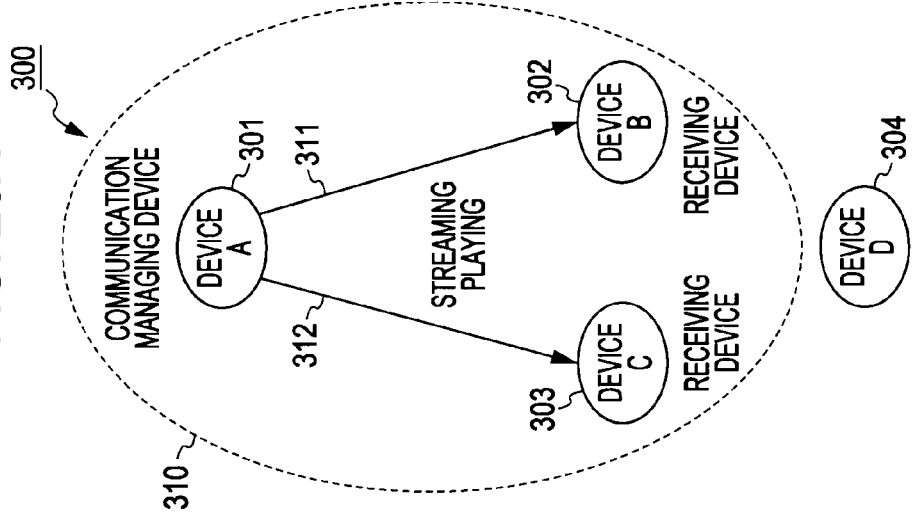

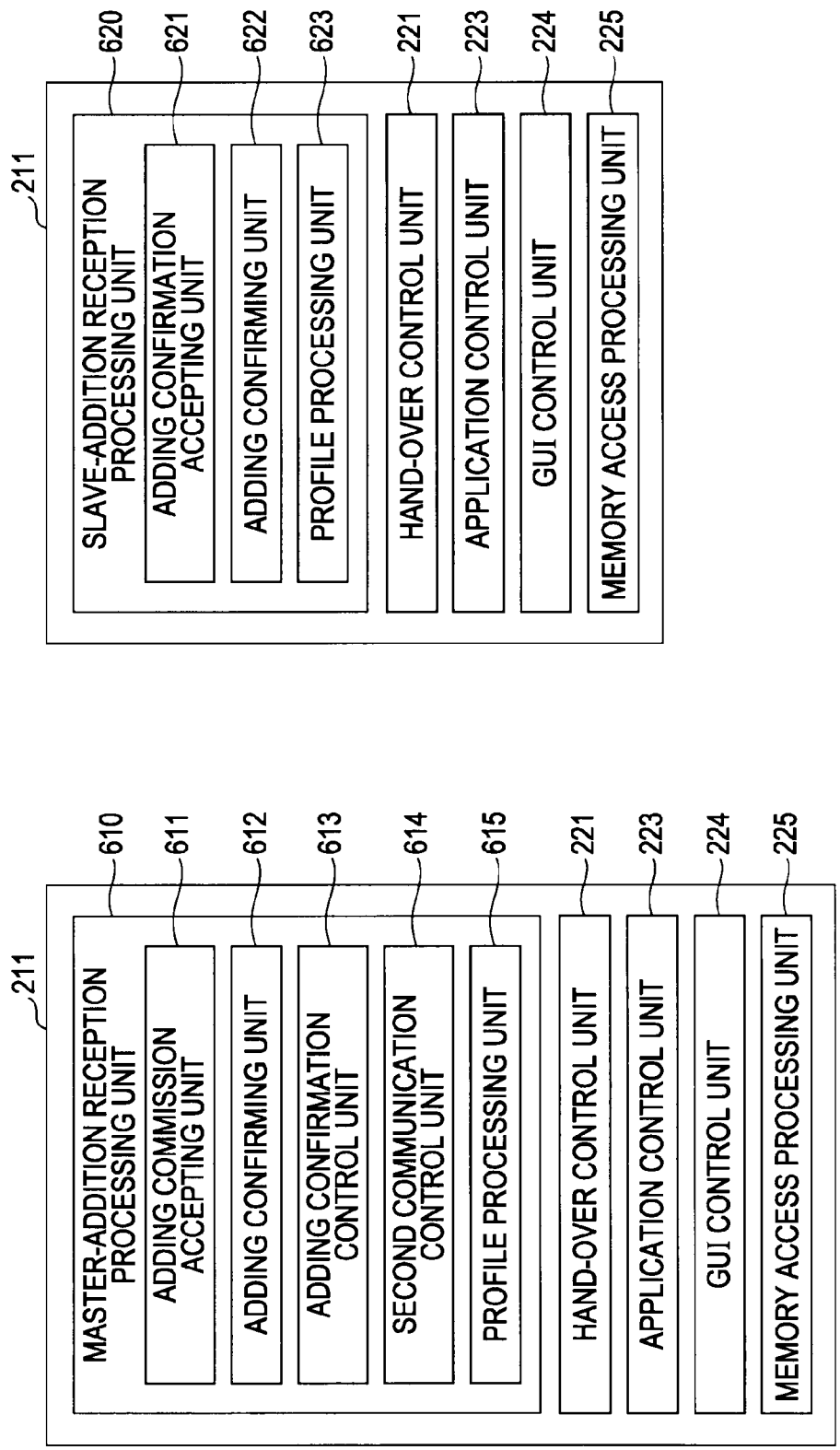

FIG. 25

661
| | |
|---|---|
| MASTER ADDRESS: ADDRESS A | 671 |
| MASTER CAPABILITY INFORMATION: CAPABILITY INFORMATION A | 672 |
| NEW MASTER PIN: 1234 | 673 |
| OWN ADDRESS: ADDRESS C | 674 |
| OWN CAPABILITY INFORMATION: CAPABILITY INFORMATION C | 675 |
| CONTENT OPERATION AUTHORITY: THERE ARE PLAYING CONTROLS | 676 |

662
| | |
|---|---|
| OWN ADDRESS: ADDRESS D | 677 |
| OWN CAPABILITY INFORMATION: CAPABILITY INFORMATION D | 678 |
| NEW MASTER PIN: 1234 | 679 |

663
| | |
|---|---|
| ADDING COMMISSION REQUEST COMMAND | 680 |
| ADDING DEVICE ADDRESS: ADDRESS D | 681 |
| ADDING DEVICE CAPABILITY INFORMATION: CAPABILITY INFORMATION D | 682 |
| NEW MASTER PIN: 1234 | 683 |
| ADDING DEVICE CONTENT OPERATING AUTHORITY: THERE ARE PLAYING CONTROLS | 684 |

664
| | |
|---|---|
| ADDING COMMISSION ALLOWING RESPONSE | 685 |
| NEW MASTER PIN: 1234 | 686 |

665
| | |
|---|---|
| ADDING CONFIRMATION REQUEST COMMAND | 687 |
| ADDING DEVICE ADDRESS: ADDRESS D | 688 |
| ADDING DEVICE CAPABILITY INFORMATION: CAPABILITY INFORMATION D | 689 |
| ADDING DEVICE CONTENT OPERATING AUTHORITY: THERE ARE PLAYING CONTROLS | 690 |

666
| | |
|---|---|
| ADDING CONFIRMATION ALLOWING RESPONSE | 691 |

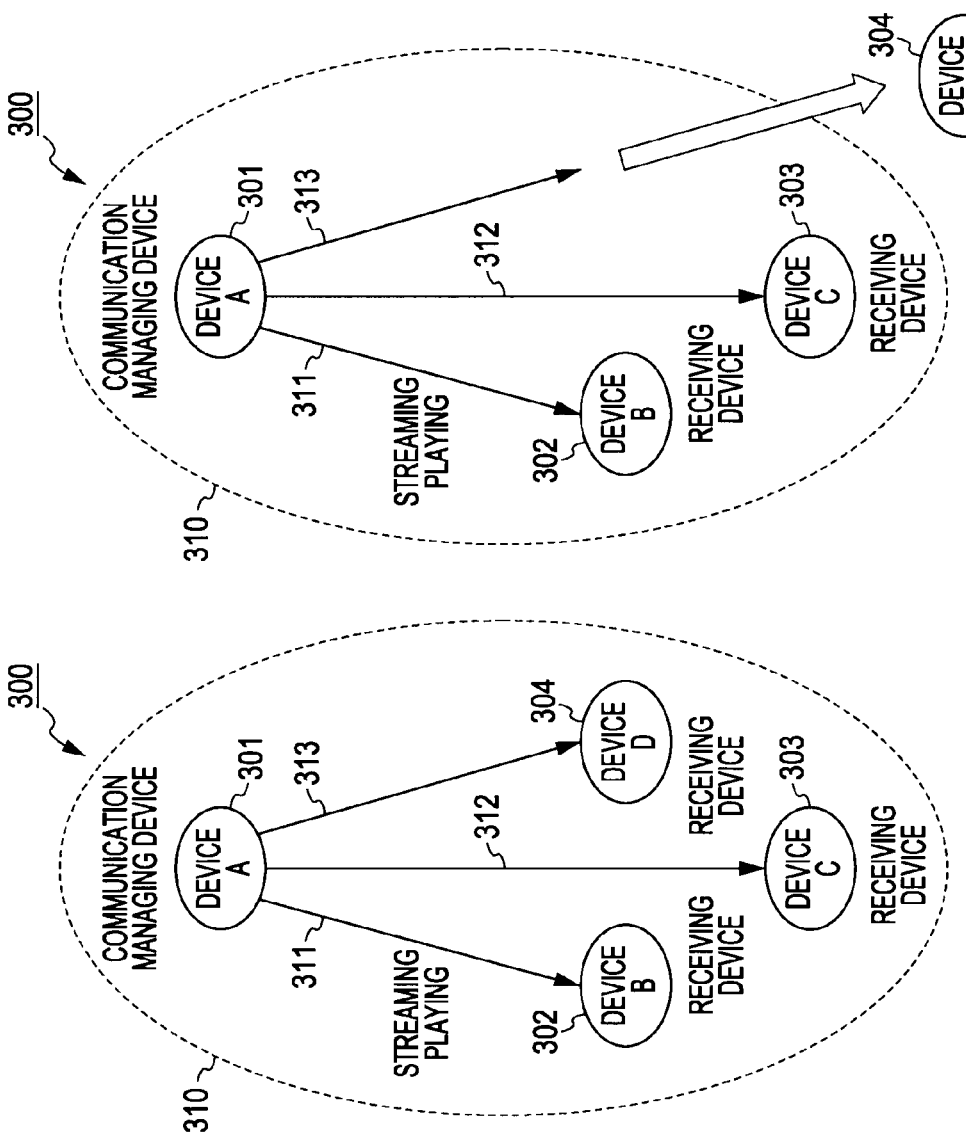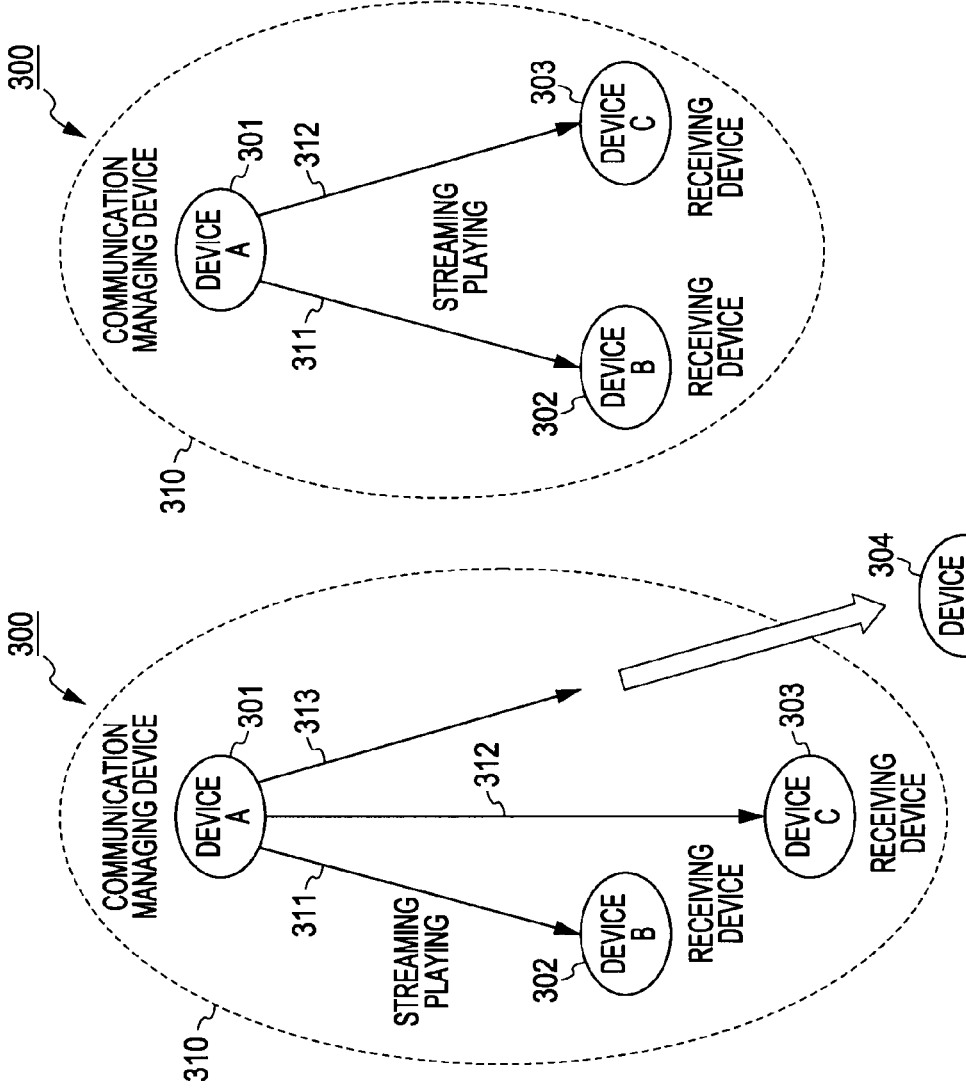

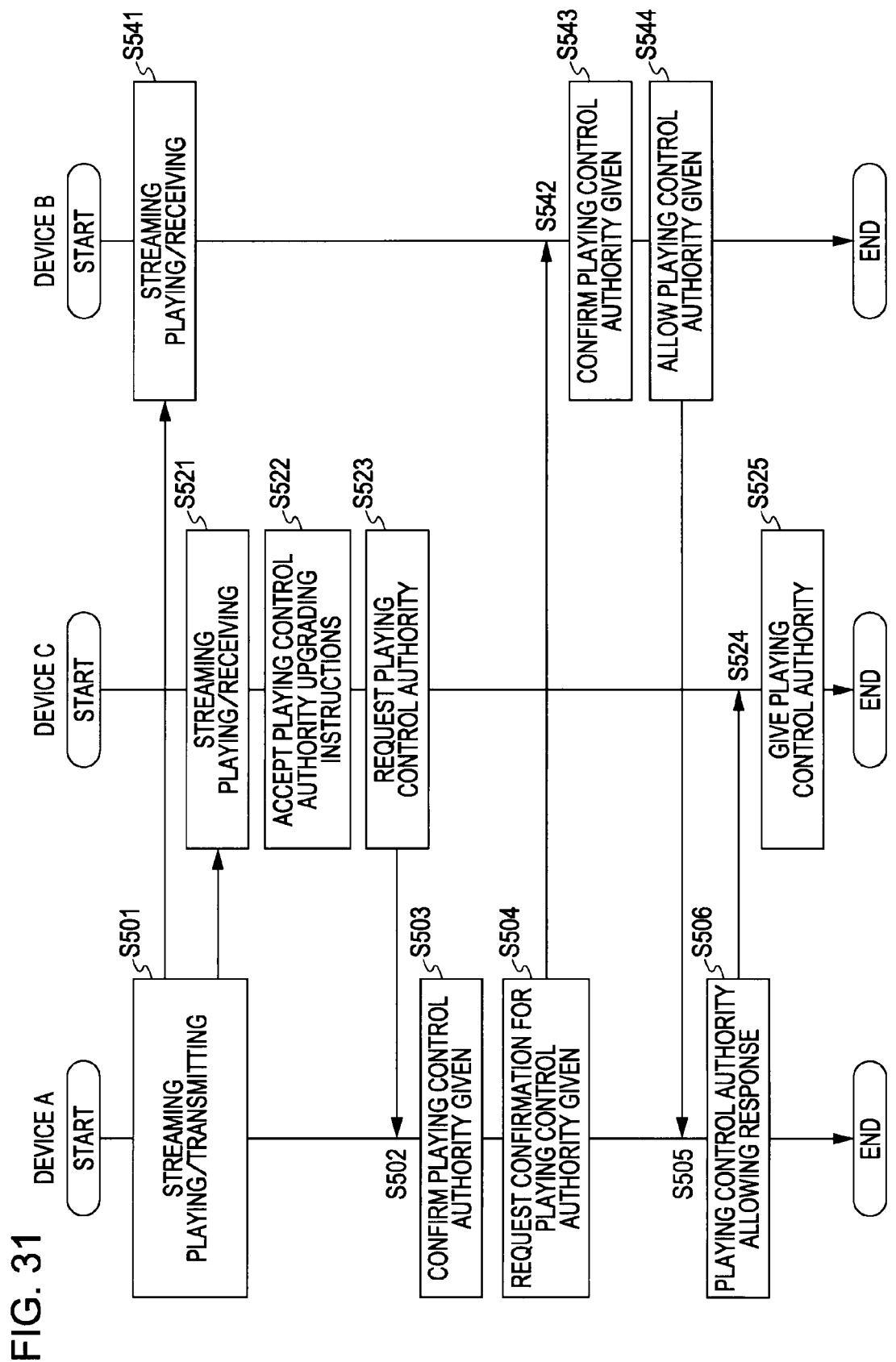

INFORMATION PROCESSING DEVICE AND METHOD, PROGRAM, AND INFORMATION PROCESSING SYSTEM

BACKGROUND OF THE INVENTION

1. Field of the Invention

The present invention relates to an information processing device and method, program, and information system, and in particular relates to an information processing device and method, program, and information system wherein the usability of an application providing communication between devices can be improved.

2. Description of the Related Art

Heretofore, an application has been proposed to operate in coordination with another device and provide predetermined services such as sharing information for example, by performing communication with the other device using a predetermined communication method (e.g., see Japanese Unexamined Patent Application Publication No. 2001-215975).

In the case of Japanese Unexamined Patent Application Publication No. 2001-215975, a digital cellular phone downloads a song list file from a notebook personal computer according to operations by a user, and displays the song list on a display unit in according with the song list file. Upon downloading and playing the music file selected by the user from the displayed song list from the notebook personal computer or music file server, the digital cellular phone outputs the music file via headphones.

SUMMARY OF THE INVENTION

However, in order to perform communication with another device, information relating to communication functions, applications, and so forth have to be mutually exchanged and connections established based on the information thereof. Setup work for establishing communication is not only complicated, but there are cases wherein special knowledge has to be had. Accordingly, there has been the concern that a user performing the setting work by manual operations may result in the application involving communication with other device not being readily useful.

In particular, in the case of forming a communication network with three or more devices, the connections between all of the devices have had to be disconnected in order to change the one communication managing device that manages the communication network thereof to another device. For example, in a communication network wherein content data is distributed from one device to the remaining devices, in the case of switching the device that transmits the content data to another device, all of the connections between the devices are temporarily disconnected, the communication settings for each device are updated and the device to transmit the content data is switched, the connection is restarted, and transmission is begun again, which involves tedious work. Also, in the event of reconnection, in the case that the connection setting work is complicated, the work can become more tedious. This can lead to decreased usability of the application.

It has been found desirable to enable improvements to the usability of an application providing communication between devices.

According to an embodiment of the present invention, an information processing device has a first transmitting unit to connect a first other information processing device and second other information processing device and transmit the content via the connection; a first receiving unit to receive a master request that requests an upgrade to a master from the first other information processing device; a second transmitting unit to transmit the identification information of the first other information processing device to the second information processing device upon receiving the master request; a disconnecting unit to disconnect the connection with the second other information processing device after transmitting the identification information of the first other information processing device; and a second receiving unit to receive content via the connection from the first other information processing device.

The second transmitting unit may transmit identification information of the first other information processing device, along with a confirming request as to whether or not to allow the master change, to the second other information processing device; and the disconnecting unit may disconnect the connection by the second other information processing device in the case that the master change is allowed, as a response to the confirming request.

The capability information of the first other information processing device may include the master request received by the first receiving unit.

The second receiving unit may receive the content, as well as capability information of the second other information processing device connected to the first other information processing device, and profile information relating to the user of the second other information processing device.

The information processing device may further include a playing unit to play the streaming data received from the second receiving unit, with the second receiving unit receiving streaming data of the content.

According to an embodiment of the present invention, an information processing method includes the steps of: connecting a first other information processing device and second other information processing device and transmitting the content via the connection; receiving a master request that requests an upgrade to a master from the first other information processing device; transmitting the identification information of the first other information processing device to the second information processing device upon receiving the master request; disconnecting the connection with the second other information processing device after transmitting the identification information of the first other information processing device; and receiving content via the connection from the first other information processing device.

According to an embodiment of the present invention, a program causes a computer to execute an information processing method, including the steps of: connecting a first other information processing device and second other information processing device and transmitting the content via the connection; receiving a master request that requests an upgrade to a master from the first other information processing device; transmitting the identification information of the first other information processing device to the second information processing device upon receiving the master request; disconnecting the connection with the second other information processing device after transmitting the identification information of the first other information processing device; and receiving content via the connection from the first other information processing device.

According to the above configuration, a first other information processing device and second other information processing device are connected, content is transmitted via the connection; a master request that requests an upgrade to a master from the first other information processing device is received; the identification information of the first other information processing device is transmitted to the second other information processing device upon receiving the master request; the connection with the second other information processing device is disconnected after the identification information of the first other information processing device is transmitted; and content is received via the connection from the first other information processing device.

According to an embodiment of the present invention, an information processing device has a first receiving unit to connect with a first other information processing device and receive content supplied from the first information processing device via the connection; a second receiving unit to receive identification information of a second other information processing device supplied from the first other information processing device via the connection; a disconnecting unit to disconnect the connection with the first other information processing device; a connecting unit to connect with the second other information processing device; and a third receiving unit to receive content from the second other information processing device via the connection.

The information processing device may further include a transmitting unit to transmit a response indicating allowing the master change to the first other information processing device, in accordance with the confirming request received from the second receiving unit; with the second receiving unit further receiving a confirming request as to whether or not to allow the master change supplied from the first other information processing device via the connection.

The second receiving unit may receive capability information of the second information processing device.

The transmitting unit may transmit own equipment information, own capability information, and profile information relating to own user.

The third receiving unit may receive streaming data of the content; and the information processing device may include a playing unit to play the streaming data received from the third receiving unit.

According to an embodiment of the present invention, an information processing method includes the steps of: connecting with a first other information processing device and receiving content supplied from the first information processing device via the connection; receiving identification information of a second other information processing device supplied from the first other information processing device via the connection; disconnecting the connection with the first other information processing device; connecting with the second other information processing device; and receiving content from the second other information processing device via the connection.

According to an embodiment of the present invention, a program causes a computer to execute an information processing method, including the steps of: connecting with a first other information processing device and receiving content supplied from the first information processing device via the connection; receiving identification information of a second other information processing device supplied from the first other information processing device via the connection; disconnecting the connection with the first other information processing device; connecting with the second other information processing device; and receiving content from the second other information processing device via the connection.

According to the above configuration, a first other information processing device is connected, content supplied from the first information processing device is received via the connection; identification information of a second other information processing device supplied from the first other information processing device is received via the connection; the connection with the first other information processing device is disconnected; the second other information processing device is connected; and content is received from the second other information processing device via the connection.

According to an embodiment of the present invention, an information processing device has a first receiving unit to connect with a first other information processing device and receive content supplied from the first information processing device via the connection; a first transmitting unit to transmit a master request that requests an master upgrade to the first other information processing device via the connection; a second receiving unit to receive a response allowing the master upgrade that is supplied from the first other information processing device via the connection, in accordance with the master request; a upgrading unit to upgrade own device to the master; a connecting unit to connect with second other information processing device; and a second transmitting unit to transmit content to the first other information processing device and the second other information processing device.

The first transmitting unit may transmit own capability information.

The second receiving unit may receive equipment information of the second other information processing device and capability information of the second information processing device transmitted from the first other information processing device.

The information processing device may further include a playing unit to play streaming data of the content which the first receiving unit receives; with the second transmitting unit transmitting the streaming data of the content.

According to an embodiment of the present invention, an information processing method includes the steps of: connecting with a first other information processing device and receiving content supplied from the first information processing device via the connection; transmitting a master request that requests an master upgrade to the first other information processing device via the connection; receiving a response allowing the master upgrade that is supplied from the first other information processing device via the connection, in accordance with the master request; upgrading own device to the master; connecting with second other information processing device; and transmitting content to the first other information processing device and the second other information processing device.

According to an embodiment of the present invention, a program causes a computer to execute an information processing method, including the steps of: connecting with a first other information processing device and receiving content supplied from the first information processing device via the connection; transmitting a master request that requests an master upgrade to the first other information processing device via the connection; receiving a response allowing the master upgrade that is supplied from the first other information processing device via the connection, in accordance with the master request; upgrading own device to the master; connecting with second other information processing device; and transmitting content to the first other information processing device and the second other information processing device.

According to the above configuration, a first other information processing device is connected, content supplied from the first information processing device is received via the connection; a master request that requests an master upgrade to the first other information processing device is transmitted via the connection; a response allowing the master upgrade that is supplied from the first other information processing device is received via the connection, in accordance with the master request; the device itself is upgraded to a master; a second other information processing device is connected; and content is transmitted to the first other information processing device and the second other information processing device.

According to an embodiment of the present invention, an information processing system that is a communication system has: a first information processing device; a second information processing device; and a third information processing device to perform a first communication and a second communication; the first information processing device having a first transmitting unit to connect the second information processing device and third information processing device, and transmit content via the connection; a first receiving unit to receive, from the third information processing device, a master request that requests a master upgrade; a second transmitting unit to transmit identification information of the third information processing device to the second information processing device, upon receiving the master request; a first disconnecting unit to disconnect the connection between the second information processing device, upon transmitting the identification information of the third information processing device; and a second receiving unit to receive content from the third information processing device via the connection; the second information processing device having a third receiving unit to connect with a first information processing device and receive content supplied from the first information processing device via the connection; a fourth receiving unit to receive identification information of a third information processing device supplied from the first information processing device via the connection; a second disconnecting unit to disconnect the connection between the first information processing device; a first connecting unit to connect with the third information processing device; and a fifth receiving unit to receive content via the connection from the third information processing device; and the third information processing device having a sixth receiving unit to connect with a first information processing device and receive content supplied from the first information processing device via the connection; a third transmitting unit to transmit a master request that requests a master upgrade to the first information processing device via the connection; a seventh receiving unit to receive a response allowing the master upgrade that is supplied from the first information processing device via the connection in accordance with the master request; an upgrading unit to upgrade own device to the master; a second connecting unit to connect with a second information processing device; and a fourth transmitting unit to transmit content to the first information processing device and the second information processing device.

According to the above configuration, a communication system has: a first information processing device; a second information processing device; and a third information processing device to perform a first communication and a second communication; with the first information processing device a second information processing device and third information processing device are connected and content is transmitted via the connection; a master request that requests a master upgrade is received from the third information processing device; identification information of the third information processing device is transmitted to the second information processing device, upon receiving the master request; the connection between the second information processing device is disconnected, and upon transmitting the identification information of the third information processing device, content is received from the third information processing device via the connection; with the second information processing device a first information processing device is connected; content supplied from the first information processing device is received via the connection; identification information of a third information processing device supplied from the first information processing device is received via the connection; the connection between the first information processing device is disconnected; the third information processing device is connected; and content is received from the third information processing device via the connection; and with the third information processing device a first information processing device is connected; content supplied from the first information processing device is received via the connection; a master request that requests a master upgrade is transmitted to the first information processing device via the connection; the master upgrade that is supplied from the first information processing device via the connection in accordance with the master request is allowed; the device itself is upgraded to a master; a second information processing device is connected; and content is transmitted to the first information processing device and the second information processing device.

According to the above-described configurations, the usability of an application providing communication between devices can be improved.

BRIEF DESCRIPTION OF THE DRAWINGS

FIG. 6 is a diagram describing a configuration example of various types of information;

FIGS. 8A through 8C are diagrams illustrating a configuration example of a functional block of each device;

FIGS. 15A and 15B are diagrams illustrating a primary configuration example of a communication system to which the present invention has been applied;

FIG. 19 is a diagram illustrating a configuration example of data that is exchanged;

FIGS. 20A through 20C are diagrams illustrating a primary configuration example of a communication system to which the present invention has been applied;

FIGS. 21A and 21B are diagrams illustrating a configuration example of a functional block of each device;

FIG. 25 is a diagram illustrating a configuration example of data that is exchanged;

FIGS. 26A through 26C are diagrams illustrating a primary configuration example of a communication system to which the present invention has been applied;

FIG. 31 is a flowchart describing the flow of upgrading processing.

DESCRIPTION OF THE PREFERRED EMBODIMENTS

Figure 1:
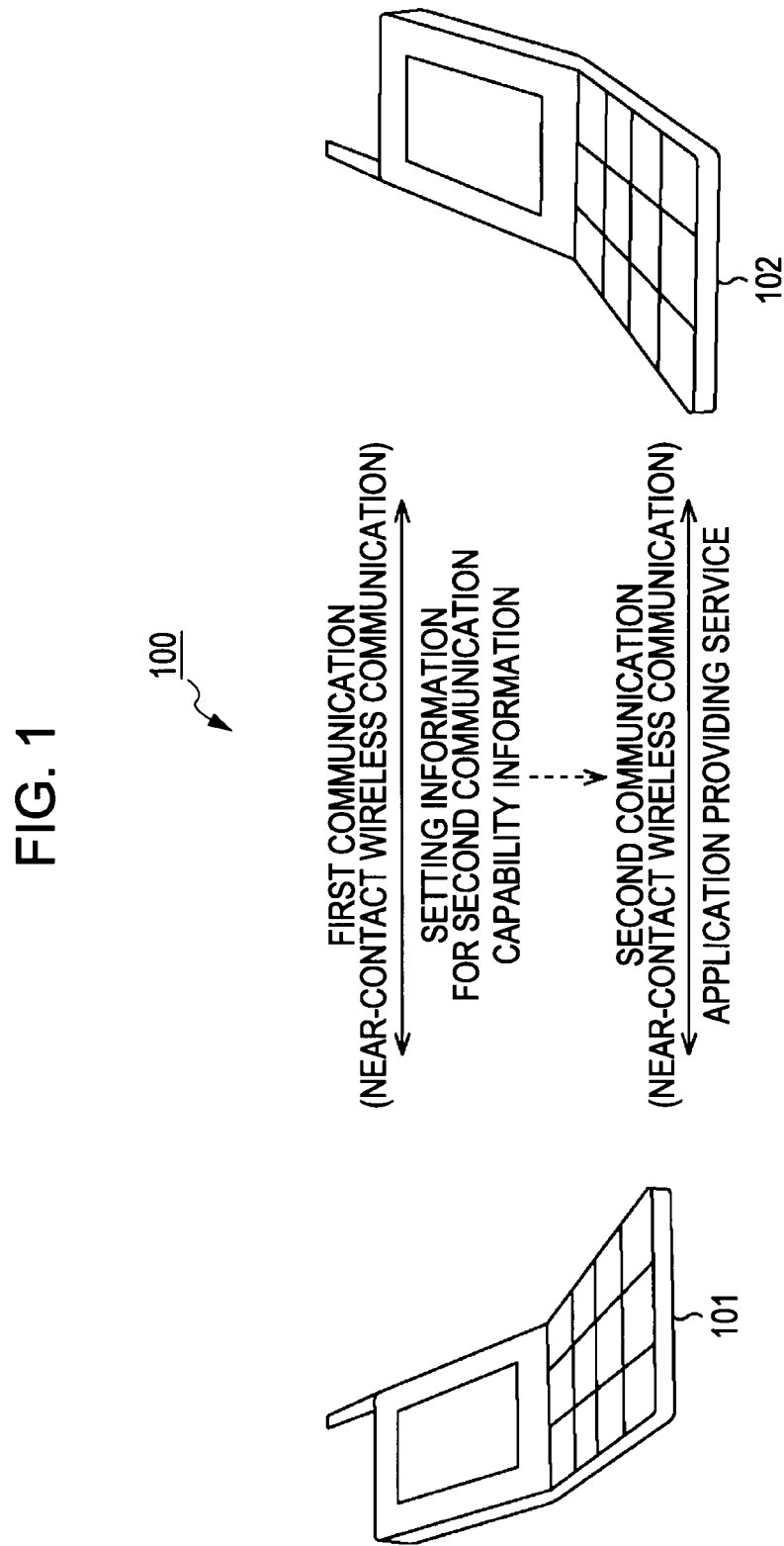
FIG. 1 is a block diagram illustrating a primary configuration example of a communication system.

First, processing at the time of communication connection between devices will be described. FIG. 1 is a diagram showing a configuration example of a communication system to which the present invention has been applied. In FIG. 1, the communication system 100 is a system to operate multiple devices in coordination by wireless communication and execute an application to provide a series of services. As shown in FIG. 1, the communication system 100 has a cellular phone 101 and cellular phone 102, for example.

The cellular phone 101 and cellular phone 102 perform mutual communication with two methods of a first communication and second communication. The first communication is communication to be performed to exchange equipment information that is information relating to the devices performing the communication and capability information that is made up of useful information for establishing connections for the second communication. For example, a close proximity wireless communication is used as the first communication. The second communication is communication to operate in coordination with an application that is executed at each of the cellular phone 101 and cellular phone 102, and to perform communication for providing a series of services (application providing service). For example, near field wireless communication is used as the second communication.

Note that "close proximity wireless communication" means a wireless communication method in which communication is realized in a state wherein a communication partner is brought close to a distance that can be visually identifiable, such as roughly several centimeters for example. An example thereof is a wireless communication method using electromagnetic induction such as a non-contact IC (Integrated Circuit) card. Note that hereafter, unless particularly noted otherwise, "contact" and "close proximity" as described above will be described without distinguishing therebetween. That is to say, an action described as "making contact" shall be included in "close proximity". The reverse thereof is also the same.

Also, "near field wireless communication" means a wireless communication method that is communicable in a state wherein the cellular phone 101 and cellular phone 102 are positioned at a near distance (for example roughly several tens of meters or less). Examples thereof are Bluetooth (registered trademark) and WiFi (Wireless Fidelity (WiFi accredited IEEE (Institute of Electrical and Electronic engineers) 802.11x)).

Generally, in the case of close proximity wireless communication that is used as the first communication, the communication partner can be readily identified from the physical limitation of the communication range thereof, and setting work to establish the communication connection is that much easier than in the case of near field wireless communication. For example, in the case of near field wireless communication, in the case there are multiple devices in the communicable range, a user has to specify with which device to communicate. Conversely in the case of close proximity wireless communication, the communicable range thereof is narrow, whereby basically the communication partner is limited to one device. Accordingly in this case, the user is requested to move the device that the user himself is operating to be close in proximity to the device serving as the communication partner, but the action thereof itself specifies the communication partner, so inputting specification of a communication partner or the like anew can be omitted.

However, close proximity wireless communication generally has a lower data transfer rate than near field wireless communication, and is not suited for large-capacity data transfers. Also, the two devices have to be placed near one another during communication, so there may be cases wherein maintaining the state thereof (the positional relation of the two devices) is difficult. Further, communication between three or more devices becomes difficult.

From the above points, with the communication system 100, coordination of the applications (applications executed at each of the cellular phone 101 and cellular phone 102) are performed with the second communication (near field wireless communication), and the first communication (close proximity wireless communication) is used for the mutual sending/receiving of equipment information and capability information for the second communication. That is to say, the cellular phone 101 and cellular phone 102 first perform the first communication, and perform preparations for connection for the second communication by sending/receiving equipment information of one another. However, in reality, with only the equipment information, versatility is poor, whereby establishing a connection for the second communication is difficult. Thus, the cellular phone 101 and cellular phone 102 exchange capability information including further detailed information, and flexibly establish a connection for the second communication based on the capability information thereof. Upon the connection for the second communication being established, the cellular phone 101 and cellular phone 102 perform linking operations of the application using the second communication thereof.

The equipment information is made up of general identification information that identifies each device. This may be identification information that complies with predetermined communication protocols. Conditions for establishing the connection for the second communication are varied, by communication capability and information processing capability for the various devices, as well as applications used and so forth. Accordingly, using the basic equipment information only yields poor versatility.

Information relating to the capability of devices such as the communication unit (communication method) and applications and so forth, for example, are included in the capability information, the details of which will be described later. The cellular phone 101 and cellular phone 102 perform detailed settings of the communication unit to be used for the second communication, select applications to be used with the second communication, and so forth, based on the capability information of the communication partner. The cellular phone 101 and cellular phone 102 can share information of one another by exchanging such capability information. Accordingly, the cellular phone 101 and cellular phone 102 can more appropriately perform communication and application settings based on the information thereof without unnecessarily increasing the workload of the user. That is to say, the cellular phone 101 and cellular phone 102 can improve the ease-of-use of applications involving communication between devices. For example, the cellular phone 101 and cellular phone 102 can appropriately select various types of communication settings such as the communication method serving as the second communication and the communication speed and so forth, according to the capability of the telephone itself and of the communication partner, or according to the application to be used. Also, for example, the cellular phone 101 and cellular phone 102 can appropriately select the application to be used according to capabilities of the telephone itself and the communication partner, or according to the objective for processing.

Note that a communication device making up the communication system 100 may be any type of communication device, as long as the device can perform both the first communication and the second communication. For example, the device may be a communication device that can perform both the first communication which performs communication wherein the communication partner is at a visually identifiable distance in the positional relation of the devices at the time of communication, and the second communication which performs communication at a distance wherein the communicable range is greater than that of the first communication and communication is performed at a distance at which visually identifying the communication partner in the positional relation of the devices at the time of communication is difficult.

That is to say, the communication devices making up the communication system 100 may be other than the above-described cellular phone 101 and cellular phone 102. For example, the communication device may be a television signal receiver, video recorder, media player, audio amplifier, audio component, printer, facsimile, automobile audio system, car navigation system or the like. Of course, the device may be a device other than these. Also, the device may have a function wherein each communication device making up the communication system 100 has a different function, such as a cellular phone and audio component, for example.

Further, the number of communication devices making up the communication system 100 is optional, and may be three devices or more. Note that the first communication does not have to be close proximity wireless communication. Also, the second communication does not have to be near field wireless communication. Further, the first communication and second communication may be performed via a live broadcast device or network. Also, the first communication and second communication may be cable communication which is performed via a cable. However, as described above the first communication is communication to exchange information for establishing the second communication, so it is desirable that the setting work for communication starting is easy or does not have to be performed at all, such as being able to readily identify the communication partner.

Figure 2:
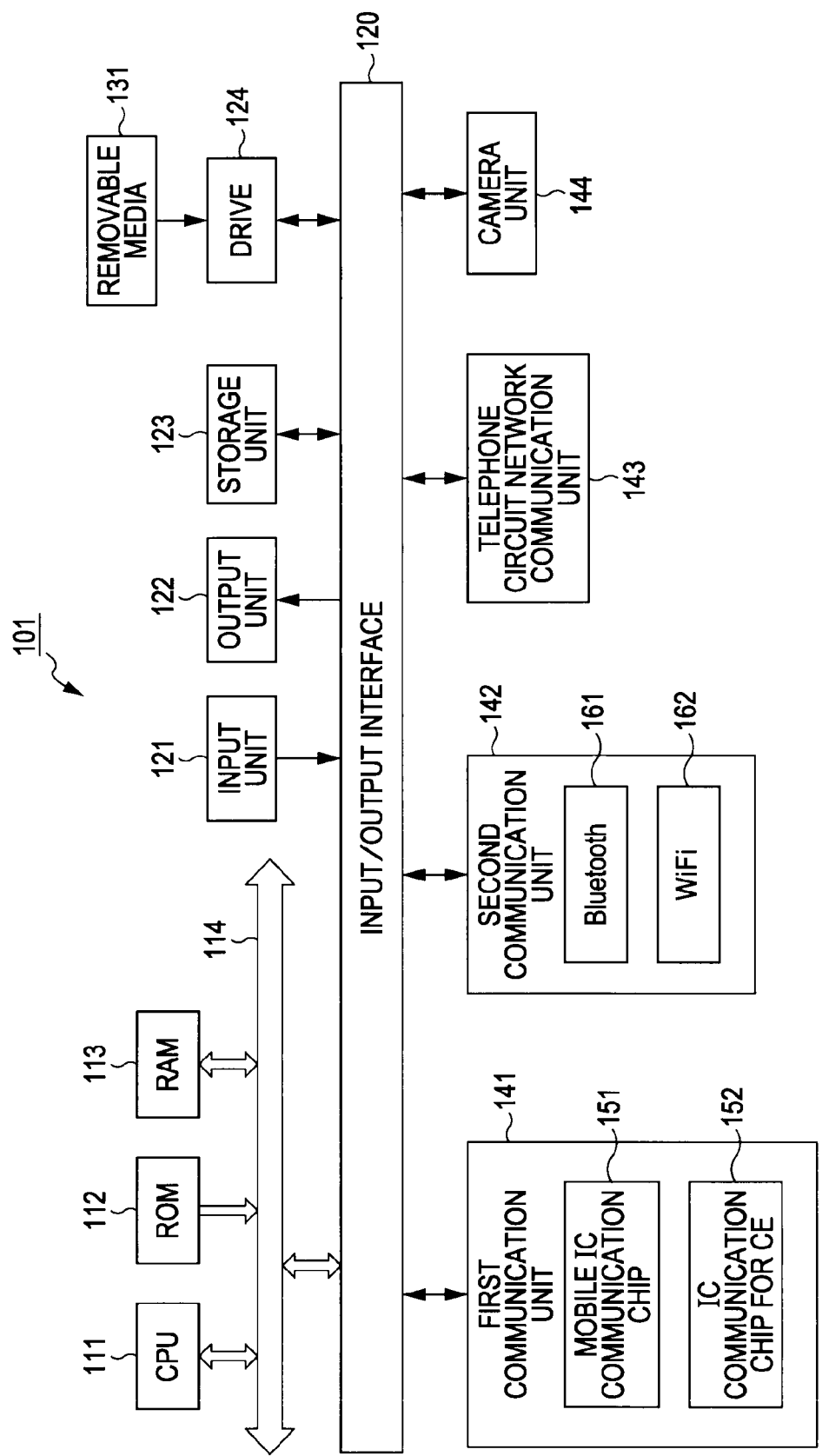
FIG. 2 is a block diagram illustrating a primary configuration example of the cellular phone in FIG. 1.

FIG. 2 is a block diagram illustrating an internal configuration example of the cellular phone 101 in FIG. 1. In FIG. 2, a CPU (Central Processing Unit) 111 of the cellular phone 101 is a computing processing unit that executes various types of processing by executing software programs. The CPU 111 is mutually connected with a ROM (Read Only Memory) 112 and RAM (Random Access memory) 113 via the bus 114. Software programs and data are stored beforehand in the ROM 112. Software programs and data that are stored in the ROM 112 and storage unit 123 are loaded in the RAM 113. Also, data for the CPU 111 to execute various types of process and so forth are also stored as appropriate in the RAM 113. Also, an input/output interface 120 is connected to the bus 114.

An input unit 121 made up of a keyboard, mouse, and so forth is connected to the input/output interface 120. Also, an output unit 122 made up of a display such as a CRT (Cathode Ray tube) display, LCD (Liquid Crystal Display) or the like, and speakers or the like, is connected to the input/output interface 120. Further, a storage unit 123 made up of a flash memory, hard disk, or the like is connected to the input/output interface 120.

A drive 124 is also connected to the input/output interface 120 as appropriate, removable media 131 such as a magnetic disk, optical disk, magneto-optical disk, semiconductor memory or the like is mounted as appropriate, and computer programs read therefrom are installed in the storage unit 123 as appropriate.

Further, a first communication unit 141 that performs the first communication and a second communication unit 142 that performs the second communication are connected to the input/output interface 120. Also, a telephone circuit network communication unit 143 that is made up of a modem or the like and that performs audio communication or packet communication with other devices via a public telephone network is connected to the input/output interface 120. Further, a camera unit 144 having a digital camera function that photographs a subject and obtains the image data thereof is connected to the input/output interface 120.

The first communication unit 141 is a wireless communication unit to perform close proximity wireless communication as described above. The first communication unit 141 has a mobile equipment IC communication chip 151 (hereafter called mobile IC communication chip 151) which is a wireless communication unit to perform communication with the communication method used for a non-contact IC card. Also, the first communication unit 141 has a digital home electronics IC communication chip 152 (hereafter called CE (Consumer Electronics) IC communication chip 152). The mobile IC communication chip 151 and CE IC communication chip 152 perform communication based on mutually different communication standards. The first communication unit 141 uses one of these selectively.

The second communication unit 142 is a wireless communication unit to perform the above-described near field wireless communication. The second communication unit 142 has a Bluetooth (registered trademark) unit 161 which is wireless communication unit to perform wireless communication with Bluetooth. Also, the second communication unit 142 has a WiFi unit 162 which is a WiFi accredited wireless communication unit to perform wireless communication with IEEE 802.11x. The second communication unit 142 uses one of these selectively.

Note that FIG. 2 is described such that two types of communication units can be provided to each of the first communication unit 141 and second communication unit 142, but the number (type) of communication units that each has may be any number. Also, the first communication unit 141 only has to perform the first communication, and the second communication unit 142 only has to perform the second communication. That is to say, the communication method of the communicating unit of the first communication unit 141 and second communication unit 142 is optional, and may be other than that which is described above.

Also, the cellular phone 101 may have a configuration other than that described above. Also, a portion of the functions such as the camera unit 144 may be omitted.

The cellular phone 102 serving as the communication partner of the cellular phone 101 also has basically the same configuration as the configuration of the cellular phone 101 described with reference to FIG. 2, so the description of the configuration of the cellular phone 102 is omitted. That is to say, the description in FIG. 2 can be applied to describing the configuration of the cellular phone 102 as well, so the cellular phone 102 will be described with reference to FIG. 2 as with the case of the cellular phone 101. This also holds true for the configurations shown in the later-described FIGS. 3 and 4 as well. Hereafter, the side requesting hand-over processing is described as the cellular phone 101 and the side responding thereto as the cellular phone 102, but there may be cases wherein the same device is at the requesting side and at the responding side according to the situation, and the configurations on the requesting side and the response side do not have to be different from each other. Accordingly, hereafter also, the configuration of the cellular phone 101 and cellular phone 102 are described as being basically the same mutually. That is to say, the description of the configuration of the cellular phone 101 is also applicable to the description of the cellular phone 102.

Figure 3:
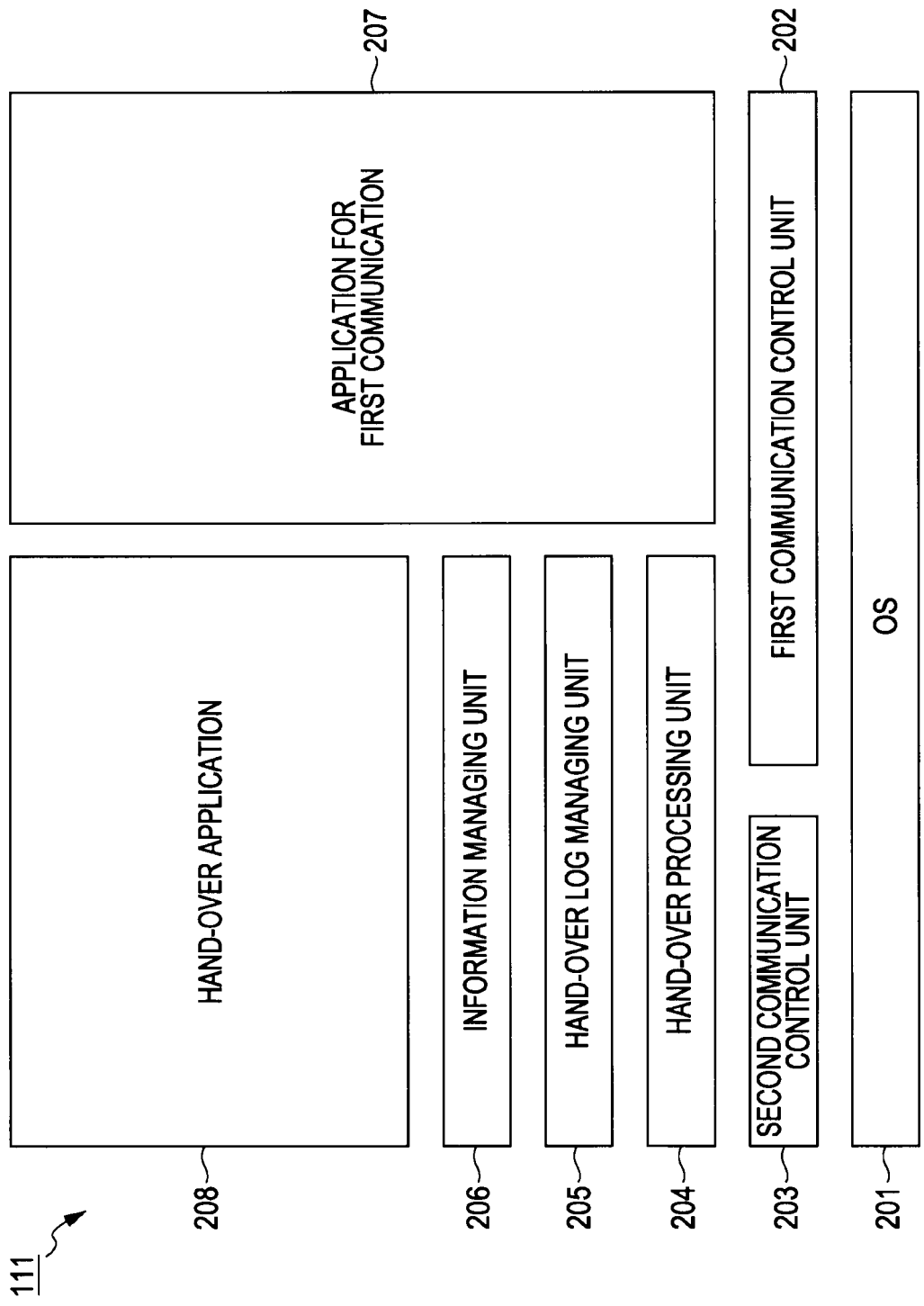
FIG. 3 is a function block diagram illustrating a functional example that the CPU in FIG. 2 can realize.

FIG. 3 is a functional block diagram showing the function that the CPU 111 has in FIG. 2 which executes the application. The CPU 111 reads in various types of data and executes programs, thereby realizing various types of functions. FIG. 3 schematically shows various types of functions thus realized.

The CPU 111 has an OS (Operating System) 201, first communication control unit 202, second communication control unit 203, hand-over processing unit 204, hand-over log managing unit 205, information managing unit 206, first communication application 207, and hand-over application 208.

The OS 201 is a basic software program that provides basic functions which are shared and used by many application software programs and manages the overall computer system. For example, the OS 201 controls the processing unit external to the CPU 111, based on instructions from other function blocks, and performs various control processing such as input/output functions such as user interface input and screen output, and disk and memory managing. The first communication control unit 202 controls the first communication unit 141 via the OS 201, and performs processing relating to the first communication. The second communication control unit 203 controls the second communication unit 142 via the OS 201, and performs processing relating to the second communication.

The hand-over processing unit 204 controls the first communication control unit 202 and second communication control unit 203, sends/receives setting information for the second communication using the first communication, and performs processing (hand-over processing) to establish a connection for the second communication using the information thereof, for example. The hand-over processing unit 204 also performs sending/receiving of equipment information and capability information using the first communication, in the event of this hand-over processing. The hand-over processing unit 204 appropriately performs second communication settings and application execution, based on this capability information.

The hand-over log managing unit 205 manages a log with processing content of the hand-over processing unit 204. The information managing unit 206 manages various types of information such as equipment information, capability information, and profile information exchanged with the communication partner. The profile information is information relating to the user of the device serving as the communication partner. Details thereof will be described later.

The first communication application 207 is an application providing services using only the first communication, such as electronic money settlement, authentication processing, and so forth. The hand-over application 208 is an application providing a service using the second communication, and is an application to perform hand-over processing to establish the second communication. That is to say, both the first communication and second communication are used for the hand-over application 208. A specific example of the hand-over application will be described later.

Note that in FIG. 3, the first communication application 207 is described as one functional block, but the number of first communication applications is optional, and the first communication application 207 may be made up of multiple types of applications. Similarly, the number of hand-over applications is also optional, and the hand-over application 208 may be made up of multiple types of applications.

Figure 4:
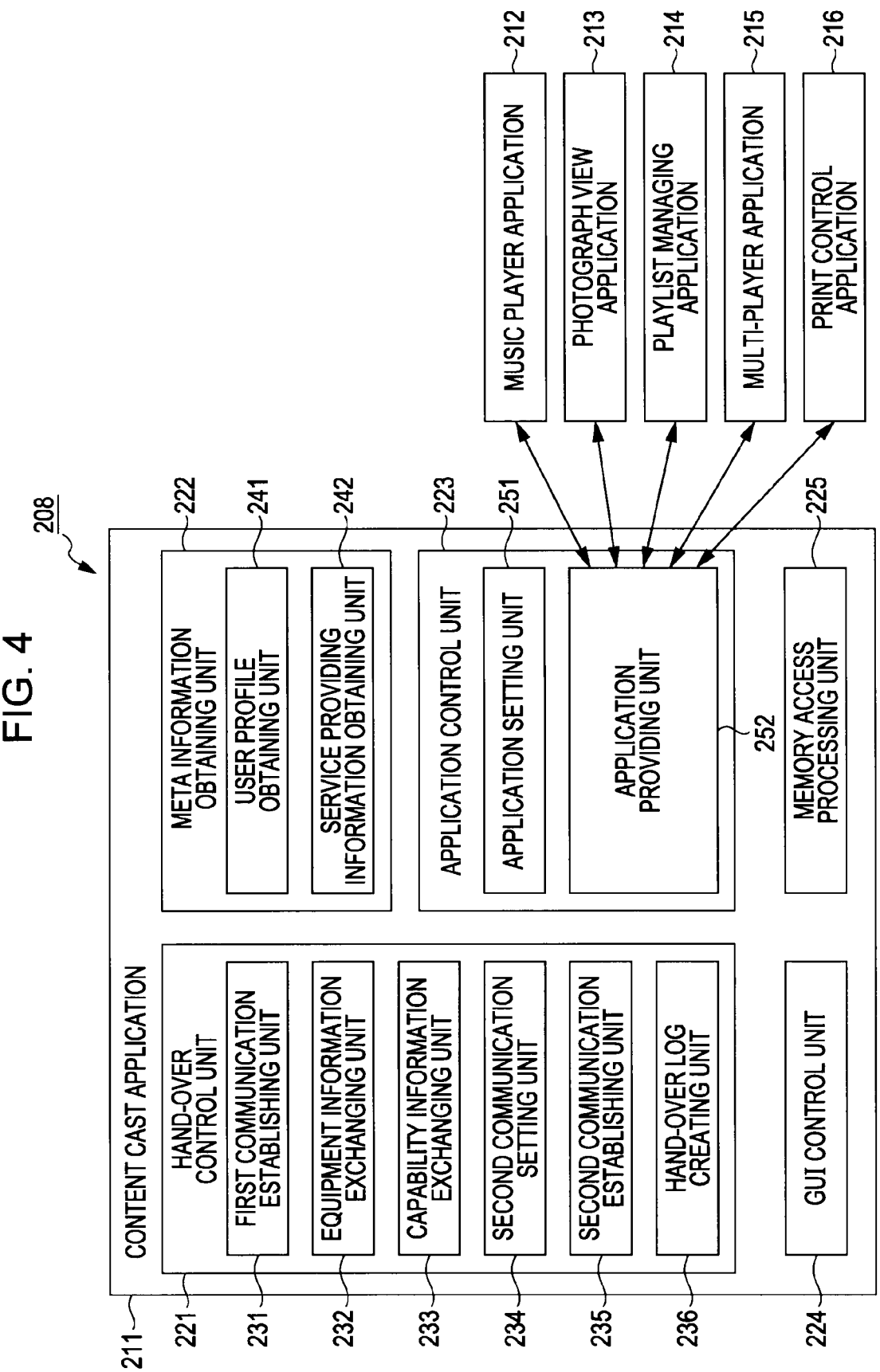
FIG. 4 is a diagram illustrating an example of the hand-over application in FIG. 3.

FIG. 4 is a block diagram schematically showing a configuration example of the hand-over application 208 in FIG. 3. In the case of the example in FIG. 4, the hand-over application 208 has a content cast application 211, music player application 212, photograph viewer application 213, playlist managing application 214, multi-player application 215, and print control application 216.

The content cast application 211 is an application to exchange content data such as images and audio with the device of a communication partner, using the second communication. The content cast application 211 operates in cooperation with other applications such as the musical player application 212 through print control application 216, and performs sending/receiving of content data for other applications.

The music player application 212 is an application that reads and plays music data stored in the storage unit 123 or the like, for example, and outputs the audio from a speaker or the like (output unit 122). The music player application 212 operates in cooperation with the content cast application 211, thereby enables supplying music data as streaming data to the device of the communication partner, using the second communication, and can output by playing the music with the device of the communication partner, or can obtain the streaming data (music data) supplied by the device of the communication partner and output this by playing the music thereof.

The photograph viewer application 213 is an application displaying image data such as a still image or moving image stored in the storage unit 123 or the like to a monitor (output unit 122), for example. The photograph viewer application 213 operates in cooperation with the content cast application 211, thereby enabling supplying the image data to the device of the communication partner, and obtaining the image data supplied by the device of the communication partner so as to display the image thereof on the monitor (output unit 122), using the second communication.

The playlist managing application 214 is an application to manage a playlist indicating the playing output request (display request) of the content data for playing output (displaying) by the music player application 212 and photograph viewer application 213. The playlist managing application 214 displays the playlist thereof on the monitor (output unit 122) and receives user instruction input as to the displayed playlist. Also, the playlist managing application 214 controls the music player application 212 and photograph viewer application 213, based on the instructions thereof. Further, the playlist managing application 214 operates in cooperation with the content cast application 211, whereby the music player application and photograph viewer application of the device of the communication partner can be controlled using the second communication. For example, the playlist managing application 214 supplies the music data specified by the user to the device of the communication partner using the content cast application 211, starts the music player application of the device of the communication partner, and outputs by playing the music thereof.

The multi-player application 215 is an application that outputs the music data by playing while processing multiple types of content data, such as displaying the image data corresponding to the music thereof on the monitor. That is to say, the multi-player application 215 basically has similar functions as the music player application 212 and photograph viewer application 213, and can exchange content data with the device of the communication partner, using the second communication, by operating in cooperation with the content cast application 211.

The print control application 216 is an application to print image data and text data and so forth on a printing medium such as paper with a printing unit (output unit 122). The print control application 216 can cause the printing unit to print the content data supplied by the device of the communication partner using the second communication, by operating in cooperation with the content cast application 211.

The content cast application 211 has a hand-over control unit 211, meta information obtaining unit 222, application control unit 223, GUI (Graphical User Interface) processing unit 224, and memory access processing unit 225.

Figure 5:
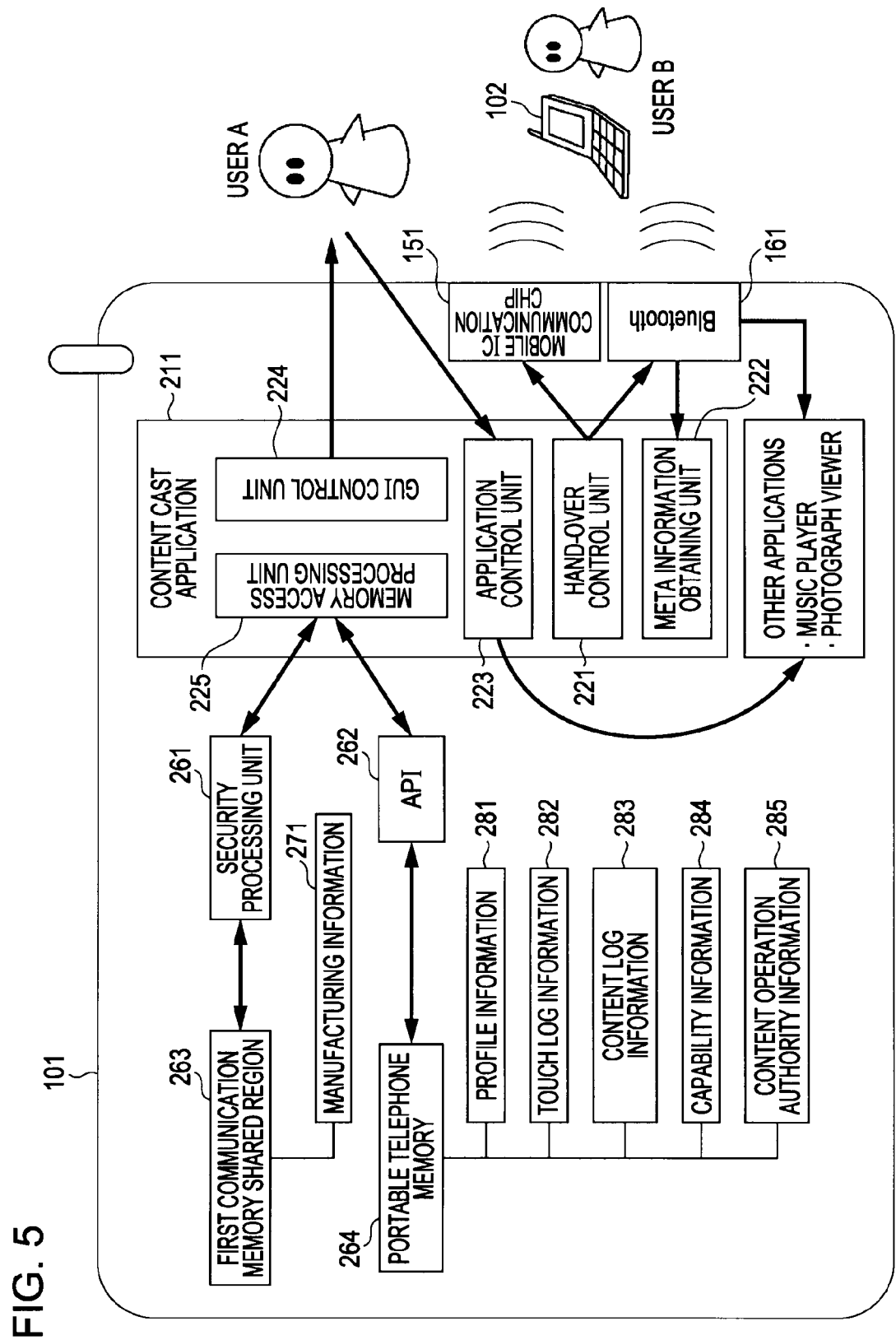
FIG. 5 is a diagram describing an example of the manner of operation of a hand-over application.

The hand-over control unit 221 controls the hand-over processing unit 204 through information managing unit 206 in FIG. 3. For example as shown in FIG. 5, the hand-over control unit 221 directly or indirectly controls the mobile IC communication chip 151 (first communication unit) and Bluetooth unit 161 (second communication unit), and executes processing relating to the hand-over. The hand-over control unit 221 has a first communication establishing unit 231 to perform processing relating to establishing a connection for the first communication, equipment information sending/receiving unit 232 to perform sending/receiving of equipment information with the first communication, capability information sending/receiving unit 233 to exchange mutual capability information with the first communication, second communication setting unit 234 to perform setting relating to the second communication based on equipment information and capability information, second communication establishing unit 235 to perform processing relating to establishing a connection for the second communication, and hand-over log creating unit 236 to create log information relating to the hand-over processing.

The meta information obtaining unit 222 directly or indirectly controls the Bluetooth unit 161 (second communication unit) as shown in FIG. 5 for example, and obtains meta information including user profile information which is information relating to the user of the communication partner, service cooperation information and so forth which is information relating to services and so forth provided by a device of the communication partner or another device operating in cooperation with the device thereof. As shown in FIG. 4, the meta information obtaining unit 222 has a user profile obtaining unit 241 that obtains user profile information (profile information) from the device of the communication partner and a service cooperation information obtaining unit 242 that obtains service cooperation information from the device of the communication partner.

For example as shown in FIG. 5, the application control unit 223 performs processing relating to another application operating in cooperation with the content cast application such as the music player application 212 through the printing control application 216. The application control unit 223 has an application setting unit 251 to perform settings of the other application based on capability information and the like of the device of the communication partner, and an application cooperating unit 252 that starts and controls the other application.

The GUI control unit 224 performs processing as to a GUI display of a content cast application and user instructions or the like input based on the GUI thereof, as shown in FIG. 5, for example. The memory access processing unit 225 performs input/output of information as to the storage region of the cellular phone 101. For example as shown in FIG. 5, the CPU 111 has a security processing unit 261 to perform processing such as encoding and decoding of information as to the memory (storage region) built in the first communication unit 141, and has an API (Application Program Interface) 262 as to a memory (storage region) other than the first communication unit 141 of the cellular phone 101 such as ROM 112 or the storage unit 123. The security processing unit 261 performs access to the first communication memory shared region 263 that is formed in the storage region of the memory built in to the first communication unit 141. The API 262 performs access to the cellular phone memory 264 that is formed on the storage region of the memory of other than the first communication unit 141 of the cellular phone 101.

Manufacturing information 271 such as the serial number, model, and date/time of manufacture for the device serving as the communication partner or the own device is stored in the first communication memory shared region 263. Profile information 281, touch log information 282, content log information 283, capability information 284, and content operating authority information 285 and so forth are stored in the cellular phone memory 264.

The profile information 281 includes information indicating features of the user himself/herself or communication partner, for example, also called "user profile information". The touch log information 282 includes log information of communication using the first communication unit 141, for example. The content log information 283 includes log information relating to content used, for example. The capability information 284 includes information for identifying a device and information indicating device features used at the time of second communication connection and time of application coordination (i.e. at time of second communication), for example. The content operating authority information 285 includes information indicating whether or not there is any content operating authority which is the authority to control the playing (distribution) of content belonging to a device that distributes data, for example. For example, a device having content operating authority can control a device that distributes data as to which content to distribute.

The memory access processing unit 225 accesses the first communication memory shared region 263 via the security processing unit 261 and accesses the cellular phone memory 264 via the API 262, as shown in FIG. 5, for example.

Next, a configuration example for various types of information exchanged between devices will be described with reference to FIG. 6. As shown in FIG. 6, the cellular phone 101 sends/receives equipment information, capability information, and content operating authority information with the first communication, and sends/receives profile information with the second communication.

Capability information is useful detailed information for the second communication connection made up of information indicating device features. The capability information is also called connection information. The capability information includes information such as address, protocol type, equipment type, profile, and application identifier or the like, for example.

The address is identifier information of a device on a communication network with the second communication, and is information that complies with communication protocols defined by protocol type. For example, the information may be made up of one or multiple addresses, such as a BD (Bluetooth Device) address, MAC (Media Access Control) address, or IP (Internetwork Protocol) address. It goes without saying that multiple types of identification information may be included.

The protocol type is information indicating the type of protocol that can be used, such as Bluetooth or WiFi, for example. The equipment type is information indicating the type (usage) of the device, such as a cellular phone, car navigation system device, personal computer (PC), or and so forth.

The profile is information indicating setting information (profile) that can be used for each protocol. The application identifier is identification information indicating the application that can be used. For example, this may be indicated by the type or name of the application, such as music player, photographs, games, and so forth, or may be indicated by a certain identification number. Also, the application identifier may also be used to identify the application version as well.

The profile information is made up of information indicating features of the device user. Profile information includes a user ID, nickname, profile photograph, occupation type, country, marital status, date of birth, postal code, address, telephone number, message, and so forth, for example. The user ID is an identifier to uniquely identify a user, while the other profile information items are information about the user, and are registered in the device beforehand by the user, for example.

The content operating authority information is information indicating whether or not there is any playing control authority which can authorize control of playing of the content on a device distributing data. For example, a device having content operating authority information that is set as having playing control authority has playing control authority, and even if the device distributing the data is another device, this device can control the content distributed by the other device.

The cellular phone 101 can readily comprehend the type of second communication that the device of the communication partner has, by exchanging capability information as well as equipment information with the cellular phone 102 which is the communication partner, and can more appropriately perform settings. Also, the cellular phone 101 can identify the application which can be executed by the device of the communication partner, by referencing the capability information of the communication partner, and the executable application can be readily selected and used according to the capability of the communication partner.

Note that the makeup of the capability information, profile information, and content operating authority information shown in FIG. 6 is only an example, and other unshown information may be included and a portion of the above-described information may be omitted. For example, the application managed with the capability information only has to execute predetermined processing based on the information exchanged with the communication partner, and for example, may be an application that sends/receives information via the first communication instead of the second communication, or even yet another communication. Also, for example, the communication method for the second communication may be fixed, and information relating to the communication method of the second communication in the capability information may be omitted.

Thus, the cellular phone 101 enables ease of processing to establish communication and start an application in the event of performing a hand-over, and can improve the usability of the application providing communication between devices.

A case of performing a role switch to switch the device distributing the data will be described, regarding a second communication network that is a network using the second communication generated as described above, and that distributes content data from one device to other devices by an application.

Figure 7B:
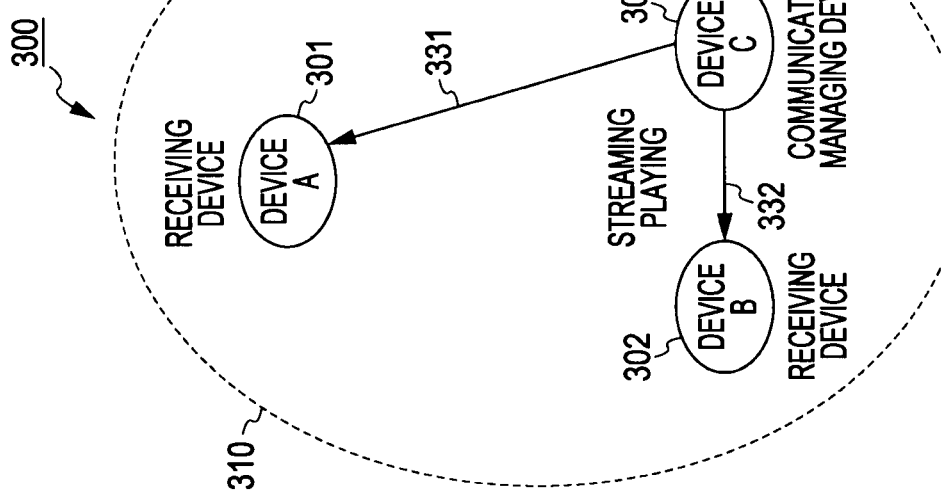
FIGS. 7A and 7B are diagrams illustrating a primary configuration example of a communication system to which the present invention has been applied.
Figure 7A:
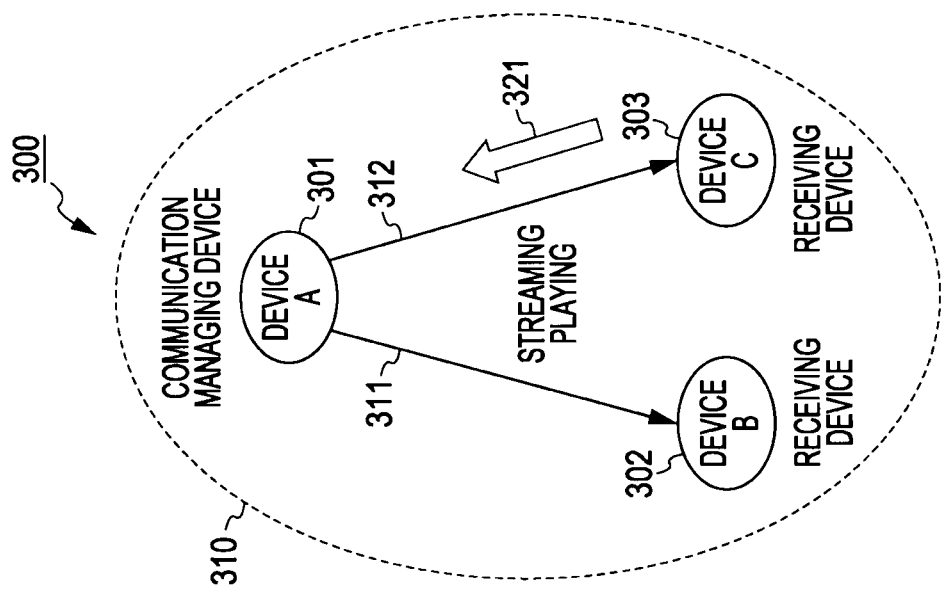

FIGS. 7A and 7B are diagrams showing an example of a communication system to which the present invention has been applied. As shown in FIG. 7A, with a communication system 300, devices A301, B302, and C303 have established a second communication network 310 beforehand which is a communication network with the second communication, using the method described with reference to FIGS. 1 through 6. The second communication network 310 is a system wherein the device A301 operates as a communication managing device and the devices B302 and C303 operate as receiving devices. That is to say, as indicated by the arrows 311 and 312, the device A301 performs streaming playing (data distribution) of content data such as music or movies for example, towards the devices B302 and C303. The devices B302 and C303 play while receiving the data thereof.

As shown in FIG. 7B, this second communication network 310 is changed to a communication network wherein the device C303 is the communication managing device. That is to say, the device C303 performs streaming playing (data distribution) of content data such as music or movies for example, towards the devices A301 and C303. The devices A301 and B302 operate as receiving devices, and play while receiving the data transmitted by the device C303.

In the event of switching the communication managing device (distribution source of streaming data) to another device, with the method described with reference to FIGS. 1 through 6, even if the device C303 is operated, a communication connection can be established with the method described with reference to FIGS. 1 through 6 by touching (positioning near) anew with the devices A301 and B302, but the communication between the devices A301 and B302 is not controlled. Also, even if the device A301 is operated, a communication connection can be established with the method described with reference to FIGS. 1 through 6 by touching (positioning near) anew with the devices B302 and C303, but the communication between the devices B302 and C303 is not controlled.

In the case that three or more devices form the second communication net, switching the communication managing device with the method described with reference to FIGS. 1 through 6 is difficult.

Thus, with the communication system 300, the processing is performed as described below. First, as indicated by the arrow 321 in FIG. 7A, the device C303 issues a role-switch command to the device A301 which is currently the communication managing device requesting a switch in communication managing devices.

The device A301 obtaining the role switch command disconnects from the second communication with the device B302, based on the request thereof. Further, the device C303 establishes a connection of second communication with the device B302. Thus, the second communication network 310 is formed with the device C303 as the center thereof, whereby the device C303 begins streaming data distribution as to the devices A301 and B302, as indicated by the arrows 331 and 332 in FIG. 7B.

Thus, the communication managing device can be readily switched from the device A301 to the device C303. That is to say, the distribution source of the content data can be readily changed, and the usability of the application providing communication between devices can be improved.

A specific method thereof will be described next. FIGS. 8A through 8C are functional block diagrams showing a configuration example of the content cast application 211 belonging to the devices A301, B302, and C303 in FIGS. 7A through 7C. The devices A301 through C303 have basically the same configuration as the cellular phone 101 in the case described with reference to FIGS. 1 through 6. That is to say, the devices A301, B302, and C303 may be any sort of device, but have a first communication unit 141 and second communication unit 142 as shown in FIG. 2, and have a function block as shown in FIG. 3. That is to say, devices A301, B302, and C303 have a hand-over application 208 of the configuration as shown in FIG. 4, and have a content cast application 211.

FIG. 8A shows a configuration example of the content cast application 211 of the device A301. FIG. 8B shows a configuration example of the content cast application 211 of the device B302. FIG. 8C shows a configuration example of the content cast application 211 of the device C303. The portions that a similar to the configuration described with reference to FIG. 4 have the same reference numerals appended thereto.

That is to say, as shown in FIG. 8A, as a function of the content cast application, the device A301 has a master changing processing unit 410, hand-over control unit 221, application control unit 223, GUI control unit 224, and memory access processing unit 225.

The master changing processing unit 410 is a processing unit to perform processing for the current master (communication managing device) in the second communication network 310, and performs processing relating to changing the master (communication managing device). The master changing processing unit 410 has an upgrading allowing unit 411, change confirming unit 412, second communication control unit 413, and profile processing unit 414.

The upgrading allowing unit 411 accepts a master (communication managing device) upgrading request from a receiving device, and allows or denies the request thereof. The change confirming unit 412 confirms the master change to the receiving devices other than the request source. The second communication control unit 413 disconnects the second communication with the device B302 which is a receiving device not upgrading to the master. The profile processing unit 414 sends/receives profile information with the other devices forming the second communication network 310 after the master change, and synchronizes the content thereof. That is to say, the profile processing unit 814 performs processing to share the mutual profile information.

As shown in FIG. 8B, as a function of the content cast application 211, the device B302 has a master changing processing unit 420, hand-over control unit 221, application control unit 223, GUI control unit 224, and memory access processing unit 225.

The master changing processing unit 420 performs processing relating to changing a receiving device that is not upgraded to the master (not requested), i.e. the master (communication managing device) as a receiving device that is not the request source of upgrading to master. The master changing processing unit 420 has a change allowing unit 421, second communication control unit 422, and profile processing unit 423.

The change allowing unit 421 receives the master change (confirmation) request supplied by the device A301 which is the master before changing, determines whether or not the change can be made as to the request, and responds with the determination results. The determining method as to whether or not the change can be made is optional, but for example may be determined based on user instructions. The second communication control unit 422 establishes a second communication connection with the device C303 which is the receiving device that is upgraded to the master. After the master change, the profile processing unit 423 performs sending/receiving of profile information with other devices making up the second communication network 310, and synchronizes the content thereof. That is to say, processing is performed in order to share mutual profile information.

As shown in FIG. 8C, as a function of the content cast application 211, the device C303 has a master changing processing unit 430, hand-over control unit 221, application control unit 223, GUI control unit 224, and memory access processing unit 225.

The master changing processing unit 430 performs processing relating to changing the master (communication managing device) as the receiving device of the request source of the master change. The master changing processing unit 430 has a change instruction receiving unit 431, upgrading requesting unit 432, upgrading processing unit 433, second communication control unit 434, and profile processing unit 435.

The change instruction receiving unit 431 displays a GUI screen on a monitor, for example, and receives master change instructions from the user or the like for example. The upgrading requesting unit 432 requests upgrading to a master (switching the master) as to the device A301 which is the current master. The upgrading processing unit 433 performs processing to upgrade the device C303 to a master in the case that the request has been acknowledged. That is to say, the device C303 is changed from a receiving device to the communication managing device 301. The second communication control unit 434 establishes a second communication connection with the device B302 which is a receiving device that has not been upgraded to a master. After the master change, the profile processing unit 435 performs sending/receiving of profile information with the other device making up the second communication network 310, and synchronizes the content thereof. That is to say, the profile processing unit 835 performs processing to share the mutual profile information.

Next, an example of processing flow in the master upgrading of the device C303 such as that shown in FIGS. 7A and 7B will be described with reference to the flowcharts in FIGS. 9 and 10. Note that description will be made with reference to FIGS. 11 through 14 as appropriate.

First, in the state shown in FIG. 7A, in step S101 the application of the device A301 performs content data transmission for the streaming playing of the content data (streaming playing/transmission). A case of streaming playing of song data will be described below, using song data as an example of content data. That is to say, as an example of the application, the music player application 212 will be used for description. It goes without saying that the content for streaming playing may be any content such as moving images, still images, multi-media content and so forth, and the application is also optional.

Figure 11:
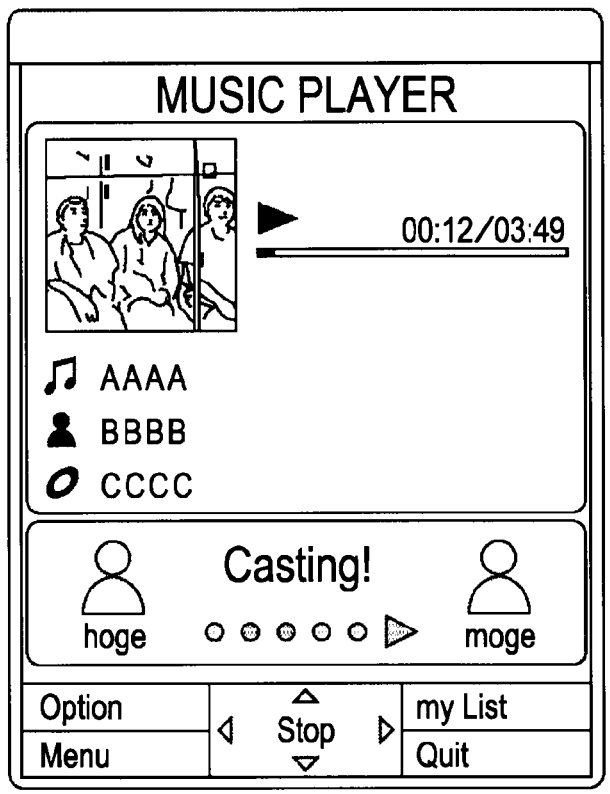
FIG. 11 is a diagram illustrating a screen example.

A GUI indicating that the song data is being transmitted, such as that shown in FIG. 11 for example, is displayed on the monitor of the device A301.

Figure 12:
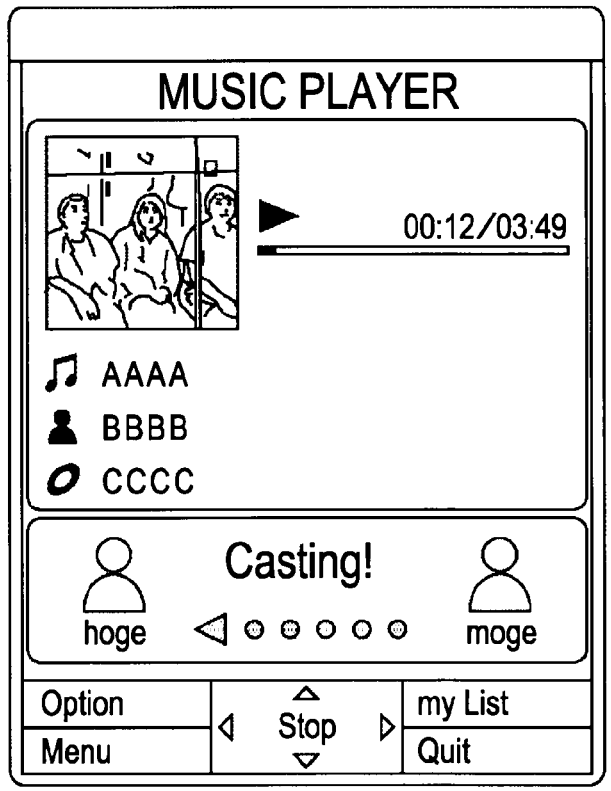
FIG. 12 is a diagram illustrating a screen example.

In step S141, the music playing application 212 of the device B302 plays while receiving the song data distributed by the device A301 (streaming playing/receiving). A GUI as shown in FIG. 12 for example showing that music data is in process of being received/playing is displayed on the monitor of the display device B302.

In step S121, the music player application 212 of the device C303 plays while receiving the song data distributed by the device A301 (streaming playing/receiving). A GUI, such as that shown in FIG. 12 for example, indicating that the song data is being received/played is displayed on the monitor of the device C303 at this time.

Figure 13:
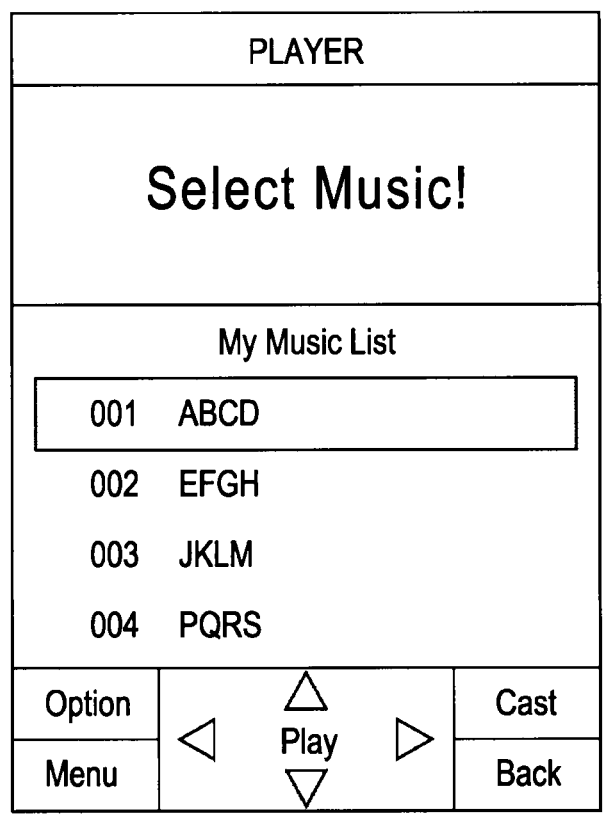
FIG. 13 is a diagram illustrating a screen example.

In this state, let us say that the user displays a GUI screen, such as that shown in FIG. 13 for example, on the monitor of the device C303, operates the GUI screen thereof, and displays a song name list of the song data stored in the device C303. Upon the user selecting one of the songs therein to play, the change instruction receiving unit 431 of the device C303 receives the selection thereof in step S122 as the master change instructions.

In a system such as that shown in FIGS. 7A and 7B, distribution of the song data can only be performed by the device A301 which is the master. That is to say, the device C303 which is a receiving device is not capable of performing distribution of song data that the device C303 itself has. In order to distribute the song data itself that the device C303 itself has, the device C303 has no option but to upgrade to a master. Accordingly, at the point-in-time that the user selects playing of the song data stored in the device C303, the change instruction receiving unit 431 considers this to be an request for upgrading to a master, and in step S123 performs the master upgrading request as to the device A301, corresponding to the request thereof. The upgrading allowing unit 411 of the device A301 obtains this request in step S102.

Figure 14:
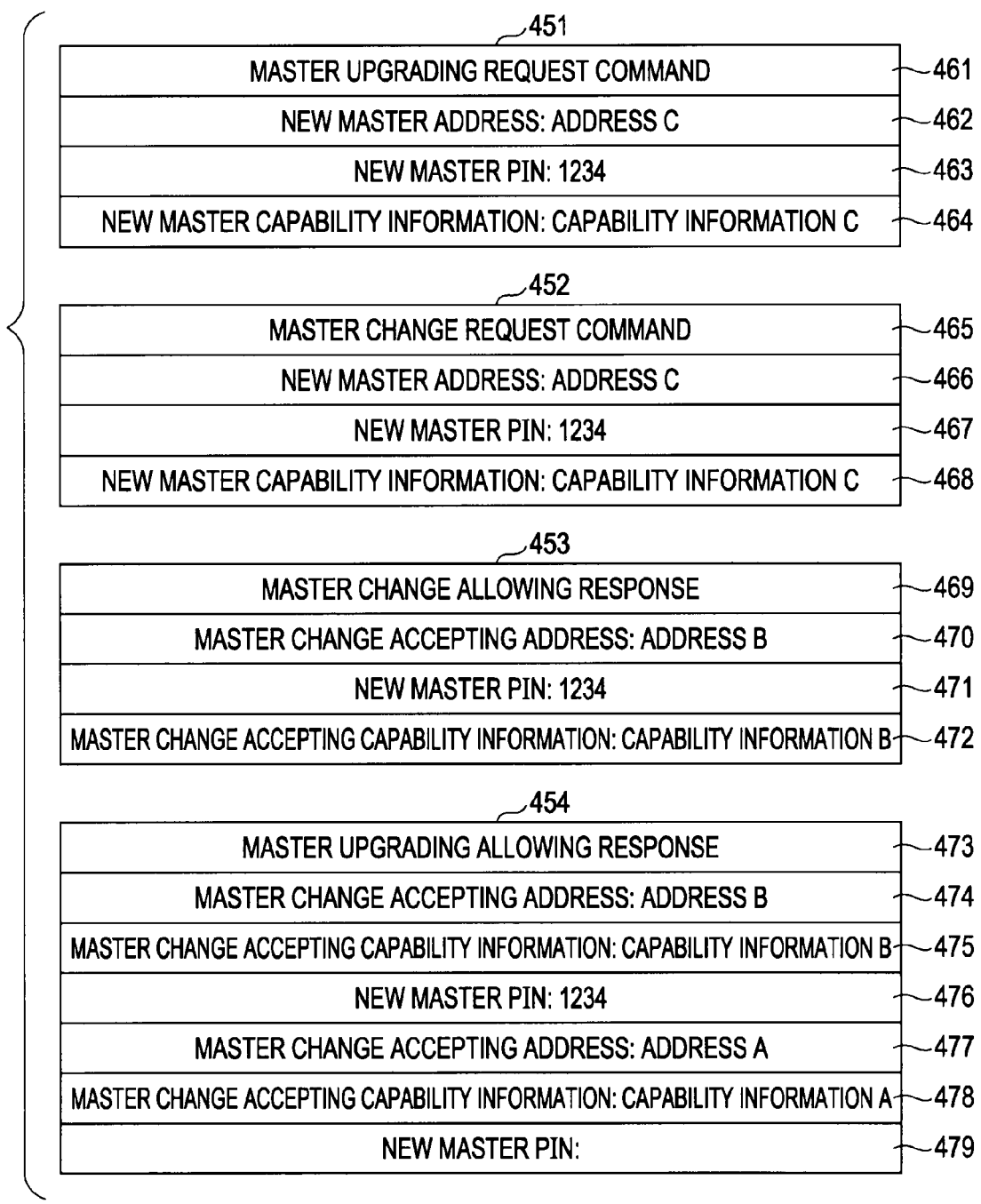
FIG. 14 is a diagram illustrating a configuration example of data that is exchanged.

The master upgrade request 451 in FIG. 14 is a diagram showing a configuration example of a request transmitted from the device C303 to the device A301 in step S123. In FIG. 14, the master upgrade request 451 has a master upgrading requested command 461, new master address 462, new master PIN (Personal Identification Number) 463, and new master capability information 464.

The master upgrading requested command 461 is an requesting command to request upgrading to a master. The new master address 462 is equipment information, and in the case that the request is allowed, is an address (identification information) of the device to be the new master after the master updating. In the case of the example in FIG. 14, the address C which is the address of the device C303 is provided as the new master address 462. The new master PIN 463 is a passkey for confirming a session. This is identification information for confirming which request to respond to and so forth depending on the value of the new master PIN 463. In the case of the example in FIG. 14, the new master PIN 463 is generated by the device C303 which requests the upgrade. Let us say that the value "1234" is provided here as the new master PIN 463. Note that the new master PIN 463 may be any value, and the data length is also optional. The new master capability information 464 is capability information of a device operating as the new master after the master change. In the case of the example in FIG. 14, the capability information C which is the capability information of the device C303 is provided as the master capability information 464.

Returning to FIG. 9, in step S103 the change confirming unit 812 transmits the master change request as to the device B302 which is a receiving device not upgrading to a master, thereby confirming whether or not the master can be changed to the device C303.

The master change request 452 in FIG. 14 is a diagram illustrating a configuration example of an request transmitted from the device A301 to the device B302 in step S103. In FIG. 14, a master change request command 465, new master address 466, new master PIN 467, and new master capability information 468 are included in the master upgrade request 451.

The master change request command 865 is a command requesting the confirmation of whether or not the master can be changed. The new master address 866 is equipment information, and is an address (identification information) of the device to be the new master after master upgrading. In the case of the example in FIG. 14, the address C which is the address of the device C303 is provided as a new master address 466. The new master PIN 467 is a passkey for confirming a session. In the case of the example in FIG. 14, the new master PIN 467 is provided the value "1234" similar to the new master PIN 463. The new master capability information 468 is capability information of the device operating as the new master after master updating. In the case of the example in FIG. 14, the capability information C is provided as the master capability information 468.

Returning to FIG. 9, the change allowing unit 421 of the device B302 obtains the request thereof in step S142. Upon determining whether or not the change can be made, in step S143 the change allowing unit 421 supplies a master change allowing response to the device A301 as a response to the request.

A master change allowing response 453 in FIG. 14 is a diagram showing a configuration example of a request transmitted from the device B302 to the device A301 in the step S143. In FIG. 14, a master change allowing response 469, master change reception address 470, new master PIN 471, and master change acceptance capability information 472 are included in the master change allowing response 453.

A master change allowing response 469 is a response allowing the master change. The master change receiving address 470 is equipment information, and is an address (identification information) of the device allowing the master change, i.e. the transmission source of this master change allowing response 853. In the case of the example in FIG. 14, the address B which is the address of the device B302 is provided as the master change receiving address 470. The new master PIN 471 is a passkey for confirming a session. In the case of the example in FIG. 14, the new master PIN 471 is provided with the value "1234" which is the same as that of the new master PIN 463. The master change acceptance capability information 472 is capability information of the device operating as the new master after the master upgrading. In the case of the example in FIG. 14, the capability information B which is the capability information of the device B302 is provided as master change acceptance capability information 472.

The change confirming unit 412 of the device A301 obtains the response thereof in step S104.

Upon obtaining the master change allowing response which allows the master change, in step S105 the second communication control unit 413 of the device A301 disconnects the second communication with the device B302 which is a receiving device not upgrading to a master (that is not the request source of the master upgrade). In step S106, the upgrade allowing unit 411 supplies the response of allowing the master upgrading as to the device C303 which is the receiving device of the request source.

A master upgrading allowance 454 in FIG. 14 is a diagram showing a configuration of a response transmitted from the device A301 to the device C303 in step S106. In FIG. 14, a master change allowing response 473, master change receiving address 474, master change acceptance capability information 475, new master PIN 476, master change receiving address 477, master change acceptance capability information 478, and new master PIN 479 are included.

The master change allowing response 473 is a response allowing upgrade to a master. The master change receiving address 474 is equipment information, and is an address (identification information) of the device allowing the master change. In the case of the example in FIG. 14, the address B is provided as the master change receiving address 474. The master change acceptance capability information 875 is capability information of the device allowing the master change. In the case of the example in FIG. 14, the capability information B is provided as the master change acceptance capability information 475. The new master PIN 476 is a passkey for confirming a session. In the case of the example in FIG. 14, the new master PIN 476 is provided the value "1234" which is the same as the new master PIN 463.

Information of the other receiving devices allowing the master change is input in the master change receiving address 477, master change acceptance capability information 478, and new master PIN 479. In the case of the example in FIG. 14, the information of device A301 is input. That is to say, for all of the receiving devices of the second communication network 310, an address, capability information, and master PIN are stored in the master upgrading allowance 454. However, the device A301 has been a master so the new master PIN can be omitted.

Note that upon the user of the device B302 denying the master change, in step S143 a master change denial response indicating denial of the master change, instead of a master change allowing response, is transmitted to the device A301. Upon the change confirming unit 412 of the device A301 obtaining the master change denial response in step S104, the processing in step S105 by the second communication control unit 413 is omitted, and the processing is advanced to step S106. In step S106 the upgrading allowing unit 811 supplies the response of master upgrading denial as to the device C303 which is the receiving device of the request source. The denial response ends the series of processing. That is to say, in the case the device C303 is not upgradeable to a master.

The upgrading requesting unit 432 of the device C303 obtains the response thereof in step S124.

Figure 10:
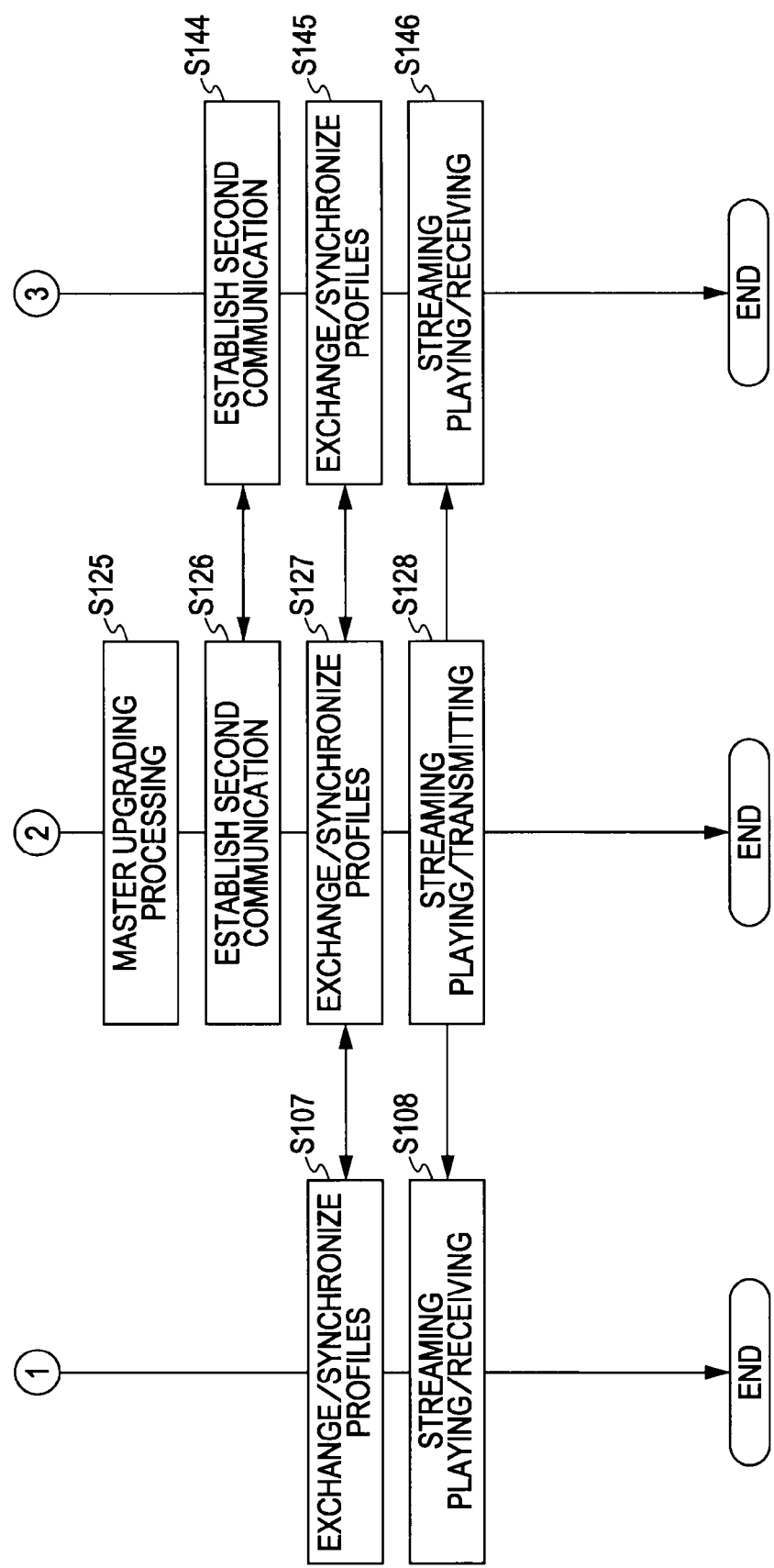
FIG. 10 is a flowchart following FIG. 9 describing the flow of processing of a roll switch.

Upon obtaining the master upgrading allowance, the upgrading processing unit 433 of the device C303 upgrades the device C303 to a master in step S125 of FIG. 10. Upon upgrading to a master, the second communication control unit 434 of the device C303 establishes a second communication connection with the device B302 which is the receiving device that has been disconnected from the second communication with the device A301. Corresponding to this processing, in step S144 the second communication control unit 422 of the device B302 also establishes a second communication connection with the device C303.

Upon the second communication network wherein the device C303 is the master being established, in step S127 the profile processing unit 423 of the device C303 exchanges and synchronizes profile information with the devices A301 and B302. Corresponding to this processing, in step S107 the profile processing unit 414 of the device A301 exchanges and synchronizes profile information. Also, in step S145 the profile processing unit 435 of the device B302 exchanges and synchronizes profile information. That is to say, hereafter the devices A301 through C303 share the newest profile information of one another.

In step S128, the music player application 212 of the device C303 which is the new master performs transmission of song data for the streaming playing of the content data (streaming playing/transmission). A GUI, such as that shown in FIG. 11 for example, indicating that song data is being transmitted is displayed on the monitor of the device C303 at this time.

In step S146, the music player application 212 of the device B302 plays while receiving the song data distributed by the device C303 (streaming playing/receiving). A GUI, such as that shown in FIG. 12 for example, indicating that song data is being received/played is displayed on the monitor of the device B302 at this time.

In step S108, the music player application 212 of the device A301 plays while receiving the song data distributed by the device C303 (streaming playing/receiving). A GUI, such as that shown in FIG. 12 for example, indicating that song data is being received/played is displayed on the monitor of the device A301 at this time.

Thus, the device A301 which had been the master before the change disconnects the second communication with the device B302, based on the master upgrading request obtained from the device C303 which is the device of the request source for master upgrading. Thus, the communication between the devices A301 and B302 which had not been controllable by the device C303 can be disconnected, and a role switch such as that described with reference to FIGS. 7A and 7B can be realized with a simpler process. Thus, the usability of the application providing communication between devices can be improved.

A case wherein three devices make up the second communication network 310 is described above, but should not be limited to this, and the number of devices is optional. For example, four or more devices may be used.

For example, as shown in FIG. 15A, in the case that the devices making up the second communication network 310 is the four devices of the devices A301 through D305, when upgrading the device C303 to a master, the master requests a master upgrading request to the device A301 which is a master, as indicated by the arrow 321. The device A301 disconnects the second communication with the device B302 and D304 according to the request thereof. The device C303 is upgraded to a master, and as shown in FIG. 15B the second communication is established with the devices B302 and D304.

The device C303 at this time transmits a role-switch command (master upgrading request command) as to the device A301, and established a second communication connections with the device B302. Accordingly, except for establishing the second communication connection with also the device D304, the processing in the device C303 is similar to the case described with reference to FIGS. 7 through 14. Also, establishing the second communication connection with the device C304 is also similar to the case as to the device B302.

Also, the device A301 receives the request from the device C303, confirms with the device B302 as to whether or not the device C303 can be upgraded; upon permission being given the device C303 is notified with this information, and the second communication with the device B302 is disconnected. Accordingly, in addition to the above-described processing, the processing of the device A301 in the case herein is similar to the case described in reference to FIGS. 7 through 14, except for confirming whether or not the device C304 can be upgraded and disconnecting the second communication with the device D304. Also, the processing as to the device D304 is also similar to the processing as to the device B302.

Further, the device B302 determines whether or not the device C303 can be upgraded, according to the request from the device A301, and responds with the determination result thereof. The device B302 then disconnects the second communication with the device A301, and establishes a second communication connection with the device C303. That is to say, the processing of the device B302 is similar to the case described with reference to FIGS. 7A through 14. Note that the processing executed by the device D304 is similar to the processing that device B executes.

That is to say, even if the number of receiving device making up the second communication network increases to five or more devices, only the number of devices similar to the device B302 is increasing, and the basic processing flow is similar to the case described with reference to FIGS. 7A through 14.

Accordingly, the function blocks of the devices A301 through C303 is similar to the case described with reference to FIGS. 8A through 8C, whereby the description thereof is omitted. Note that the device D304 has a function block similar to the device B302.

The processing flow of the system shown in FIGS. 15A and 15B will be described in detail with reference to the flowchart in FIGS. 16 and 17.

Figure 16:
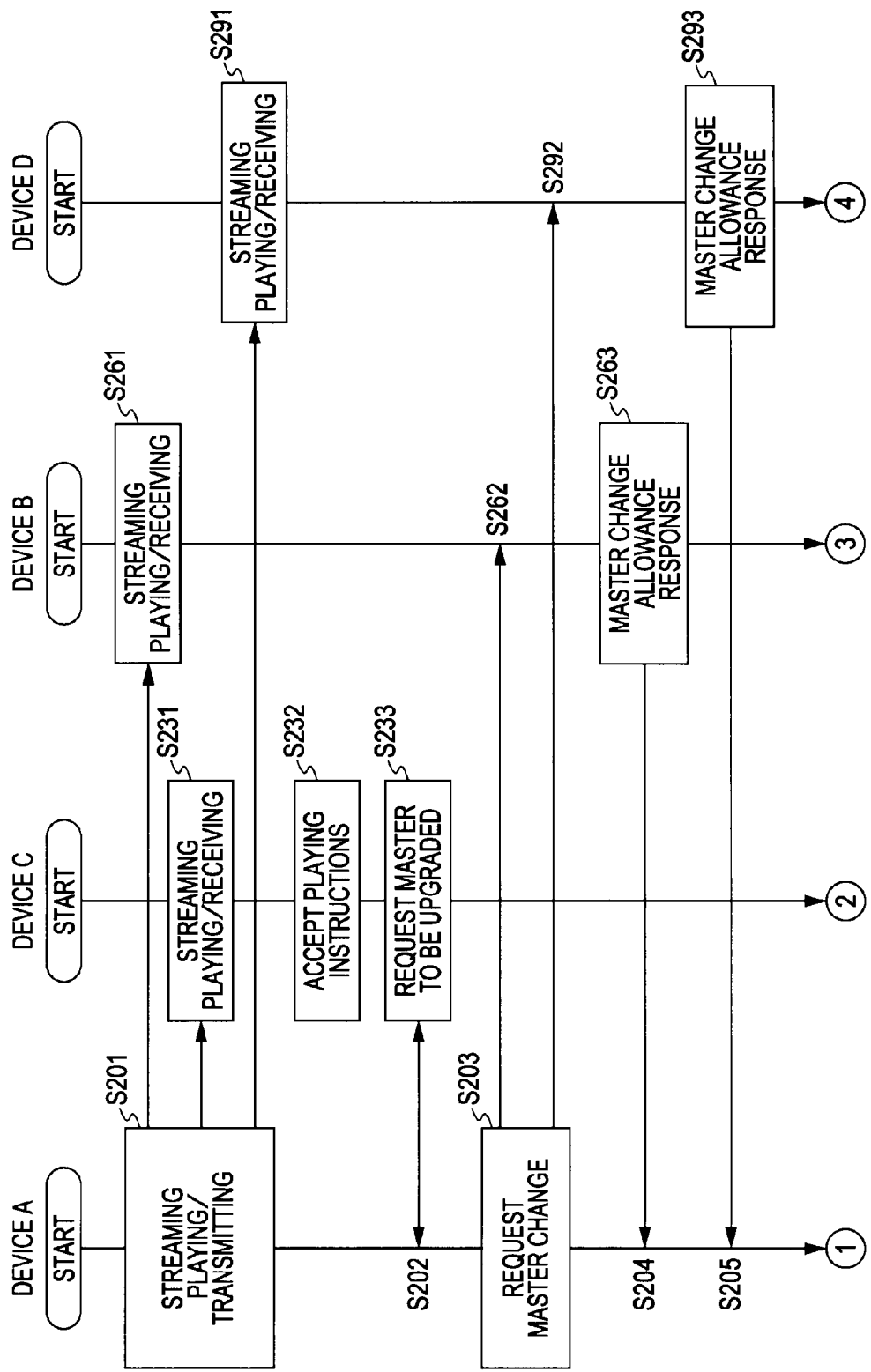
FIG. 16 is a flowchart describing the flow of processing of a roll switch.
Figure 17:
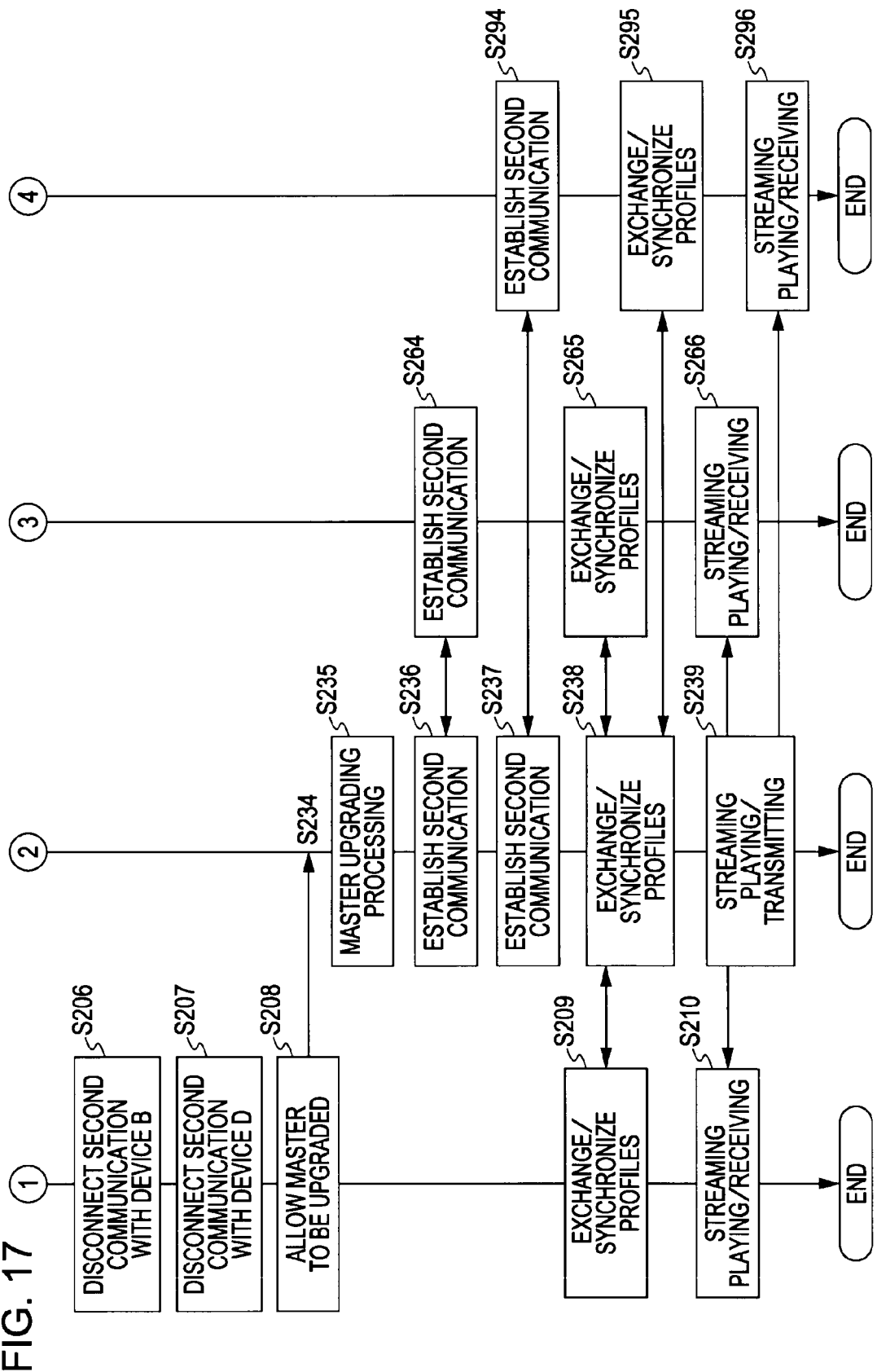
FIG. 17 is a flowchart following FIG. 16 describing the flow of processing of a roll switch.

As shown in FIGS. 16 and 17, the device D304 executes the various processing in steps S291 through S296 similar to device B302 executing the various processing in steps S261 through S266.

Also, the devices A301 and C303 perform the processing performs as to the device B302 also as to the device D304. Other processing by the devices A301 and C303, and the processing the device B302, are executes similar to the case described with reference to the flowcharts in FIGS. 9 and 10.

For example, the music player application 212 of the device A301 performs distribution (streaming playing/transmission) of the streaming data (song data) to the device D304 as well as to the devices B302 and C303. At this time, a GUI showing that the song data is being transmitted, such as that shown in FIG. 11 for example, is displayed on the monitor of the device A301.

Figure 9:
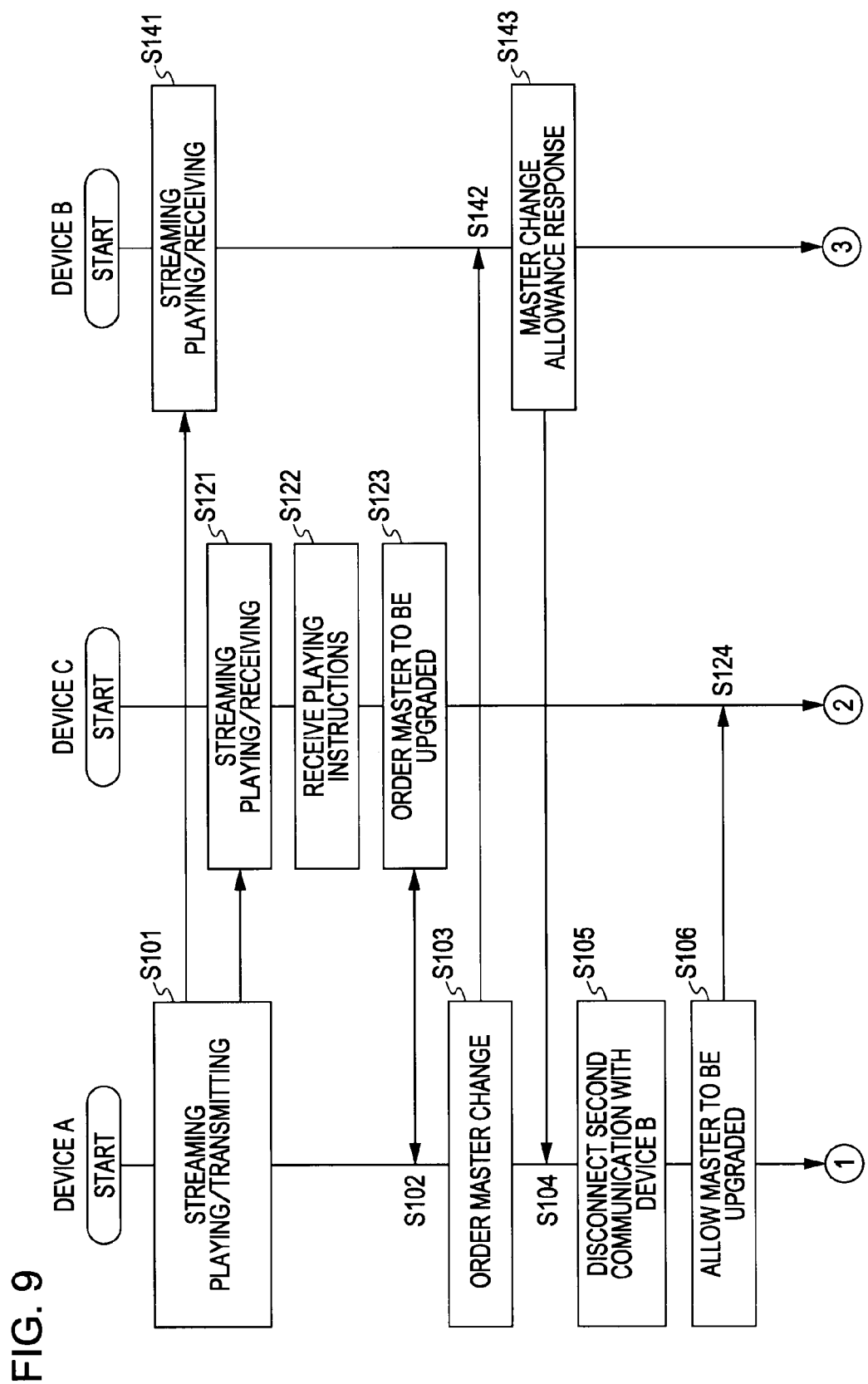
FIG. 9 is a flowchart describing the flow of processing of a roll switch.

The music player 212 of the device B302 plays while receiving the song data thereof in the step S261 corresponding to the step S141 in FIG. 9 (streaming playing/receiving). Similarly, in step S231 which corresponds to step S121 in FIG. 9, device C303 plays while receiving the song data that the device A301 distributes (streaming playing/receiving). A GUI showing that the song data is being received/played, such as that shown in FIG. 12 for example, is displayed on the monitors of each of the devices B302 through D304.

In this state, let us say that the user displays a GUI screen, such as that shown in FIG. 13 for example, on the monitor of the device C303, operates the GUI screen thereof, and displays a song name list of the song data stored in the device C303. Upon the user selecting one of the songs therein to play, in step S232 which corresponds to step S122 in FIG. 9 the change instruction receiving unit 431 of the device C303 accepts the selection thereof in step S622 as the master change instructions.

In the case shown in FIGS. 15A and 15B also, similar to the case in FIGS. 7A and 7B, distribution of the song data can only be performed by the device A301 which is a master. Accordingly, the change instruction receiving unit 431 of the device C303 may be regarded as having performed a master upgrade request at the point in time of the user selecting the playing of song data stored in the device C303. The change instruction receiving unit 431 performs a master upgrade request to the device A301 in step S232 which corresponds to step S123 in FIG. 9, as to the request thereof. The upgrading allowing unit 411 of the device A301 obtains the master upgrading request thereof in step S202 which corresponds to step S102 in FIG. 9.

Figure 18:
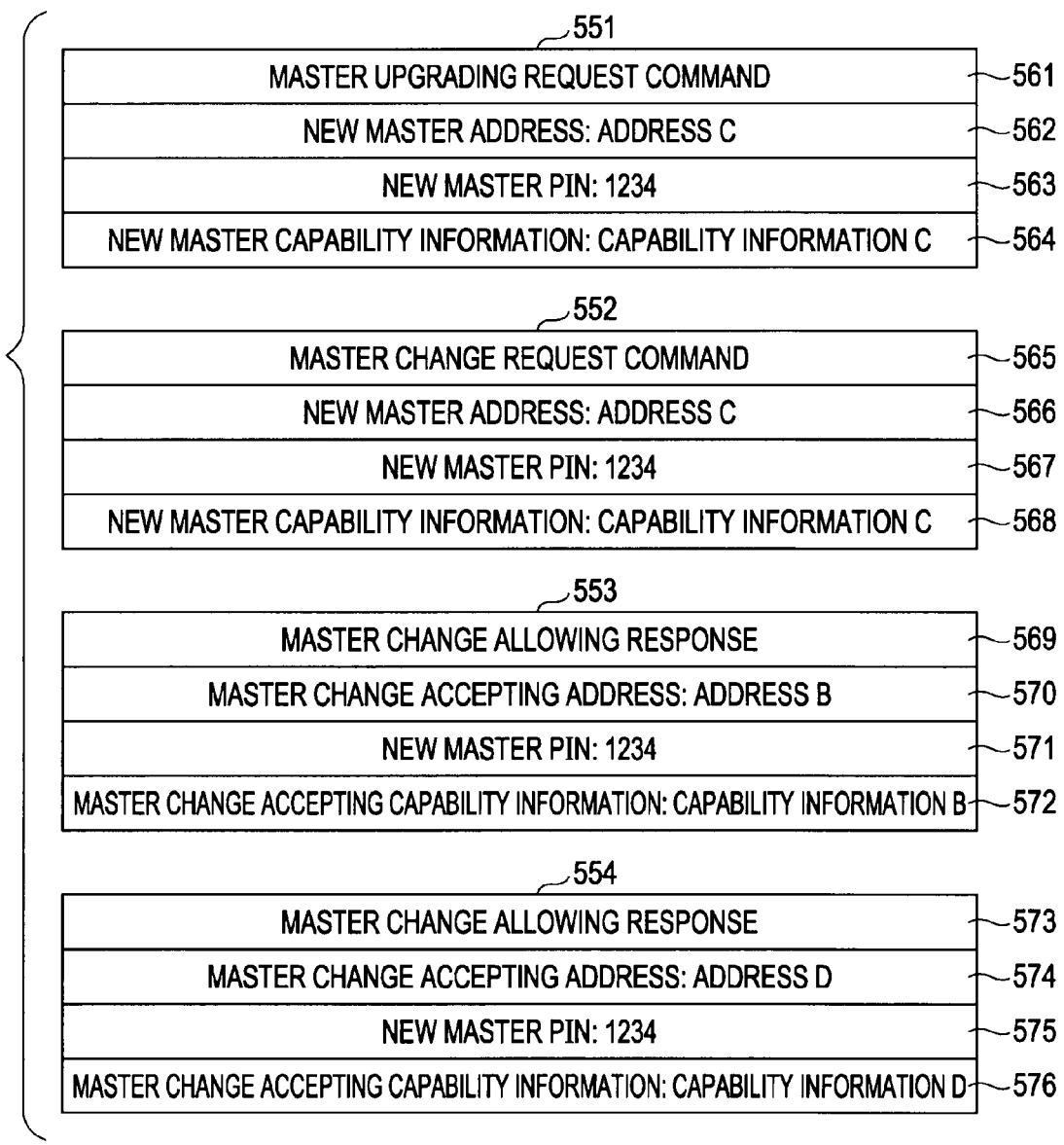
FIG. 18 is a diagram illustrating a configuration example of data that is exchanged.

As shown in FIG. 18, the master upgrading request 551 in this case is similar to the master upgrading request 451 described with reference to FIG. 14. That is to say, the master upgrading request 551 includes a master upgrading request command 561 similar to the master upgrading request command 461, a new master address similar to the new master address 462, a new master PIN 563 similar to the new master PIN 463, and a new master capability information 564 similar to the new master capability information 464. That is to say, in the case of the example in FIG. 18, the address C is provided as the new master address 562, the value "1234" is provided as the new master PIN 563, and the capability information C is provided as the new master capability information 564.

Returning to FIG. 16, in step S203 which corresponds to step S103 in FIG. 9, the change confirming unit 412 of the device A301 supplies a master change request to not only the device B302 but also the device C303, and confirms whether or not the master can be changed to the device C303.

As shown in FIG. 18, the master change request 552 is similar to the master change request 452 described with reference to FIG. 14. That is to say, the master change request 552 includes a master change request command 565 similar to the master change request command 465, a new master address 566 similar to the new master address 466, a new master PIN 567 similar to the new master PIN 467, and a new master capability information 568 similar to the new master capability information 468. That is to say, in the case of the example in FIG. 18, the address C is provided as the new master address 566, the value "1234" is provided as the new master PIN 567, and the capability information C is provided as the new master capability information 568.

Returning to FIG. 16, in step S262 which corresponds to step S142 in FIG. 9, the change allowing unit 421 of the device B302 obtains the master change request thereof. Similarly, in step S292 the change allowing unit 421 of the device D304 obtains the master change request.

The devices B and D each determine whether or not the device can be changed to a master based on the request thereof. For example, upon determining that a master change is allowed, the change allowing unit 421 of the device 302 transmits the master change allowing response showing that the master change is allowed to the device A301.

As shown in FIG. 18, the master change allowing response 553 transmitted from the device B302 is similar to the master change allowing response 453 described with reference to FIG. 14. That is to say, the master change allowing response 553 includes a master change allowing response 569 similar to the master change allowing response 469, a master change receiving address 570 similar to master change receiving address 470, a new master PIN 571 similar to the new master PIN 471, and a master change acceptance capability information 572 similar to the master change acceptance capability information 472. That is to say, in the case of the example in FIG. 18, from the device B302, the address B is provided as the master change receiving address 570, the value "1234" similar to the new PIN 564 is provided as the new master IN 571, and the capability information B is provided as the master change acceptance capability information 572.

Returning to FIG. 16, in step S204 which corresponds to step S104 in FIG. 9, the change confirming unit 412 of the device A301 obtains the master change allowing response thereof.

Similarly, in the case of allowing the change, in step S293 the change allowing unit 421 of the device 304 transmits the master change allowing response showing that the master change is allowed to the device A301.

The master change allowing response 554 transmitted by the device D304 is basically similar to the master change allowing response 553, as shown in FIG. 18. That is to say, the master change allowing response 554 includes a master change allowing response 573 similar to the master change allowing response 569, a master change receiving address 574 similar to the master change receiving address 570, a new master PIN 575 similar to the new master PIN 571, and a master change acceptance capability information 576 similar to the master change acceptance capability information 572. That is to say, in the case of the example in FIG. 18, from the device d304, the address D which is the address of the device D304 is provided as the master change receiving address 574, the value "1234" similar to the new master PIN 563 is provided as the new master PIN 575, and the capability information D which is the capability information of the device D304 is provided as the master change acceptance capability information 576.

Returning to FIG. 16, the change confirming unit 412 of the device A301 obtains the master change allowing response thereof in step S205 which corresponds to step S104 in FIG. 9.

Upon obtaining the master change allowing response, in step S206 in FIG. 17 which corresponds to step S105 in FIG. 9 the second communication control unit 13 disconnects the second communication with the device B302 which is the receiving device not being upgraded to a master (which is not the request source for the master upgrade). Similarly, in step S207 in FIG. 17 which corresponds to step S105 in FIG. 9 the second communication control unit 413 of the device A301 disconnects the second communication with the device D304 which is the receiving device that is not being upgraded to a master.

Upon the second communication with the devices B302 and D304 being disconnected, in step S208 in FIG. 17 which corresponds to step S106 in FIG. 9, the upgrading allowing unit 411 of the device A301 supplies the master upgrading allowing response to the device C303 which is the receiving device from the request source.

As shown in FIG. 19, the master upgrading allowing response 555 in this case is similar to the master upgrading allowing response 454 described with reference to FIG. 14. That is to say, the master upgrading allowing response 555 includes a master upgrading allowing response 577 similar to the master upgrading allowing response 473, a mater change receiving address 578 similar to the master change receiving address 474, a master change acceptance capability information 579 similar to the master change acceptance capability information 475, the new master PIN 580 similar to the new master PIN 476, a new master change receiving address 581 similar to the master change receiving address 474, a master change acceptance capability information 582 similar to the master change acceptance capability information 475, a new master PIN 583 similar to the new master PIN 476, a master change receiving address 584 similar to the master change receiving address 477, a master change acceptance capability information 585 similar to the master change acceptance capability information 478, and a new master PIN 586 similar to the new master PIN 479.

That is to say, information for the various devices allowing the master upgrade (in the case of the example in FIG. 19, the devices A301, B302, and D304) is provided as the master upgrading allowing response 555.

In the case of the example in FIG. 19, the address B is provided as the master change receiving address 578, the capability information B is provided as the master change acceptance capability information 579, the address D is provided as the master change receiving address 581, and capability information D is provided as the master change acceptance capability information 582, the address A is provided as the master change receiving address 584, and the capability information A is provided as the mater change acceptance capability information 585. Also, the new master PIN 580, the new master PIN 583, and the new master PIN 586 each have the value "1234" similar to the new master PIN 563.

That is to say, the master change has to occur for each device making up the second communication network 310.

In step S234 in FIG. 17 which corresponds to step S124 in FIG. 9, the upgrading request unit 432 of the device C303 obtains the master upgrading allowing response.

Note that in the case that the master change is denied, in step S263 in FIG. 16 the change allowing unit 421 of the device B302 transmits a change denying response indicating denial of the master change, instead of a change allowing response, to the device A301. Similarly, in the case that the master change is denied, in step S293 in FIG. 16 the change allowing unit 421 of the device D304 transmits a change denying response indicating denial of the master change, instead of a change allowing response, to the device A301.

Upon the change confirming unit 412 of the device A301 obtaining the master change denying response in step S204 or step S205 in FIG. 16, the various processing in step S206 and S207 in FIG. 17 are omitted, and the flow is advanced to step s208 in FIG. 17. In step S208, the upgrading allowing unit 411 supplies the master upgrading denying response to the device C303 which is the receiving device for the request source. With the denying response herein, the series of processing is ended. That is to say, in this case the device C303 is not upgraded to be a master. In this case, the master remains as the device A301.

Upon obtaining the master upgrading allowance, in step S235 in FIG. 17 which corresponds to the step S125 in FIG. 10, the upgrading processing unit 433 of the device C303 upgrades the device C303 to a master.

Upon upgrading to a master, in step S236 in FIG. 17 corresponding to step S126 in FIG. 10 the second communication control unit 434 of the device C303 establishes a second wireless communication connection with the device B302. Similarly, in step S237 in FIG. 17 corresponding to step S126 in FIG. 10 the second communication control unit 434 of the device C303 establishes a second wireless communication connection with the device D304.

Corresponding to the processing herein, in step S264 in FIG. 17 which corresponds to step S144 in FIG. 10 the second communication control unit 422 of the device B302 establishes a second communication connection with the device C303. Similarly, the in step S294 in FIG. 17 which corresponds to step S144 in FIG. 10 the second communication control unit 422 of the device D304 establishes a second communication connection with the device C303.

Upon the second communication network 310 in which the device C303 is the master being established, in step S238 in FIG. 17 which corresponds to step S127 in FIG. 10 the profile processing unit 423 of the device C303 performs exchanges and synchronizes the profile information with each of the devices A301, B302, and D304.

Corresponding to the processing here, the profile processing unit 414 of the device A301 exchanges and synchronizes the profile information in step S209 in FIG. 17 which corresponds to step S107 in FIG. 10. Similarly, the profile processing unit 435 of the device B302 exchanges and synchronizes the profile information in step S265 in FIG. 17 which corresponds to step S145 in FIG. 10. The profile processing unit 414 of the device D304 exchanges and synchronizes the profile information in step S295 in FIG. 17 which corresponds to step S145 in FIG. 10. That is to say, hereafter, the devices A301 through D304 each share the newest profile information of one another.

In step S239 in FIG. 17 which corresponds to step S128 in FIG. 10, the music player application 212 of the device C303 which is the new master performs distribution of the song data (streaming playing/transmission) as to each of the devices A301, B302, and D304 for streaming playing of the content data. At this time, a GUI showing that the song data is being transmitted, such as that shown in FIG. 11 for example, is displayed on the monitor of the device C303.

The music player 212 of the device A301 plays while receiving the song data from the device C303 in step S210 in FIG. 17 corresponding to step S108 in FIG. 10 (streaming playing/receiving). A GUI showing that the song data is being received/played, such as that shown in FIG. 12 for example, is displayed on the monitor of the device A301.

The music player 212 of the device B302 plays while receiving the song data from the device C303 in step S266 in FIG. 17 corresponding to step S146 in FIG. 10 (streaming playing/receiving). A GUI showing that the song data is being received/played, such as that shown in FIG. 12 for example, is displayed on the monitor of the device B302.

The music player 212 of the device D304 plays while receiving the song data from the device C303 in step S296 in FIG. 17 corresponding to step S146 in FIG. 10 (streaming playing/receiving). A GUI showing that the song data is being received/played, such as that shown in FIG. 12 for example, is displayed on the monitor of the device D304.

As described above, even if the number of the receiving devices is greatly increased in the second communication network wherein role switching is performed, only the number of devices similar to the above-described device B302 is increased, and role-switching can be readily realized by processing similar to the case of the second communication network made up of the devices A301 through C303.

That is to say, the usability of the application providing communication between devices can be improved.

With each of the above examples, description has been given to express the various devices performing exchanging and synchronizing of profile information after updating with the second communication network 310 (e.g. steps S107, S128, and S146 in FIG. 10), but in the event thereof, exchanging and synchronizing may be performed for other information, not only profile information. For example, the various devices may exchange, synchronize, and so forth, equipment information and capability information of the various devices.

This information is exchanged by the first communication and second communication in the event of updating the device configuration of the second communication network 310, as described above. Accordingly, at the time of ending the updating of the second communication network 310, each device obtains information of the other devices. However, there may be cases wherein, after updating the second communication network 310, for example the user changes the device settings to update the equipment information and capability information for each device. In this case, there is the concern that the mutual information each device has by sending/receiving at the time of updating the second communication network 310 is no longer the newest information. The equipment information and capability information can be used after updating of the second communication network 310, so unless this information is the newest, problems can occur when using the information thereof.

Thus, as described above, by exchanging and synchronizing not only the profile information but also the equipment information and capability information, each device can constantly share the newest information.

Now, the information (device information, capability information, profile information, and so forth) belonging to each device which is shared by each device making up the second communication network 310 after the change can be used for the next processing other than only using for a communication managing device change (role switching) as described above. For example, the information herein can also be used for an update of the configuration of the second communication network 310, such as deleting or adding a device, for example.

This type of an update of the second communication network 310 will be described. First, the case of adding a new device to the second communication network 310 will be described. Hereafter, an example of a case of adding a new device (device D304) to the second communication network 310 which is in the state shown in FIG. 7A will be described.

As shown in FIG. 20A, with a communication system 300, a device A301 and device C303 have established a second communication network 310 beforehand which is a communication network with the second communication, using the method described with reference to FIGS. 1 through 6.

The devices A301 through C303 use the second communication network 310 thereof and as indicated by the arrows 311 and 312, perform streaming playing (data distribution) of content data such as music, movies, and the like. That is to say, the device A301 operates as a communication managing device and performs distribution of content data (streaming data), and the devices B302 and C303 each operate as a receiving data and plays while receiving the data distributed by the device A301.

With such a situation, in order to add the device D304 to the second communication network 310 and allow participation, and operate the device D304 as the receiving device for streaming playing, in the case of the method described with reference to FIGS. 1 through 6, the second communication has to be established between the device D304 and the device A301. That is to say, the device D304 has to be touched (positioned near) to the device A301 which is the communication managing device, mutual equipment information and capability information to be exchanged with the first communication, and the second communication established.

However, the device D304 may not be positioned near the device A301 in all cases, and in fact there may be cases wherein positioning the device D304 near the devices B302 or C303 may be easier. However, in the case of the method described with reference to FIGS. 1 through 6, even if the device D304 and devices B302 or C303 are touched (positioned near), the second communication can be established between the devices D304 and B302 (or with device C303), but the second communication is not established between the devices D304 and A301. That is to say, with this method the device D304 does not receive data distributed from the device A301.

Also, with the method described above with reference to FIGS. 1 through 6, whether or not a hand-over is performed from the first communication to the second communication can be confirmed by the user using a GUI. However, in the case of adding the device D304 to the second communication network 310 that is formed by multiple devices as shown in FIG. 20A, with the above-described method, upon touching (positioning near) the device D304 to the device A301, the user of the devices B302 or C303 is not able to refuse participation of the device D304.

Further, with the method described above with reference to FIGS. 1 through 6, there is no concept of authority as to the content operation of the device A301. For example, with the communication system 300, instructions can be made as to the device A301 regarding which content to distribute from the devices B302 through D304 which are on the receiving device side. In this case, if a device on the receiving device side can control the content distribution of the device A301 which is the communication managing device without any conditions, an erroneous operation by an unfamiliar user might cause problems for other users. Thus, restricting the operating authority is desirable, but with the method described above with reference to FIGS. 1 through 6, there is no such concept.

Thus, with the communication system 300, processing is performed as follows. That is to say, as shown in FIG. 20B, by touching (positioning near) the device D304 to the receiving device (e.g. device C303), the first communication is established between the devices C303 and D304, as indicated by the arrow 341. In the event of exchanging equipment information and capability information with the first communication thereof, the device C303 provides the information of the device A301 to the device D304. The device D304 uses the information of the device A301 to establish second communication with the device A301 with hand-over processing, as shown in FIG. 20C. Thus, the device D304 can participate in the second communication network 310 as a receiving device, and as indicated by the arrow 313 the device D304 can play while receiving the data distributed from the device A301.

That is to say, by establishing the first communication with the device C303 which does not perform the second communication, the device D304 can establish second communication with the device A301 which does not have the first communication established. Thus, the work to add the device D304 to the second communication network 310 becomes easy, and usability of the application proving communication between the devices can be improved.

Further, a GUI that prompts the user as to whether or not the device B302 or C303 may be added with the procedures as described above is displayed at the device D304. The user of the device B302 or C303 allows or denies the addition of the device D304 following the instructions displayed by the GUI. Thus, even a user of a device that does not perform direct second communication with the device D304 can control whether or not to add the device D304.

An unknown device (user) can thus be suppressed from participating, whereby the safety of the second communication network 310 can be readily improved. For example, in the case that the device A301 is a device with a high sharing rate such as a server, the device A301 basically attempts to distribute data to the device D304 also, however, the user of the device B302 or C303 which is for individual use may not wish to provide personal information of oneself to an unknown user (device D304) i.e., may not wish to participate in the second communication network 310. Also, there may be a case where the user of the device A301 and the user of the device D304 know one another, but the user of the device B302 or C303 and the user of the device D304 do not know one another. In this case, the user of the device B302 or C303 may not desire to provide personal information of oneself to the device D304. Further, there may be a case wherein the device D304 participates in the second communication network 310 without the knowledge of the user of the device B302 or C303, and the personal information is provided thereto. As described above, by performing confirmation of whether or not to participate, such problems are suppressed from occurring, whereby the safety of the second communication network 310 can be readily improved. That is to say, the usability of the application providing communication between devices can be improved.

Further, a GUI that confirms whether or not the device D304 has content operating authority as to the device A301 is displayed on the device B302 or C303. The user of the device B302 or C303 controls whether or not to give content operating authority to the device D304 in accordance with this GUI. Thus, authority for an unknown device (user) can be suppressed, whereby the safety of the second communication network 310 can be improved. That is to say, the usability of the application providing communication between devices can be improved.

FIGS. 21A and 21B are functional block diagrams showing a configuration example of the content cast application 211 belonging to the devices A301 and B302 in FIGS. 20A through 20C. The devices A301 and B302 have basically the same configuration as the cellular phone 101 in the case described with reference to FIGS. 1 through 6. That is to say, the devices A301 and B302 may be any sort of device, but have a first communication unit 141 and second communication unit 142 as shown in FIG. 2, and have a function block as shown in FIG. 3. That is to say, the devices A301 and B302 have a hand-over application 208 of the configuration as shown in FIG. 4, and have a content cast application 211.

FIG. 21A shows a configuration example of the content cast application 211 of the device A301. FIG. 21B shows a configuration example of the content cast application 211 of the device B302. The portions that are similar to the configuration described with reference to FIG. 4 have the same reference numerals appended thereto.

That is to say, as shown in FIG. 21A, the device A301 serving the function of the content cast application 211 has a master-addition reception processing unit 610, hand-over control unit 221, application control unit 223, GUI control unit 224, and memory access processing unit 225.

The master-addition reception processing unit 610 performs processing to receive the addition of a device as the master (communication managing device) in the second communication network 310. The master-addition reception processing unit 610 has an adding commission accepting unit 611, adding confirming unit 612, adding confirmation control unit 613, second communication control unit 614, and profile processing unit 615.

The adding commission accepting unit 611 performs processing as to an addition commission of the device D304 supplied by the device C303 which is touched (positioning near) the device D304. The adding confirming unit 612 performs processing to confirm whether or not the addition can be made as to the user of the device A301. The adding confirmation control unit 613 performs processing to confirm with the user of the device B302 to which the device D304 is not touched (positioned near), whether or not the device D304 can be added. The second communication control unit 614 establishes second communication with the device D304 which has been allowed to be added. The profile processing unit 615 exchanges profile information with the other devices making up the second communication network 310, and synchronizes the information of each other.

As shown in FIG. 21B, the device B302 serving the function of the content cast application 211 has a slave-addition reception processing unit 620, hand-over control unit 221, application control unit 223, GUI control unit 224, and memory access processing unit 225.

The slave-addition reception processing unit 620 performs processing to receive the addition of a device as a slave (receiving device) in the second communication network 310. As shown in FIG. 21B, this slave-addition reception processing unit 620 performs processing of a device not touched (positioned near) the device to be added D304. The slave-addition reception processing unit 620 has an adding confirmation receiving unit 621, adding confirming unit 622, and profile processing unit 623.

The adding confirmation receiving unit 621 receives a confirmation commission for adding the device D304 supplied by the device A301 via the second communication, and responds thereto. The adding confirming unit 622 performs processing to confirm whether or not the addition can be made as to the user of the device B302. The profile processing unit 623 exchanges profile information with the other devices madding up the second communication network 310, and synchronizes the information of each other.

Figure 22B:
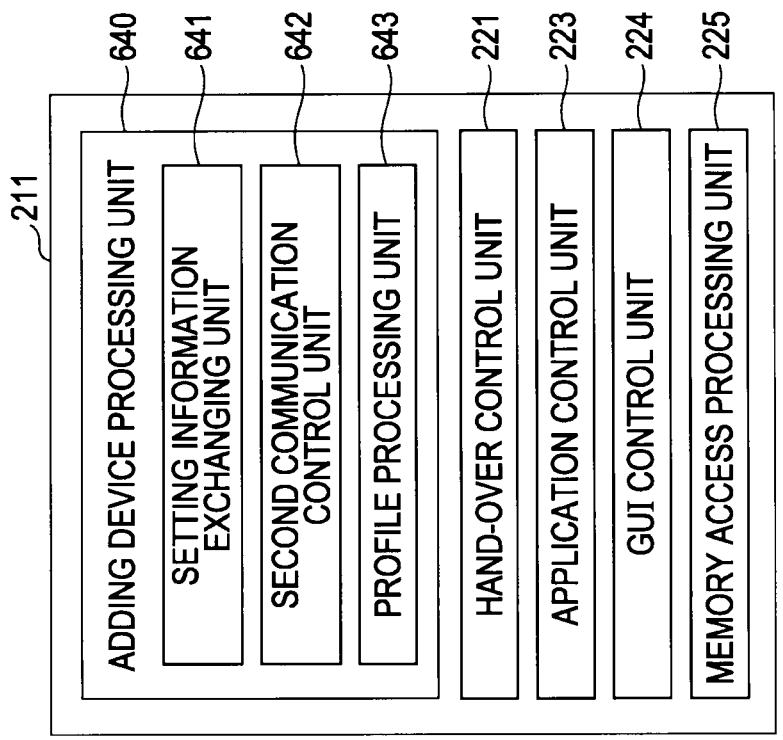
FIGS. 22A and 22B are diagrams illustrating a configuration example of a functional block of each device.
Figure 22A:
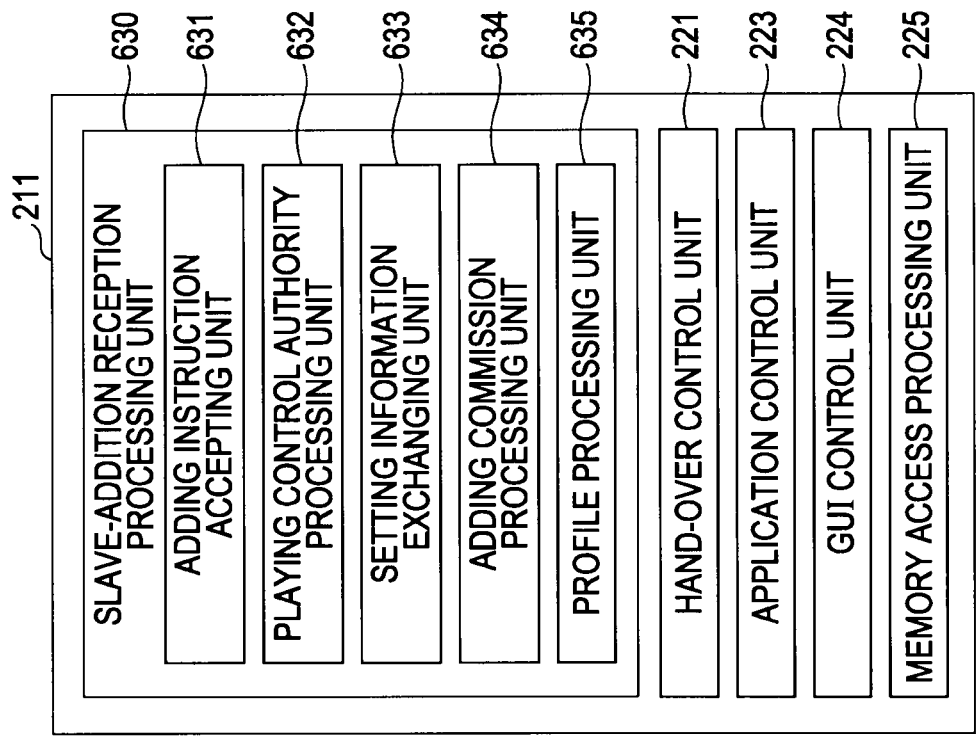

FIGS. 22A and 22B are functional block diagrams showing a configuration example belonging to the content cast application 212 of the devices C303 and D304 in FIG. 20A through 20C. The devices C303 and D304 have basically the same configuration as the cellular phone 101 in the case described with reference to FIGS. 1 through 6. That is to say, the devices C303 and D304 may be any sort of device, but have a first communication unit 141 and second communication unit 142 as shown in FIG. 2, and have a function block as shown in FIG. 3. That is to say, devices C303 and D304 have a hand-over application 208 of the configuration as shown in FIG. 4, and have a content cast application 211.

FIG. 22A shows a configuration example of the content cast application 211 of the device C303. FIG. 22B shows a configuration example of the content cast application 211 of the device D304. The portions that a similar to the configuration described with reference to FIG. 4 have the same reference numerals appended thereto.

As shown in FIG. 22A, as a function of the content cast application 211, the device C303 has a slave-addition reception processing unit 630, hand-over control unit 221, application control unit 223, GUI control unit 224, and memory access processing unit 225.

The slave-addition reception processing unit 630 performs processing to receive the addition of a device as a slave (receiving device) in the second communication network 310. As shown in FIG. 22A, this slave-addition reception processing unit 630 performs processing of the device touched (positioned near) to the device D304 to be added. The slave-addition reception processing unit 630 has an adding instruction receiving unit 631, playing control authority processing unit 632, setting information sending/receiving unit 633, adding commission processing unit 634, and profile processing unit 635.

The adding instruction receiving unit 631 receives device adding instructions from the user. The playing control authority processing unit 632 performs processing relating to giving playing control authority which is the right to control the playing (distribution) of the content as to the added device. The setting information sending/receiving unit 633 uses the first communication established with the touched (positioned near) device D304 to perform sending/receiving of various types of setting information relating to the communication, such as equipment information, capability information (connection information), and content operating authority information and the like. The adding commission processing unit 634 performs processing to commission the addition of the device D304 as to the device A301. The profile processing unit 345 exchanges profile information with the other devices making up the second communication network 310 and synchronizes the information of one another.

As shown in FIG. 22B, as a function of the content cast application 211, the device D304 has an adding device processing unit 640, hand-over control unit 221, application control unit 223, GUI control unit 224, and memory access processing unit 225.

The adding device processing unit 640 performs processing as a device to be added to the second communication network 310. The adding device processing unit 640 has a setting information sending/receiving unit 641, second communication control unit 642, and profile processing unit 643.

The setting information sending/receiving unit 641 uses the first communication established with the touched (positioned near) device C303 to perform sending/receiving of setting information such as equipment information and capability information. The second communication control unit 642 establishes a second communication with the device A301 which is the master. The profile processing unit 643 exchanges profile information with other devices making up the second communication network 310, and synchronizes the information of each other.

Figure 23:
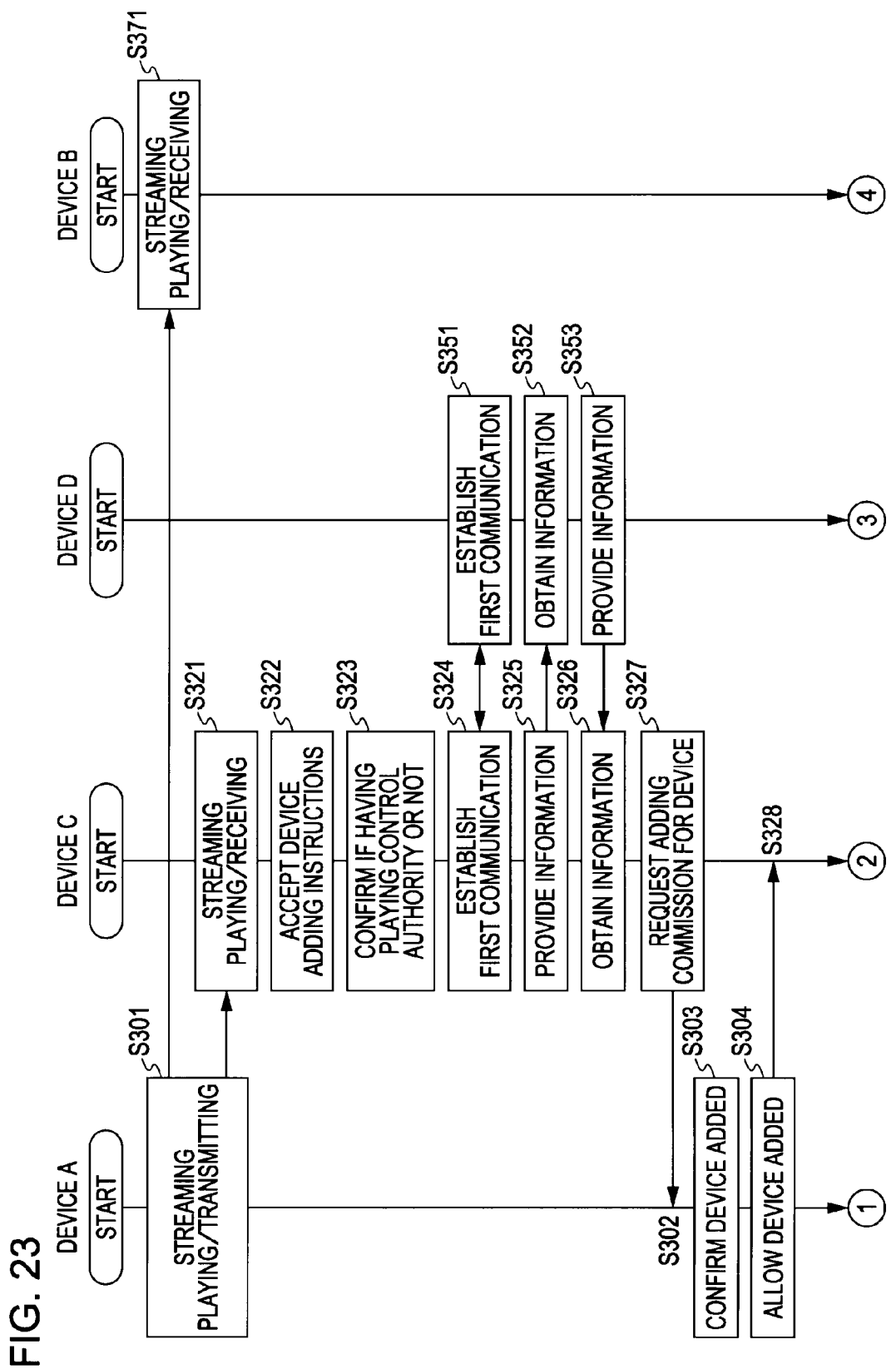
FIG. 23 is a flowchart describing the flow of processing of a device addition.
Figure 24:
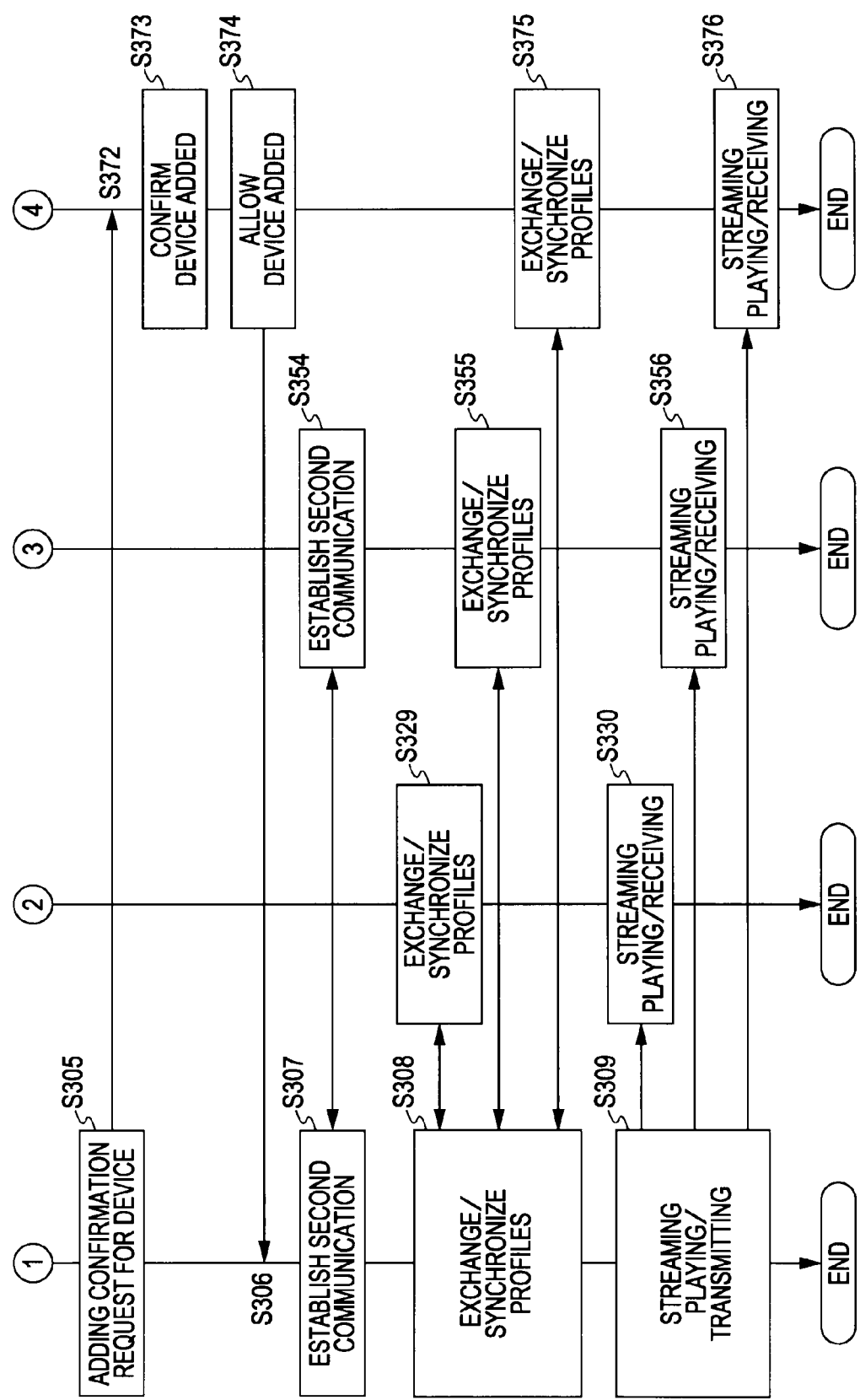
FIG. 24 is a flowchart following FIG. 23 describing the flow of processing of a device addition.

Next, an example of processing flow when adding the device D304 will be described with reference to the flowchart in FIGS. 23 and 24. Note that FIG. 25 will be referenced in the description as appropriate.

First, in the state shown in FIG. 20A, in step S301 the music player application 212 of the device A301 transmits the song data (streaming playing/transmission). A GUI is displayed on the monitor of the device A301 at this time indicating that song data is being transmitted.

In step S371 the music player application 212 of the device B302 and in step S321 the music player application 212 of the device C303 each play while receiving the song data distributed by the device A301 (streaming playing/receiving). A GUI indicating that the song data is in during receiving/playing is displayed on the monitors of the devices B302 and C303.

When the user of the device C303 operates a Menu button displayed on the GUI and so forth to instruct adding the device, for example, the adding instruction receiving unit 631 receives the device adding instruction thereof in step S322.

Upon the device adding instructions being received, in step S323 the playing control authority processing unit 632 displays a GUI for the user to confirm the giving of the playing control authority, for example. For example, along with the message "will you authorize playing control?", selection options of "yes" and "no" are displayed on the GUI. The user performs control for giving playing control authority by selecting one of the "yes" and "no". For example, in the case that "yes" is selected by the user, the playing control authority processing unit 632 performs settings to give the playing control authority to the added device D304. Conversely, in the case that "no" is selected by the user, the playing control authority processing unit 632 performs settings so as to not give the playing control authority to the added device D304.

Upon the playing control authority giving is confirmed, the preparations for the first communication of the device 303 is complete. At this time, a screen promoting a touching (positioning near) operation to the user is displayed on the monitor of the device C303. In this state, when the device D304 is touched (positioned near) to the device C303, in step S324 the hand-over control unit 221 in the device C303 establishes a first communication with the device D304 that is touched (positioned near) as shown in FIG. 20B (arrow 341).

Corresponding to the processing of the device C303, the in step S351 the hand-over control unit 221 of the device D304 establishes the first communication with the device C303 that has been touched (positioned near) as shown in FIG. 20B (arrow 341). In this event, a GUI screen for the user to confirm that the first communication is established is displayed on the monitor of the device D304.

Upon the first communication being established, in step S325 the setting information sending/receiving unit 633 provides equipment information or various types of setting information relating to communication, such as the capability information and content operating authority information described with reference to FIG. 6, to the device D304. Corresponding to this processing, in step S352 the setting information sending/receiving unit 541 of the device D304 obtains the provided various types of setting information.

The setting information 661 in FIG. 25 shows a configuration example of the setting information provided from the device C303 to the device D304. As shown in FIG. 25, the setting information 661 includes a master address 671, master capability information 672, new master PIN 673, own address 674, own capability information 675, and content operation authority 676. Of course, information other than this may be included.

The master address 671 is equipment information, and is address information (identification information) of the device operating as the master of the second communication network 310. In the case of the example in FIG. 25, the address A which is the address of the device A301 is provided as the master address 671. The master capability information 672 is capability information of the device operating as the master of the second communication network 310. In the case of the example in FIG. 25, the capability information A which is the capability information of the device A301 is provided as the master capability information 672.

The new master PIN 673 is a passkey for confirming a session. This is identification information for confirming which request to respond to and so forth depending on the value of the new master PIN 673. In the case of the example in FIG. 25, the new master PIN 673 is generated by the device C303. Let us say that the value "1234" is provided as the new master PIN 673. Note that the new master pin 673 may be any value, and the data length is also optional.

The own address 674 is equipment information, and is address information (identification information) of the device itself. In the case of the example in FIG. 25, the address C is provided as the own address 674. The own capability information 675 is capability information of the device itself. In the case of the example in FIG. 25, the capability information B which is the capability information of the device B302 is provided as the own capability information 675. The content operating authority 676 is information indicating whether or not to give operating authority for the content in the device A301 to the device D304. In the case of the example in FIG. 25, information to the effect of "there are playing controls" is provided as the content operating authority 676.

Returning to FIG. 23, next in step S353, the setting information sending/receiving unit 641 of the device D304 provides setting information to the device C303. Corresponding to this processing, the setting information sending/receiving unit 633 of the device C303 obtains the provided setting information thereof in step S326.

The setting information 662 in FIG. 25 show a configuration example of the setting information provided from the device D304 to the device C303. As shown in FIG. 25, the setting information 662 includes a own address 677, own capability information 678, and a new master PIN 679. Of course, other information may be included.

The own address 677 is equipment information, and is own address information (identification information). In the case of the example in FIG. 25, the address of the device D304 (address D) is provided as the own address 677. The own capability information 678 is capability information for the device itself. In the case of FIG. 25, capability information D which is the capability information of the device D304 is provided as the own capability information 678. The new master PIN 679 is a new master PIN supplied from the first communication connection destination. In the case of the example in FIG. 25, "1234" is provided as the new master PIN 679, similar to the new master PIN 673 supplied by the device C303. The value of the new master PIN 679 being shared with the new master PIN 673 indicates that the setting information 662 is information corresponding to the setting information 661. Note that the new master PIN 679 may be any value, and the data length is optional.

From this exchange of information, the device C303 obtains the equipment information (address) and capability information of the device D304. Also, the device D304 obtains the equipment information (address) and capability information of the device A301, as well as information indicating whether or not there is content operating authority, in addition to the equipment information (address) and capability information of the device C303.

Returning to FIG. 23, upon the exchange of setting information by the first communication ending, the adding commission processing unit 634 of the device C303 uses the second communication in step S327 and performs an adding commission request for the device D304 as to the device A301. The adding commission request 663 in FIG. 25 indicates information provided to the device A301 at this time.

In the example in FIG. 25, the adding commission request 663 includes an adding commission requesting command 680, adding device address 681, adding device capability information 682, new master PIN information 683, and adding device content operating authority 684. Of course, information other than this may be included. For example, an own address or own capability information may be appended. However, since the data here is transferred using an already-existing second communication, even if there is no own address or own capability information indicating the transmission destination, the device A301 can identify the device A301.

The adding commission requesting command 680 is a command requesting the device A301 to add the device D304 to the second communication network 310. The adding device address 681 is equipment information, and is address information of the device to be added to the second communication network 310. In the case of the example in FIG. 25, the address D is provided as the adding device address 681. The adding device capability information 682 is capability information of the device to be added to the second communication network 310. In the case of the example in FIG. 25, capability information D is provided as the adding device capability information 682. The new master PIN 583 is information similar to the above-described new master PIN 673 and the like. In the case of the example in FIG. 25, the adding commission request corresponds to the above-described processing, whereby the value "1234" which is the same as the new master PIN 673 and new master PIN 679 is provided as the new master PIN 683. The adding device content operating authority 684 is information indicating whether or not the device to be added gives operating authority of the content of the device operating as the master, and is information similar to the content operating authority 676. In the case of the example in FIG. 25, information to the effect of "with playing control" serving as the adding device content operating authority 686 is provided.

The adding commission accepting unit 611 of the device A301 obtains this type of adding commission request in step S302. In step S303 the adding confirming unit 612 displays a GUI screen on the monitor of the device A301, and confirms with the user whether or not the device will be allowed to be added.

For example, along with the message "connect device D?" selection options of "yes" and "no" are displayed on the GUI screen. The user of the device A301 selects one of the "yes" and "no", thereby indicating the intent of the user as to the addition of the device D304. In the case that "yes" is selected by the user, in step S304 the adding commission accepting unit 611 performs a response as to the adding commission request as to the device C303 via the second communication, and allows the addition of the device D304. The response 664 in FIG. 25 indicates a configuration example of the information provided from the device A301 to the device C303 at this time.

In the example in FIG. 25, the response 664 includes an adding commission allowing response 685 and a new master PIN 686. Of course, information other than this may be included.

The adding commission allowing response 685 is a response as to the adding commission requesting command 685, and indicates that the addition is allowed. The new master PIN 686 is information similar to each of the above-described master PINs. The response herein corresponds to each process in the processing described above, whereby in the case of the example in FIG. 25, the value "1234" which is the same as the new master PIN 673, new master PIN 679, and new master PIN 683 is provided as the new master PIN 686.

The adding commission processing unit 634 of the device C303 obtains the response thereof in step S328.

This information exchange enables the device A301 which is a communication managing device which has not been touched (positioned near) by the device D304 to also obtain the equipment information (address) and capability information of the device D304. Also, the device C303 can know that the addition of the device D304 has been allowed by the device A301.

Note that in step S303, in the case that the user of the device A301 selects "no" and the addition of the device C303 is denied, in step S304 the adding commission accepting unit 611 responds to the adding commission request as to the device C303 via the second communication, and denies the device D304. This denial response ends the series of processing. That is to say, in this case the device C303 is excluded from participation in the second communication network 310.

Now, the device A301 confirms the device addition with the device B302 which is a receiving device to which the device D304 has not been touched (positioned near). That is to say, in step S305 in FIG. 24, the adding confirmation control unit 613 of the device A301 uses the second communication to request confirmation of the addition of the device D304 as to the device B302. The adding confirmation request 665 in FIG. 25 shows information provided at this time by the device A301.

In the example in FIG. 25, the adding confirmation request 665 is information similar to the adding confirmation request 663. That is to say, the adding confirmation request 665 includes an adding commission requesting command 687, adding device address 688, adding device capability information 689, and adding device content operating authority 690. Of course, information other than this may be included.

The adding confirmation requesting command 687 is information similar to the adding confirmation requesting command 680. The adding device address 688 is information similar to the adding device address 681, and in the case of the example in FIG. 25, the address D is provided. The adding device capability information 689 is information similar to the adding device capability information 682, and in the case of the example in FIG. 25, capability information D is provided.

The adding device content operating authority 690 is information similar to the adding device content operating authority 684. In the case of FIG. 25, information to the effect of "there are playing controls" is provided as the adding device content operating authority 690.

The adding confirmation receiving unit 621 of the device B302 provided by the adding confirmation request 665 as described above obtains this information in step S372. In step S373, the adding confirming unit 622 displays a GUI screen on the monitor of the device B302, and accepts user instructions. For example, along with the message "connect device D?" selection options of "yes" and "no" are displayed on the GUI screen. Upon the user selecting "yes", in step S374 the adding confirmation receiving unit 621 of the device B302 responds to the adding confirmation request as to the device A301 via the second communication, and allows the addition of the device D304. The response 666 in FIG. 25 shows a configuration example of information provided to the device A301 by the device B302 at this time.

With the example in FIG. 25, the response 666 includes an adding confirmation allowing response 691. Of course, information other than this may be included. The adding confirmation allowing response 691 is information similar to the adding confirmation allowing response 685. The adding confirmation control unit 613 of the device A301 obtains the response thereof in step S306.

This type of information exchange enables the device B302 that has not touched (positioned near) with the device D304 to know that the device D304 has been touched (positioned near). Also, whether or not the device D304 can be added can be controlled.

That is to say, in the case that the user of the device B302 selects "no" and denies the addition of the device C303 in step S373, in step S374 the adding confirmation receiving unit 621 transmits the response indicating denial as to the device A301 via the second communication. This denial response ends the series of processing is ended. That is to say, in this case the device C303 is excluded from participation in the second communication network 310.

Thus, communication between the devices A301 and B302 can be performed using the second communication wherein streaming playing is being performed. That is to say, the devices A301 and B032 can perform the above-described information exchange without stopping the streaming playing.

Upon the above processing ending, the second communication is enabled between the devices A301 and C303. That is to say, the second communication control unit 614 of the device A301 in step S307 of FIG. 24 and the second communication control unit 642 of the device D304 in step S354 of FIG. 24 establish the second communication with one another.

Upon the second communication having been established, in step S308 the profile processing unit 615 of the device A301 exchanges and synchronizes profile information with each device of devices B302 through D304 using the second communication. Corresponding to this processing, the profile processing unit 623 of the device B302 in step S375 of FIG. 24, the profile processing unit 635 of the device C303 in step S329 of FIG. 24, and the profile processing unit 643 of the device D304 in step S355 each use the second communication to exchange and synchronize profile information with the device A301. That is to say, hereafter the various devices of device A301 through D304 share the newest profile information of one another.

With the above processing, as shown in FIG. 20C the device D304 is added to the second communication network 310, and distribution of content data from the device A301 to the device D304 is enabled. Thus, the music player application 212 of the device A301 uses the second communication in step S309 to transmit song data for streaming playing as to the devices B302 through D304 (streaming playing/transmission).

The music player application 212 of the device B302 in step S376, the music player application 212 of the device C303 in step S330, and music player application 212 of the device D304 in step S356 each play while receiving song data supplied by the device A301 (streaming playing/receiving).

By performing the processing as above, the communication system 300 can readily add a new device to the second communication network 310. That is to say, adding a device to the second communication network becomes easier.

Also, the devices can be added without stopping the data sending/receiving in the second communication network that has been performing before the addition. Further, the user of the device that has not been touched (positioned near) can readily control whether or not to add the device to the second communication net. Also, giving content operating authority to the device added to the second communication network can be readily controlled. Thus the communication system 300 can improve the usability of the application involving communication between devices.

Note that the number of devices making up the communication system 300 is optional. For example, in the communication system 300, in the case of adding a new receiving device when the device A301 is distributing data to three or more receiving devices, there are multiple devices not touched (positioned near) to the device to be added as with the device B302 in FIGS. 20A through 20C. The device A301 performs adding confirmation requesting as described above as to all of the "receiving devices not touched (positioned near) to the device to be added". That is to say, each of the "receiving devices not touched (positioned near) to the device to be added" have similar configuration to the device B302 in FIGS. 23A through 23C, and perform similar processing.

Also, in FIGS. 20A through 20C, the device D304 can be caused to touch (be positioned near) the device B302, whereby the device D304 participates in the second communication network 310. In this case, the device C303 executes the above-described processing of the device B302, and the device B302 executes the above-described processing of the device C303.

Further, by touching (positioning near) the device D304 to the device A301, the device D304 participates in the second communication network 310. In this case, the devices B302 and C303 which are receiving devices are each "receiving devices not touched (positioned near) to the device to be added", thereby having similar configuration to the case of the device B302 in the example, and perform similar processing as the case of the device C303 described above. The case wherein the communication system 300 is made up of five devices or more is also the same.

Also, for example, a new device C303 can be added to the second communication network 310 when the two devices A301 and B302 form the second communication network 310. In this case, other than processing relating to "receiving devices not touched (positioned near) to the device to be added", processing basically similar to the above description is performed.

Next, the case of deleting devices forming the second communication network from the second communication network will be described. For example, as shown in FIG. 26A, the second communication network 310 is formed with the devices A301 through D304. Let us say that the device A301 operates as the communication managing device, devices B302 through D304 operate as receiving devices, and the device A301 uses the second communication to perform streaming distribution of song data as to the devices B302 through D304.

In the case that the device D304 which is the receiving device sufficiently is removed from the device A301 which is the communication managing device for example, as shown in FIG. 26B, the device D304 is outside the communicable range of the second communication. In such a case, second communication between the device D304 thereof and the device A301 is not longer continued (arrow 313), whereby the device D304 is deleted from the second communication network 310. However, in a case that the other devices B302 and C303 which are receiving devices and the device A301 are communicable, the device A301 continues to distribute data to the devices thereof as shown in FIG. 26C (arrows 31 and 312).

Thus, even in the case that the device D304 is deleted from the communication network 310, useless processing such as temporarily stopping all of the streaming distribution can be suppressed, and an increase of the effects of deleting the device D304 can be suppressed. That is to say, the communication system 300 can improve the usability of the application providing communication between devices.

Figure 27A:
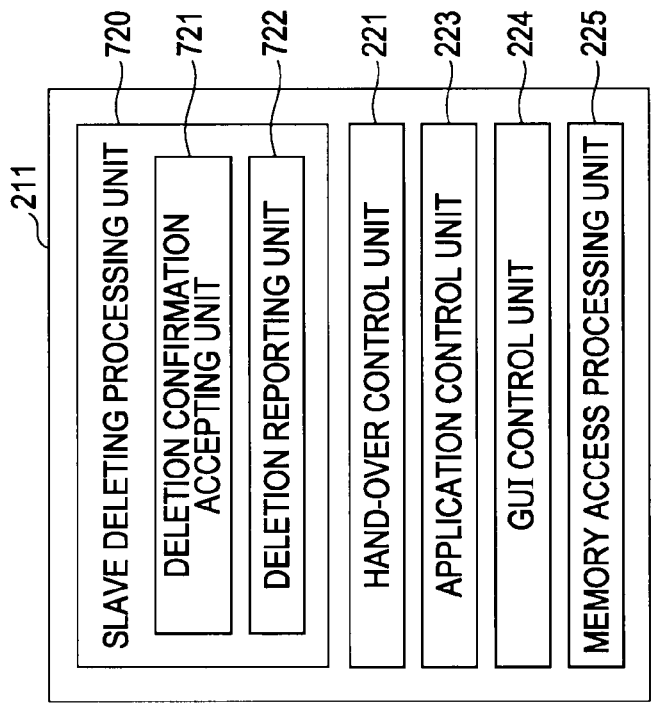
FIGS. 27A and 27B are diagrams illustrating a configuration example of a functional block of each device.
Figure 27B:
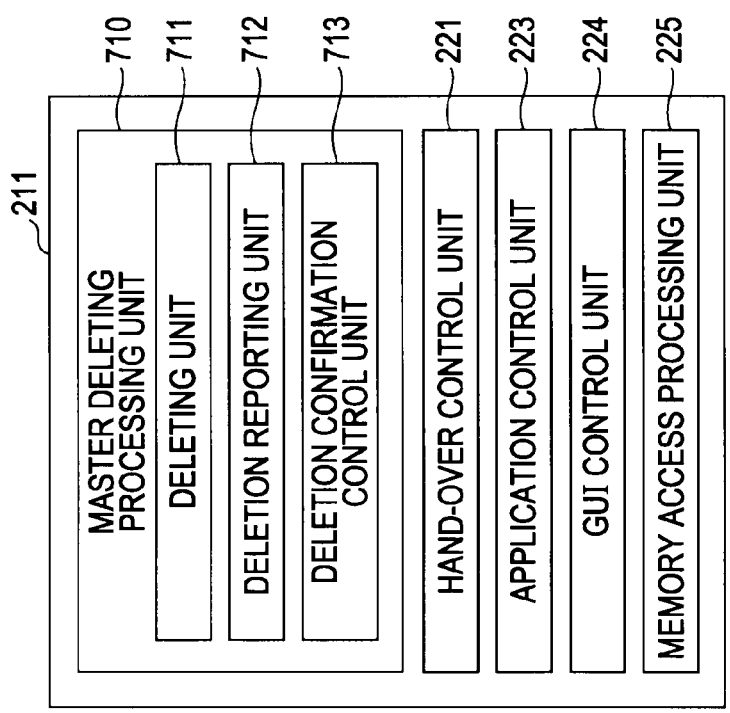

This will be described in detail below. FIGS. 27A and 27B show a configuration example of the content cast application 211 for each device in this case. FIG. 27A shows a configuration of the content cast application 211 of the device A301. FIG. 27B shows a configuration of the content cast application 211 of the devices B302 and C303. The portions similar to the configuration described with reference to FIG. 4 has the same reference numerals appended thereto.

As shown in FIG. 27A, as a function of the content cast application 211, the device A301 has a master deleting processing unit 710, hand-over control unit 221, application control unit 223, GUI control unit 224, and memory access processing unit 225.

The master deleting processing unit 710 performs deleting processing of a device serving as the master (communication managing device) in the second communication network 310. The master deleting processing unit 710 has a deleting unit 711, deletion reporting unit 712, and deletion confirmation control unit 713.

The deleting unit 711 detects a receiving device that has become disabled from the second communication, and performs processing to delete the equipment information thereof and the user profile information thereof. The deletion reporting unit 712 displays a GUI screen on a monitor and so forth to notify the user that the device has been deleted. The deletion confirmation control unit 713 notifies the user that information relating to the receiving device that has become non-communicable is to be deleted from other devices.

As shown in FIG. 27B, as a function of a content cast application 211, the device B302 has a slave deleting processing unit 720, hand-over control unit 221, application control unit 223, GUI control unit 224, and memory access processing unit 225.

The slave deleting processing unit 720 performs deleting processing of a device serving as the slave (receiving device) in the second communication network 310. The slave deleting processing unit 720 has a deletion confirmation receiving unit 721 and deletion reporting unit 722.

The deletion confirmation receiving unit 721 performs processing as to the deleting confirmation request supported by the device A301. The deletion reporting unit 722 displays a GUI screen on a monitor or the like to notify the user that the device has been detected.

Note that the function which the device C303 has which is a function serving as the content cast application 211 is similar to the case of device B302 shown in FIG. 27B, so the description thereof will be omitted.

Figure 28:
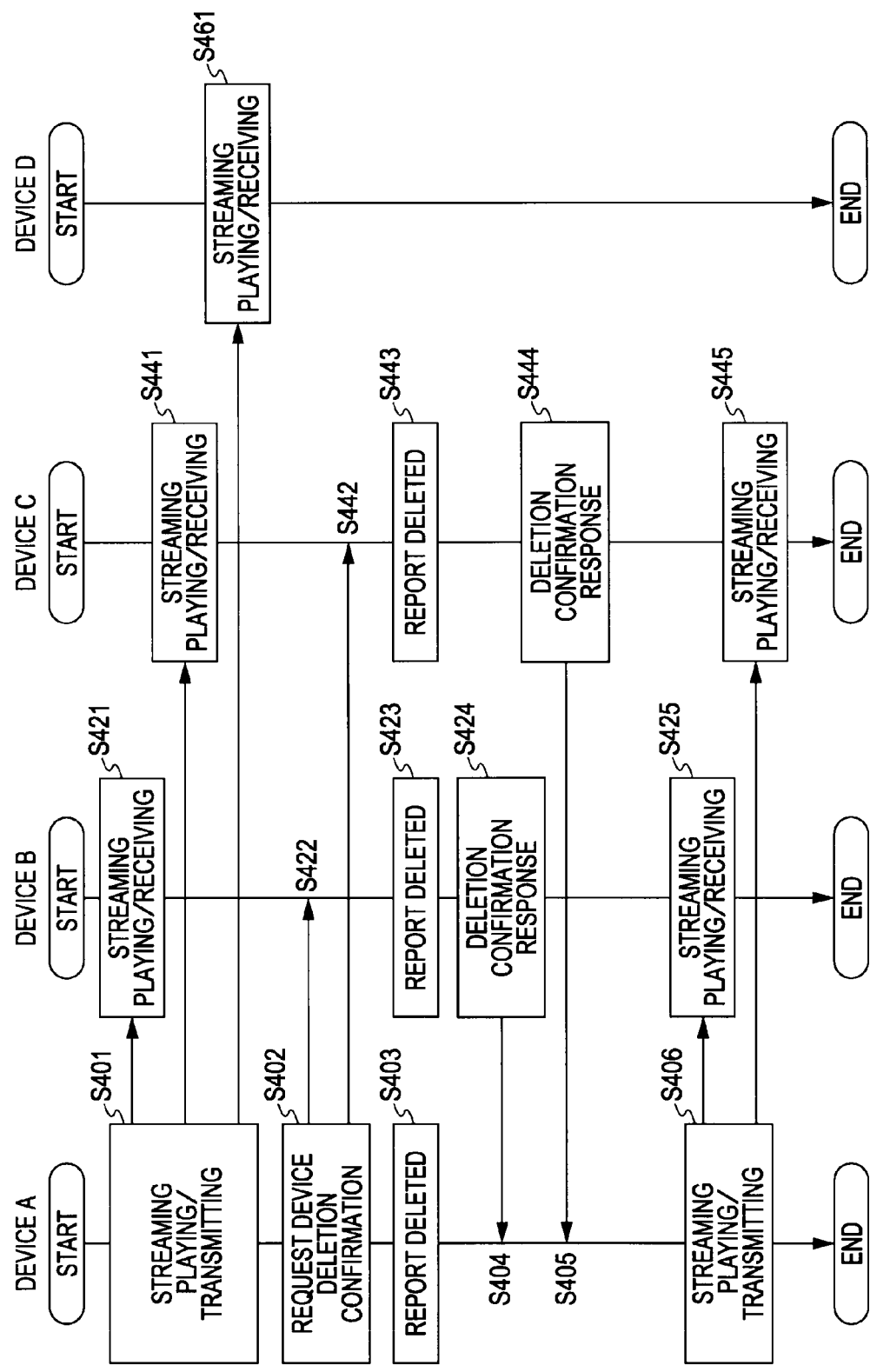
FIG. 28 is a flowchart describing the processing flow of deleting a device.

Next, an example of processing flow when adding the device D304 will be described with reference to the flowchart in FIG. 28. Note that FIG. 29 will be referenced in the description as appropriate.

First, in the state shown in FIG. 27A, in step S401 the music player application 212 of the device A301 transmits the song data to the devices B302 through D304 (streaming playing/transmission). A GUI is displayed on the monitor of the device A301 at this time indicating that song data is being transmitted.

The music player application 212 of the device B302 in step S421, the music player application 212 of the device C303 in step S441, and the music player application 212 of the device D304 in step S461 each play while receiving song data distributed by the device A301 (streaming playing/receiving). A GUI indicating that song data is being received and played is displayed on the monitors of each device of the devices B302 through D304.

Upon the device D304 moving outside the communicable range of the second communication, the deleting unit 711 of the device A301 detects this fact, and deletes information relating to the device D304 such as equipment information, profile information, and so forth.

Figure 29:
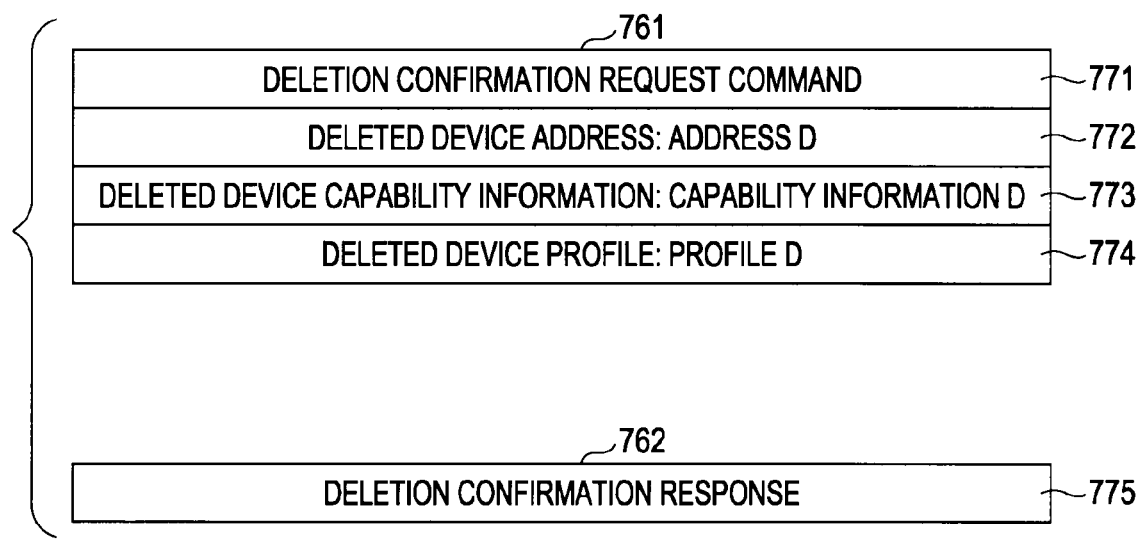
FIG. 29 is a diagram illustrating a configuration example of data that is exchanged.

In step S402, the deletion confirmation control unit 713 of the device A301 uses the second communication to supply information such as shown in the deletion confirmation request 761 of FIG. 29 as to the remaining devices B302 and C303, and requests confirmation of the deletion of the device D304.

The deletion confirmation request 761 has a deletion confirmation requesting command 771, deleted device address 772, deleted device capability information 773, and deleted device profile 774, as shown in FIG. 29. Of course, information other than this may be included.

The deletion confirmation requesting command 771 is a command requesting the deletion of information relating to the device to be deleted (device D304) that each receiving device holds. The deleted device address 772 is an address (identification information) of the device to be deleted. In the case of the example in FIG. 29, the address D is provided as the deleted device address 772. The deleted device capability information 773 is capability information of the device to be deleted. In the case of the example in FIG. 29, the capability information D is provided as the deleted device capability information 773. The deleted device profile 774 is profile information of the device to be deleted. In the case of FIG. 29, the profile D is provided as the deleted device profile 774.

Upon this type of request having been transmitted, the deletion reporting unit 712 of the device A301 displays a GUI screen, and notifies the user that the device D304 has been deleted from the second communication net. For example, a message notifying the user of the deletion, such as "communication with the device D (the device to be deleted) has been disconnected" is displayed on the GUI screen reporting the deletion.

In step S422, the deletion confirmation receiving unit 721 of the device B302 obtains the device deletion confirmation request transmitted by the device A301, and deletes the equipment information and profile information relating to the device D304 according to the request thereof. In step S423, the deletion reporting unit 722 of the device B302 displays a GUI screen, and notifies the user that the device D304 has been deleted from the second communication network 310. In step S424, the deletion confirmation receiving unit 621 of the device B302 supplies a deletion confirmation response such as that shown in the response 762 in FIG. 33, to the device A301 as the response corresponding to the request.

As shown in FIG. 29, the response 762 includes a deletion confirmation response 775. The deletion confirmation response 775 is response information to report that the user has been notified. In step S404, the deletion confirmation control unit 713 of the device A301 obtains the response 762 supplied by the device B302.

Similarly, in step S442 the deletion confirmation receiving unit 721 of the device C303 obtains the device deletion confirmation request transmitted by the device A301, and deletes the equipment information and profile information relating to the device D304 in accordance with the request thereof. In step S443, the deletion reporting unit 722 of the device C303 displays a GUI screen for example, and notifies the user that the device D304 has been deleted from the second communication network 310. In step S444 the deletion confirmation receiving unit 721 of the device C303 supplies a deletion confirmation response such as that shown in the response 762 in FIG. 29, to the device A301, as a response corresponding to the request. In step S405 the deletion confirmation control unit 713 of the device A301 obtains the response 762 supplied by the device C303.

The device D304 is deleted from the second communication network 310 with the above-described processing. Accordingly, hereafter, the device A301 performs song data distribution to only the devices C302 and C303.

That is to say, in step S406 the music player application 212 of the device A301 performs transmission of song data (streaming playing/transmission) as to the devices B302 and C303. A GUI indicating that the song data is being transmitted, such as shown in FIG. 11 for example, is displayed on the monitor of the device A301.

Following the transmission, the music player application 212 of the device B302 in step S425 and the music player application 212 of the device C303 in step S445 each play while receiving the song data distributed by the device A301 (streaming playing/receiving). A GUI indicating that the song data is being received/played is displayed on the monitor for each device of the devices B302 and C303.

Note that each process in the processing described above is performed in between the transmission and reception of the data during streaming playing. That is to say, the communication system 300 can readily delete the device D304 from the second communication network 310 while continuing the data distribution by the device A301 as to the devices B302 and C303.

Note that in the case of deleting multiple devices which are slaves (receiving devices), the communication system 300 can readily delete by performing the above-described processing for each of the devices to be deleted. Also, in the case of the device A301 which is the master (communication managing device) moving outside the range, from the perspective of the master, all of the slaves have moved outside the range, so all of the slaves are deleted from the second communication network 310, and the second communication network 310 is dissolved. That is to say, the communication system 300 can readily dissolve the second communication network 310 by repeating the above-described processing. Thus the communication system 300 can improve the usability of the application that provides communication between devices.

The giving of the playing control authority has been described above, but a device not given playing control authority because of not being given playing control authority at the time of adding the device or because playing control authority that had been given has been removed, can be given playing control authority anew. That is to say, a "does not have playing control authority" device can be upgraded to a "has playing control authority" device.

For example, let us say that in the state shown in FIG. 20A, playing control authority has not been given to the device C303. A case wherein playing control authority is given to the device C303 (the device C303 is upgraded) from this state will be described.

Figure 30A:
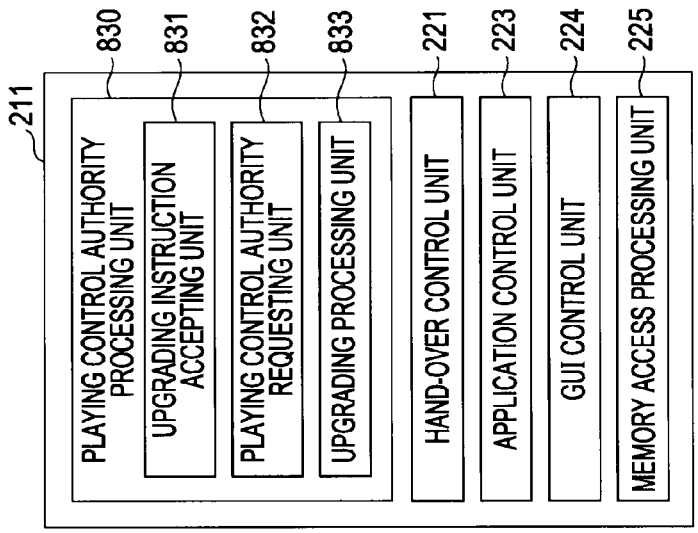
FIGS. 30A through 30C are diagrams illustrating a configuration example of a functional block relating to upgrading processing that each device has.
Figure 30B:
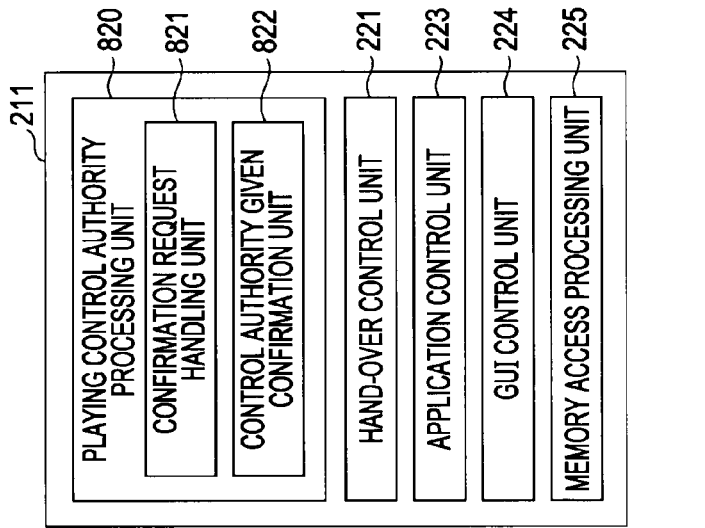
Figure 30C:
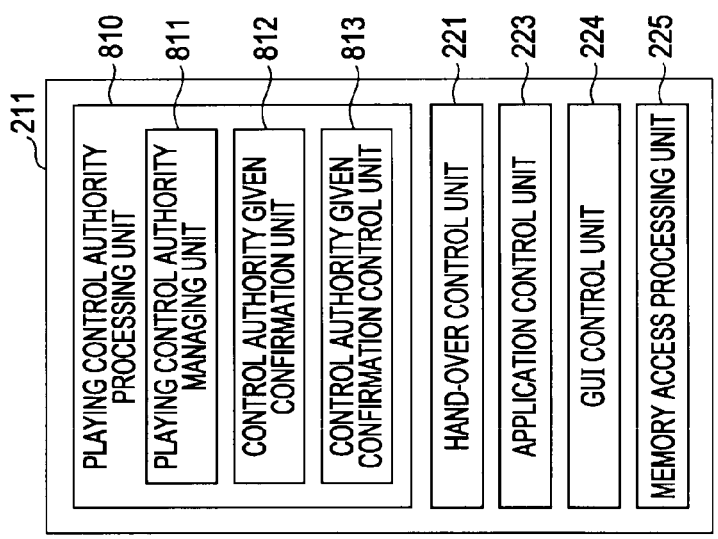

FIGS. 30A through 30C show a configuration example of the content case application 211 for each device in this case. FIG. 30A shows a configuration example of the content cast application 211 of the device A301. FIG. 30B shows a configuration example of the content cast application 211 of the device B302. FIG. 30C shows a configuration example of the content cast application 211 of the device C303. The portions similar to the configuration described with reference to FIG. 4 have the same reference numerals appended thereto.

As shown in FIG. 30A, as a function of the content cast application 211, the device A301 has a playing control authority processing unit 810, hand-over control unit 221, application control unit 223, GUI control unit 224, and memory access processing unit 225.

The playing control authority processing unit 810 performs processing relating to giving playing control authority as a master (communication managing device) in the second communication network 310. The playing control authority processing unit 810 has a playing control authority managing unit 811, control authority given confirmation unit 812, and control authority given confirmation control unit 813.

The playing control authority managing unit 811 performs processing as to the request of the playing control authority giving. The control authority given confirmation unit 812 displays a GUI screen on a monitor or the like to perform confirmation with the user of giving playing control authority. The control authority given confirmation control unit 813 confirms with the user as to whether or not playing control authority is to be given to a receiving device other than the receiving device requesting giving the playing control authority.

As shown in FIG. 30B, as a function of the content cast application 211, the device B302 has a playing control authority processing unit 820, hand-over control unit 221, application control unit 223, GUI control unit 224, and memory access processing unit 225.

The playing control authority processing unit 820 performs processing to control the giving of the playing control authority as a receiving device other than the receiving device requesting giving the playing control authority. The playing control authority processing unit 820 has a confirmation request handling unit 821 and control authority given confirmation unit 822.

The confirmation request handling unit 821 obtains and responds to the confirmation request for giving control authority supplied by the device A301 which is the master. The control authority given confirmation unit 822 confirms with a user whether or not to acknowledge giving of the control authority.

As shown in FIG. 30C, as a function of the content cast application 211, the device C303 has a playing control authority processing unit 830, hand-over control unit 221, application control unit 223, GUI control unit 224, and memory access processing unit 225.

The playing control authority processing unit 830 performs processing as a receiving device requesting giving the playing control authority. The playing control authority processing unit 830 has an upgrading instruction receiving unit 831, playing control authority requesting unit 832, and upgrading processing unit 833.

The upgrading instruction receiving unit 831 receives instructions to obtain the playing control authority input by a user operation or the like, for example. The playing control authority requesting unit 832 requests the master to give playing control authority, based on the instructions obtained by the upgrading instruction receiving unit 831. The upgrading processing unit 833 performs upgrading processing to give playing control authority in the case that giving of the playing control authority has been allowed.

Next, an example of the flow of processing relating to the upgrading of the device C303 will be described with reference to the flowchart in FIG. 31.

First, in step S501 the music playing application 212 of the device A301 performs transmission of song data as to the devices B302 and C303 (streaming playing/transmission). A GUI indicating that the song data is being transmitted is displayed on the monitor of the device A301.

The music player application 212 of the device B302 in step S521 and the music player application 212 of the device C303 in step S541 each play while receiving song data distributed by the device A301 (streaming playing/receiving). A GUI indicating that the song data is being received/played is displayed on the monitor for each device of the devices B302 and C303.

Upon the user operating a GUI screen to input the instructions (upgrading instructions) to give playing control authority to the device C303, the upgrading instruction receiving unit 831 receives the upgrading instructions thereof in step S522. In step S523 the playing control authority requesting unit 832 performs the request for the playing control authority as to the device A301 which is the master, based on the instructions thereof. The playing control authority managing unit 811 of the device A301 obtains the request thereof in step S502. In step S503 the control authority given confirmation unit 812 displays a GUI screen on a monitor for the user to confirm whether or not to give playing control authority to the device C303, thereby confirming the desire of the user of the device A301.

For example, the GUI screen displays a message of "Give playing control authority to device C?" along with the selection options of "Yes" and "No". The user selects "Yes" or "No", thereby controlling the giving of the playing control authority.

Also, in step S504 the control authority given confirmation control unit 813 requests confirmation as to whether or not the user has acknowledged giving the playing control authority to the device B302 which is a receiving device other than the device requesting giving the control authority. Note that in the case there are multiple "receiving devices other than the receiving device requesting giving the playing control authority", the control authority given confirmation control unit 813 performs confirmation as to each device.

The confirmation request handling unit 821 obtains the request thereof in step S542. In step S543 the control authority given confirmation unit 822 displays a GUI screen, such as that shown in FIG. 36, on a monitor to confirm with the user whether or not to give playing control authority to the device C303, thereby confirming the desire of the user of the device B302.

In the case that the user selects "Yes" and allows giving of the playing control authority, in step S544 the confirmation request handling unit 821 supplies the response allowing the giving of the playing control authority to the device A301. The control authority given confirmation control unit 813 of the device A301 obtains the response thereof in step S505.

Upon the response being obtained, in step S506 the playing control authority managing unit 811 of the device A301 supplies the response allowing the giving of the playing control authority to the device C303 which is the request source for giving the playing control authority. The playing control authority requesting unit 832 of the device C303 obtains the response thereof in step S524.

Upon the response being obtained, in step S525 the upgrading processing unit 833 gives playing control authority to the device C303, and displays on a monitor a screen notifying the user that playing control authority has been given. For example, a message indicating giving the playing control authority is displayed on the screen, such as "playing control authority has been obtained". Thus, the various devices of the communication system 300 can readily control giving the playing authority.

Note that in the case that in step S503 the user of the device A301 has denied giving the playing control authority to device C303, or in the case that in step S543 the user of the device B302 has denied giving the playing control authority to device C303, the playing control authority managing unit 811 of the device A301 supplies the response denying giving the playing control authority to the device C303 which is the request source for giving the playing control authority. This denial response ends the series of processing is ended. That is to say, in this case the device C303 is not upgraded to "with playing control authority".

Also, the above-described processing is performed in between processing of streaming playing. Thus, the communication system 300 suppresses great increases of influence to other processing by the giving of the playing control authority, while readily giving the playing control authority to a device.

That is to say, the control system 300 can improve usability of the application providing communication between devices.

Note that removing (downgrading) of the playing control authority may also be performed. In this case, in the above-described upgrading processing, instead of giving the control authority, the control authority is taken away.

With processing in the event of role-switching such as that described above, the equipment information and capability information for each device is shared, whereby a portion of the information exchanged in the event of updating the second communication network 310 as described above can be omitted. For example, information that has already been obtained does not have to be obtained again. Accordingly, each device only has to transmit the information that the partner does not have. Thus, the amount of information exchanged can be reduced, and the burden on the devices relating to the updating of the configuration of the second communication network 310 and on the communication network can be reduced.

Note that as described above, each device synchronizes the equipment information and capability information, and shares the newest information, whereby problems occurring in the case of performing updating of the configuration of the second communication network 310 using the information shared by the various devices can be suppressed.

Note that the functional blocks that the various devices have for various cases of the communication system 300 are described above, but only the functions relating to processing are described, and the functional blocks that the various devices have are not limited to these. For example, the various devices of the communication system may simultaneously have a functional block of another device or a functional block of another case.

The above-described series of processing can be executed with hardware or can be executed with software. In the case of executing the above-described series of processing with software, a program making up the software is installed from a network or recording medium.

The recording medium is not restricted to the removable media 131 made up of a magnetic disk (including a flexible disk), optical disk (including CD-ROM and DVD), magneto-optical disk (including MD), semiconductor memory, or the like, which are separate from the device main unit, but may be made up of ROM 112 in which a program is recorded, or a hard disk included in the storage unit 123, which are provided in the state of having been built into the device main unit.

Note that the steps describing the program recorded in the recording medium include the processing performed in a time-series manner in the order described above as a matter of course, but also include processing executed in parallel or individually, not necessarily in a time-series manner.

Also, in the present Specification, the term "system" refers to the entirety of equipment made up of multiple devices.

Note that with the above description, the configuration which is described as one device may be divided, and be configured as multiple devices. Conversely, the configuration which is described as multiple devices can be configured integrally. Also, it goes without saying that configurations other than the above described may be added to the configuration of the various devices. Further, as long as the configuration and operation as an overall system are substantially the same, a portion of the configuration of a certain device may be included in the configuration of another device. That is to say, the embodiments of the present invention are not limited to the above-described embodiments; rather, various of modifications may be made within the scope and intent of the present invention.

The present application contains subject matter related to that disclosed in Japanese Priority Patent Application JP 2008-244463 filed in the Japan Patent Office on Sep. 24, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing device, comprising:
a first transmitting circuit that connects a first other information processing device and a second other information processing device and transmits content via said connection;
a first receiving circuit that receives a master request that requests an upgrade to a master from said first other information processing device and receives identification information from said first other information processing device;
a second transmitting circuit that transmits the identification information of said first other information processing device and a confirming request as to whether to allow a master change to said second other information processing device upon reception of said master request;
a disconnecting circuit that disconnects the connection with said second other information processing device, when said master change is allowed, as a response to a transmission of the identification information of said first other information processing device and as a response to said confirming request; and
a second receiving circuit that receives content via said connection from said first other information processing device.

2. The information processing device according to claim 1, wherein capability information of said first other information processing device is included in said master request received by said first receiving circuit.

3. The information processing device according to claim 2, wherein said second receiving circuit receives capability information of said second other information processing device connected to said first other information processing device, and profile information relating to said second other information processing device.

4. The information processing device according to claim 3, further comprising:
a playing circuit that plays streaming data received from said second receiving circuit, wherein
said second receiving circuit receives said streaming data of said content received from said first other information processing device.

5. An information processing method, comprising:
receiving identification information from a first other information processing device;
connecting, by circuitry, said first other information processing device and a second other information processing device and transmitting content via said connection;
receiving a master request that requests an upgrade to a master from said first other information processing device;
transmitting the identification information of said first other information processing device and a confirming request as to whether to allow a master change to said second other information processing device upon reception of said master request;
disconnecting, by the circuitry, the connection with said second other information processing device, when said master change is allowed, as a response to the transmission of the identification information of said first other information processing device and as a response to said confirming request; and
receiving content via said connection from said first other information processing device.

6. An information processing device, comprising:
a first receiving circuit that connects with a first other information processing device and receives content supplied from said first information processing device via said connection;
a second receiving circuit that receives a confirming request including identification information of a second other information processing device supplied from said first other information processing device via said connection;
a determination circuit that determines whether to allow a master change, in response to said confirming request received by said second receiving circuit;
a transmitting circuit that transmits a response indicating allowing said master change to said first other information processing device, in response to a determination that said master change is allowed;
a disconnecting circuit that disconnects the connection with said first other information processing device;
a connecting circuit that connects with said second other information processing device; and
a third receiving circuit that receives content from said second other information processing device via said connection with said second other information processing device.

7. The information processing device according to claim 6, wherein said second receiving circuit further receives capability information of said second other information processing device.

8. The information processing device according to claim 7, wherein said transmitting circuit further transmits equipment information of the information processing device itself, capability information of the information processing device itself, and profile information relating to the information processing device itself.

9. The information processing device according to claim 8, further comprising:
a playing circuit that plays streaming data received from said third receiving means, wherein
said third receiving circuit receives said streaming data of said content received from said second other information processing device.

10. An information processing method, comprising:
connecting with a first other information processing device and receiving content supplied from said first information processing device via said connection;
receiving a confirming request including identification information of a second other information processing device supplied from said first other information processing device via said connection;
determining, by circuitry, whether to allow a master change, in response to said confirming request;
transmitting a response indicating allowing said master change to said first other information processing device, in response to said determining;
disconnecting the connection with said first other information processing device;
connecting with said second other information processing device; and
receiving content from said second other information processing device via said connection with said second other information processing device.

11. An information processing device, comprising:
a first receiving circuit that connects with a first other information processing device and receives content supplied from said first information processing device via said connection;

a first transmitting circuit that transmits a master request that requests a master upgrade to said first other information processing device via said connection;

a second receiving circuit that receives a response allowing said master upgrade that is supplied from said first other information processing device via said connection, in accordance with said master request, said response including identification information of a second other information processing device;

an upgrading circuit that upgrades the information processing device to a master in response to the response allowing said master upgrade;

a connecting circuit that connects with said second other information processing device based on said identification information of said second other information processing device; and a second transmitting circuit that transmits content to said first other information processing device and said second other information processing device, wherein the second other information processing device receives, from said first other information processing device, identification information of the information processing device and an indication of allowing said master upgrade.

12. The information processing device according to claim 11, wherein said first transmitting circuit further transmits capability information of the information processing device itself.

13. The information processing device according to claim 12, wherein said response further includes capability information of said second other information processing device.

14. The information processing device according to claim 13, further comprising:

a playing circuit that plays streaming data of said content which said first receiving means receives, wherein said second transmitting circuit transmits streaming data of said transmitted content.

15. An information processing method implemented by an information processing device, the information processing method comprising:

connecting with a first other information processing device and receiving content supplied from said first information processing device via said connection;

transmitting a master request that requests a master upgrade to said first other information processing device via said connection;

receiving a response allowing said master upgrade that is supplied from said first other information processing device via said connection, in accordance with said master request, said response including identification information of a second other information processing device;

upgrading the information processing device to a master in response to the response allowing the master upgrade;

connecting with said second other information processing device based on said identification information of said second other information processing device; and transmitting content to said first other information processing device and said second other information processing device, wherein the second other information processing device receives, from said first other information processing device, identification information of the information processing device and an indication of allowing said master upgrade.

16. The information processing device according to claim 6, wherein a GUI screen is displayed in response to said confirming request, and determination circuit determines to allow said master change, based on a display of the GUI screen.

17. The information processing method according to claim 10, further comprising:

displaying a GUI screen in response to the reception of the confirming request, wherein the determining by the circuitry as to whether to allow the master change is determined based on a display of the GUI screen.

18. A non-transitory computer readable medium that stores computer readable instructions that, when executed by an information processing device including circuitry, causes the information processing device to:

receive identification information from a first other information processing device;

connect said first other information processing device and a second other information processing device and transmit content via said connection;

receive a master request that requests an upgrade to a master from said first other information processing device;

transmit the identification information of said first other information processing device and a confirming request as to whether to allow a master change to said second other information processing device upon reception of said master request;

disconnect the connection with said second other information processing device, when said master change is allowed, as a response to the transmission of the identification information of said first other information processing device and as a response to said confirming request; and receive content via said connection from said first other information processing device.

19. A non-transitory computer readable medium that stores computer readable instructions that, when executed by an information processing device including circuitry, causes the information processing device to:

connect with a first other information processing device and receive content supplied from said first information processing device via said connection;

receive a confirming request including identification information of a second other information processing device supplied from said first other information processing device via said connection;

determine whether to allow a master change, in response to said confirming request;

transmit a response indicating allowing said master change to said first other information processing device, in response to said determining;

disconnect the connection with said first other information processing device;

connect with said second other information processing device; and receive content from said second other information processing device via said connection with said second other information processing device.

20. A non-transitory computer readable medium that stores computer readable instructions that, when executed by an information processing device including circuitry, causes the information processing device to:

connect with a first other information processing device and receive content supplied from said first information processing device via said connection;

transmit a master request that requests a master upgrade to said first other information processing device via said connection;

receive a response allowing said master upgrade that is supplied from said first other information processing device via said connection, in accordance with said master request, said response including identification information of a second other information processing device;

upgrade the information processing device to a master in response to the response allowing the master upgrade;

connect with said second other information processing device based on said identification information of said second other information processing device; and transmit content to said first other information processing device and said second other information processing device, wherein the second other information processing device receives, from said first other information processing device, identification information of the information processing device and an indication of allowing said master upgrade.

* * * * *